(12) United States Patent
Utsunomiya et al.

(10) Patent No.: US 7,952,731 B2
(45) Date of Patent: May 31, 2011

(54) PRINTING SYSTEM, JOB PROCESSING METHOD, AND STORAGE MEDIUM

(75) Inventors: Takeshi Utsunomiya, Yokohama (JP); Kazuhiko Ushiyama, Edogawa-ku (JP); Takeshi Tarumi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1019 days.

(21) Appl. No.: 11/763,160

(22) Filed: Jun. 14, 2007

(65) Prior Publication Data

US 2007/0291286 A1     Dec. 20, 2007

(30) Foreign Application Priority Data

Jun. 19, 2006 (JP) .............................. 2006-168881
Jul. 26, 2006 (JP) .............................. 2006-203737
Apr. 18, 2007 (JP) .............................. 2007-109682

(51) Int. Cl.
*G06F 3/12* (2006.01)
*G03G 15/00* (2006.01)

(52) U.S. Cl. ...................... 358/1.13; 358/1.14; 358/1.15; 358/1.16; 358/1.18; 399/81; 399/82; 399/85

(58) Field of Classification Search ........ 358/1.11–1.18; 399/81, 82, 85
See application file for complete search history.

(56) References Cited

U.S. PATENT DOCUMENTS

2005/0052679 A1* 3/2005 Green et al. ................. 358/1.14
2005/0213148 A1* 9/2005 Gong .......................... 358/1.15

FOREIGN PATENT DOCUMENTS

JP    2004-310746 A    11/2004
JP    2004-310747 A    11/2004

* cited by examiner

*Primary Examiner* — Chan S Park
(74) *Attorney, Agent, or Firm* — Rossi, Kimms & McDowell LLP

(57) ABSTRACT

A printing system includes a receive controller that enables by using a user interface unit an input of an instruction during performing of first print processing with a print apparatus, and an operation controller that enables the print apparatus to perform check processing before completion of the first print processing in the case where the instruction is input, the check processing being second print processing by using print data which is used in the first print processing, the operation controller enabling the print apparatus to continue the first print processing after the second print processing.

29 Claims, 52 Drawing Sheets

FIG. 11B

```
TEST COPY

PLEASE SET TEST COPY PAGES.

[ALL PAGES]   [DESIGNATED PAGES]

■ SET DESIGNATED PAGE RANGE
       INPUT WITH TEN-KEY PAD IS ALSO POSSIBLE

[START PAGE]   [    1  ] PAGE
    [END PAGE]     [    1  ] PAGE    [ − ] [ + ]
                    (1~9999)

[CANCEL SETTINGS]                    [OK]
```

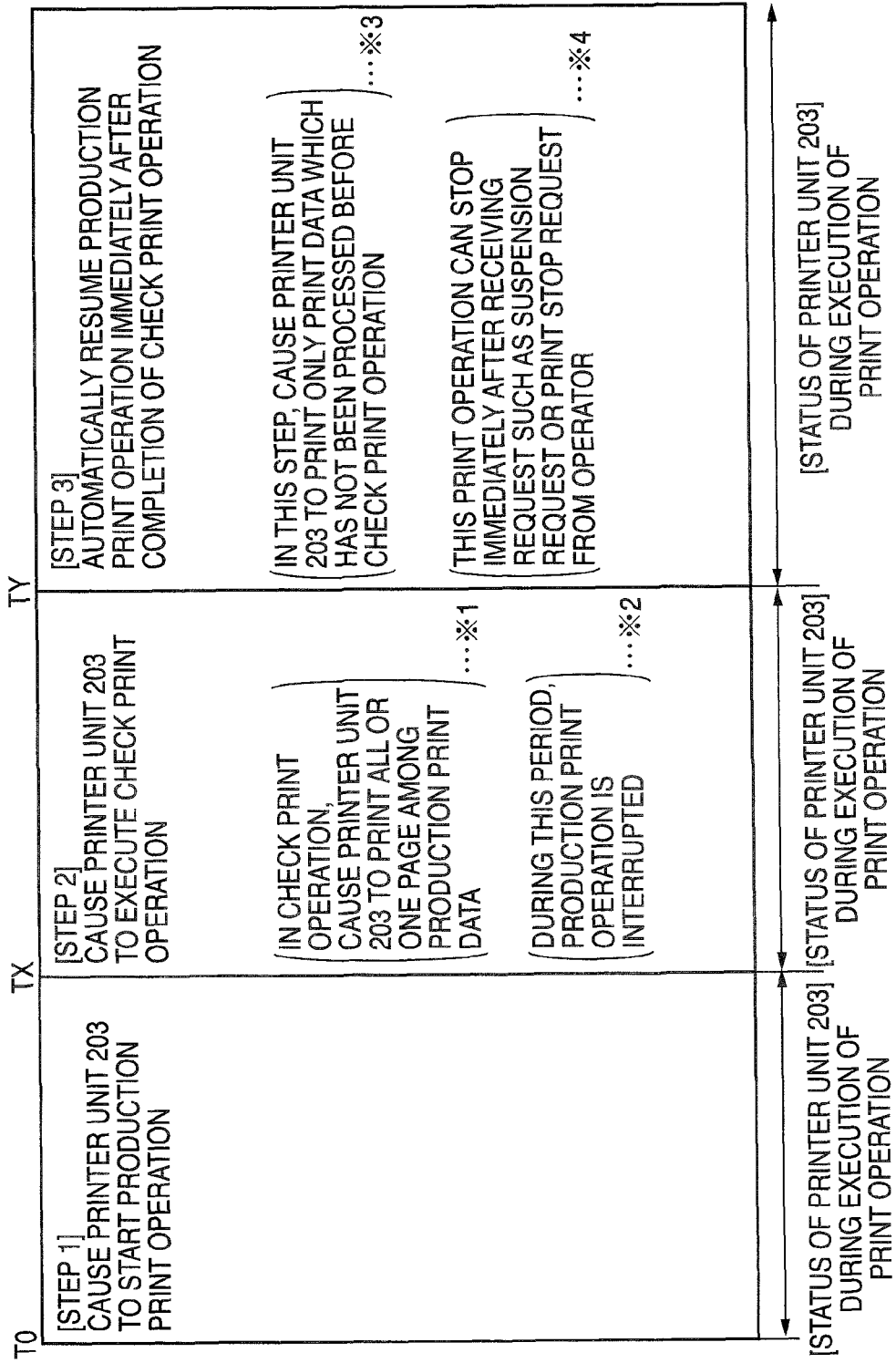

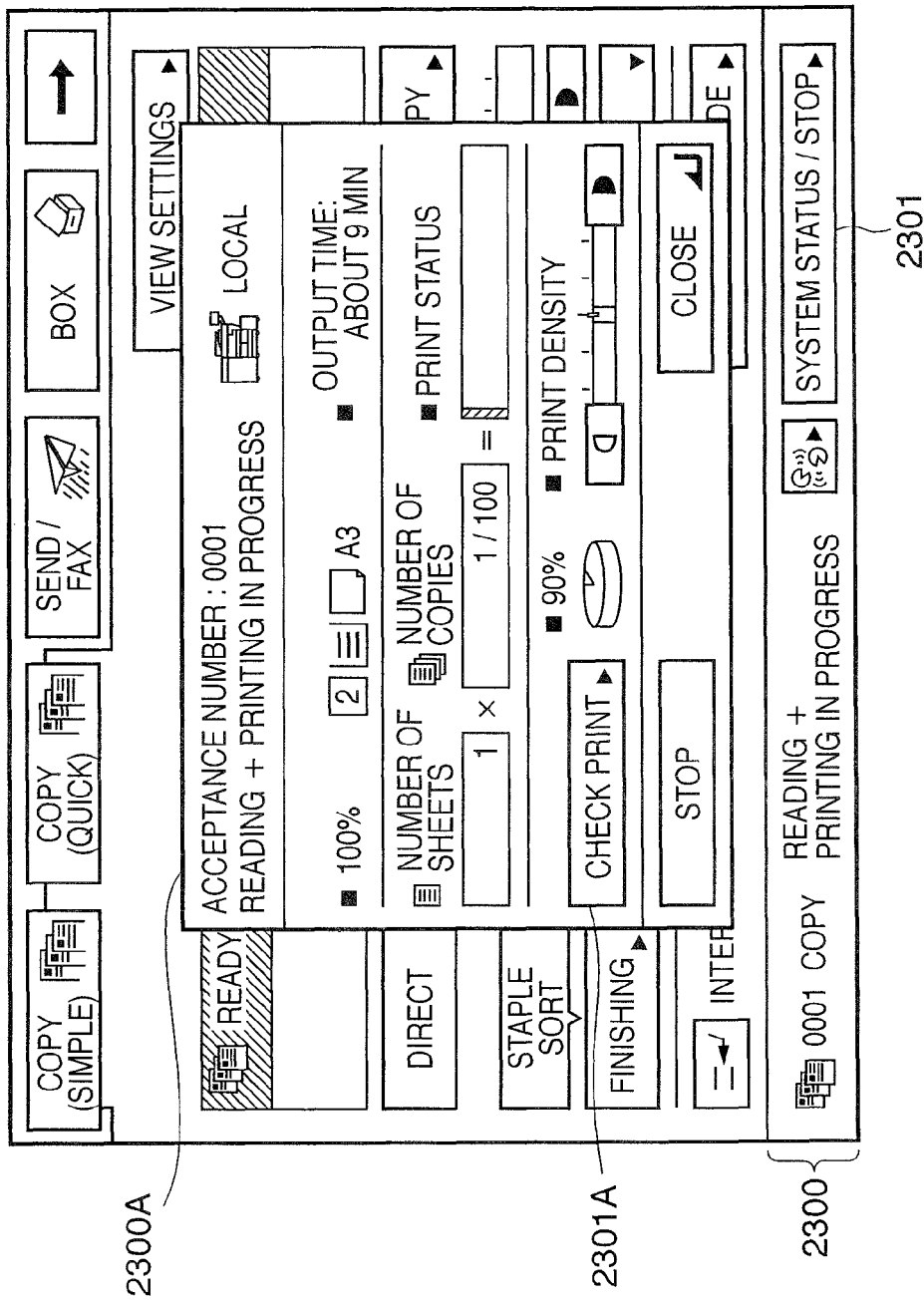

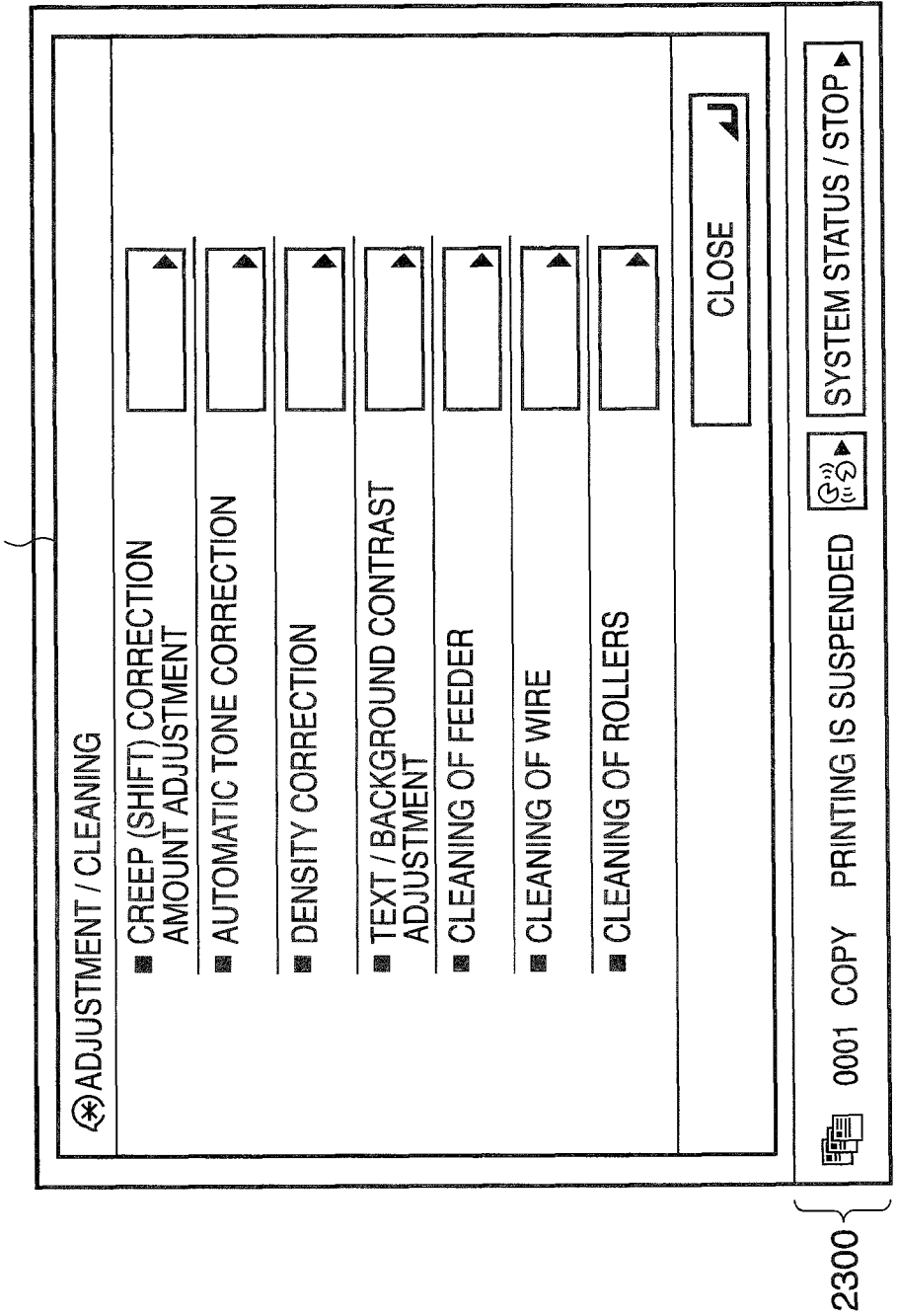

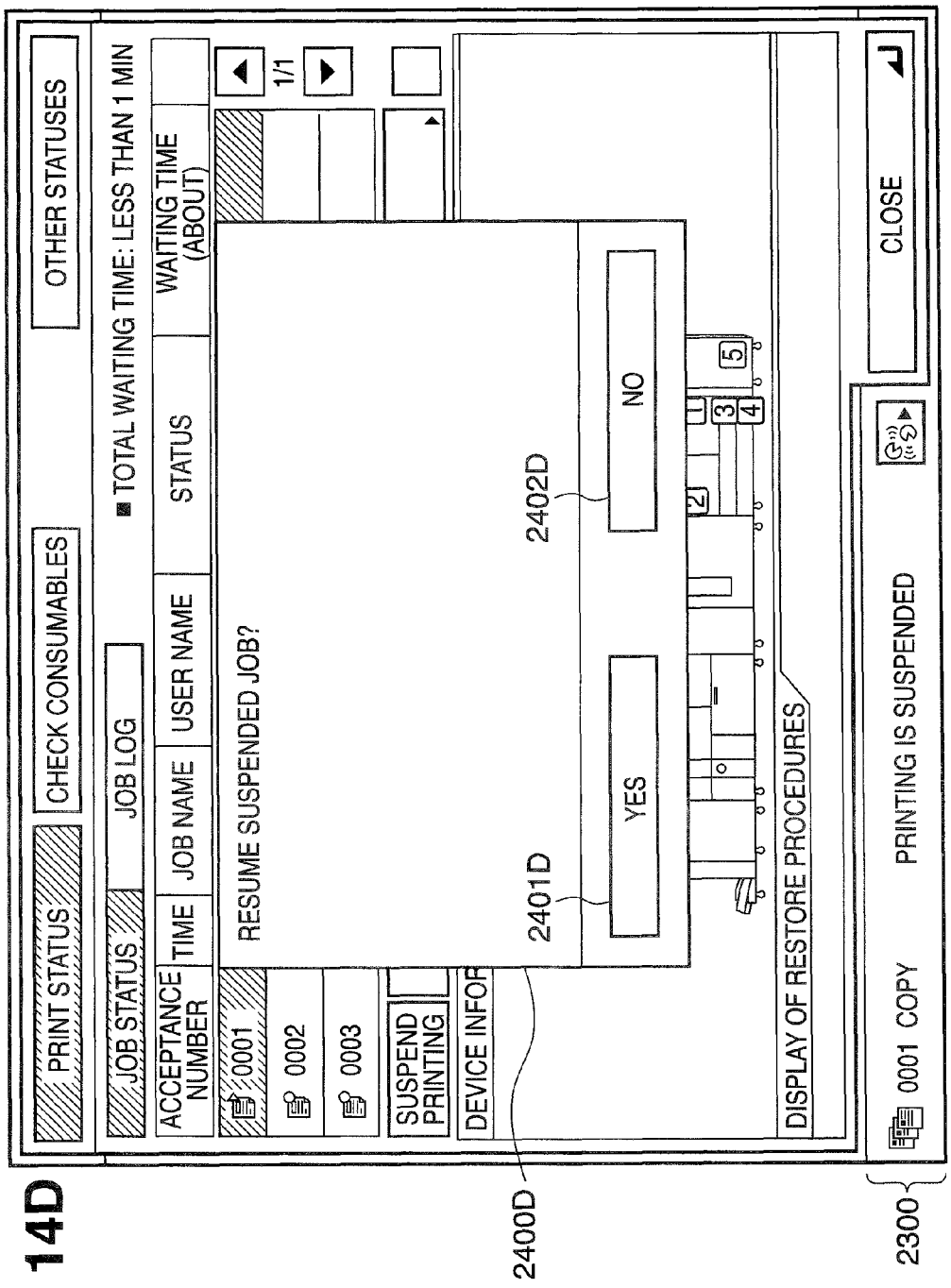

F I G. 14E

2400E

ACCEPTANCE NUMBER : 0001
STATUS : PRINTING IN PROGRESS

- ACCEPTANCE TIME ▷ 2006 06/09 13:24
- DEPARTMENT ID ▷ ------
- JOB TYPE ▷ 📇 COPY
- DOCUMENT NAME ▷
- USER NAME ▷ COPY USER
- NUMBER OF SHEETS × NUMBER OF COPIES ▷ 📄 10× 📑 38/ 100
- OUTPUT TIME ▷ LESS THAN 1 MIN
- WAITING TIME ▷ LESS THAN 1 MIN

[CLOSE]

[CLOSE]

📇 0001 COPY  PRINTING IN PROGRESS (38/100)

2300

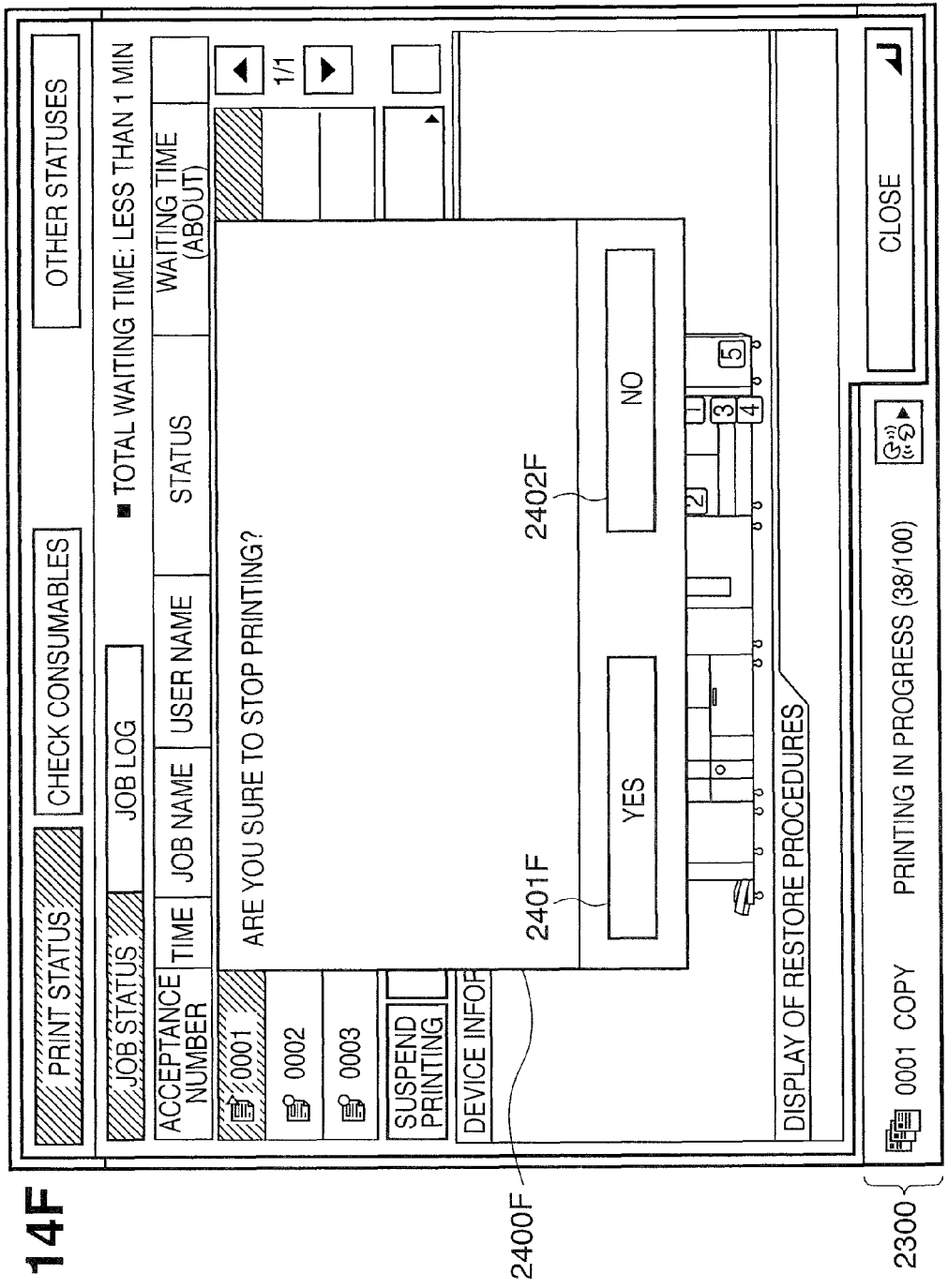

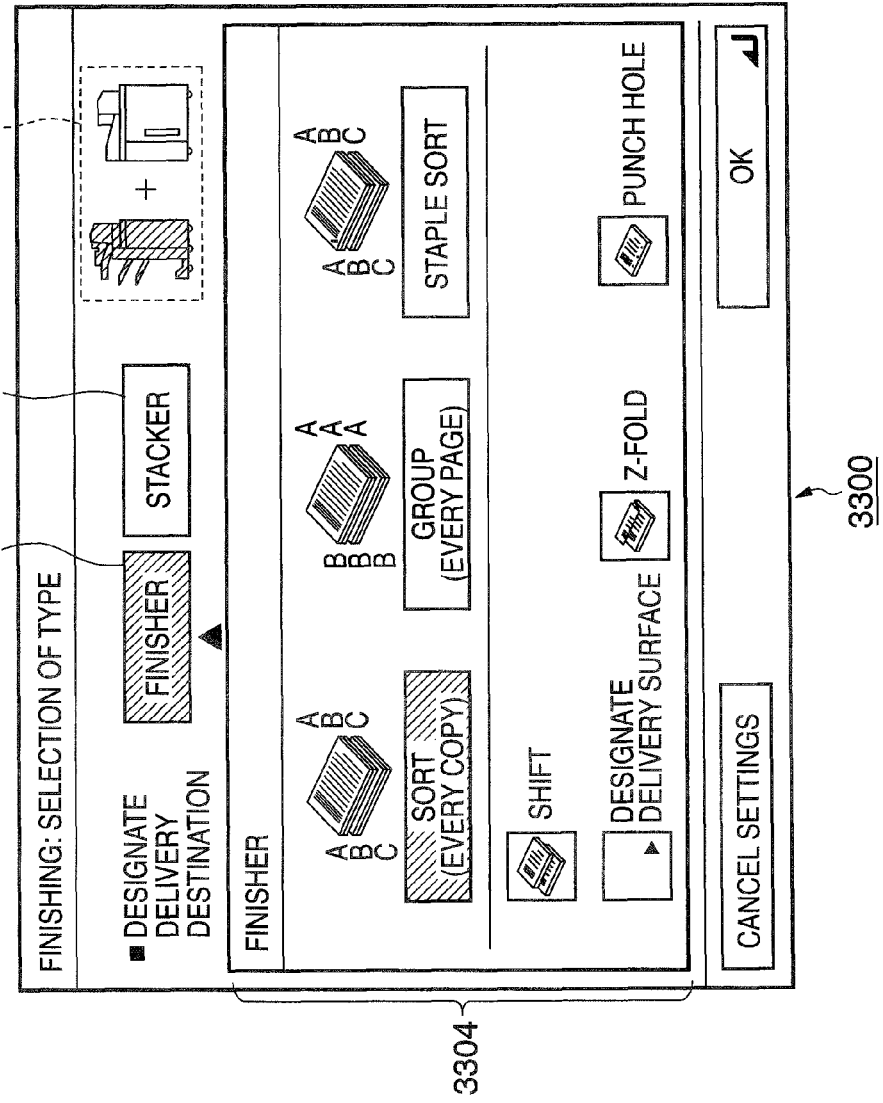

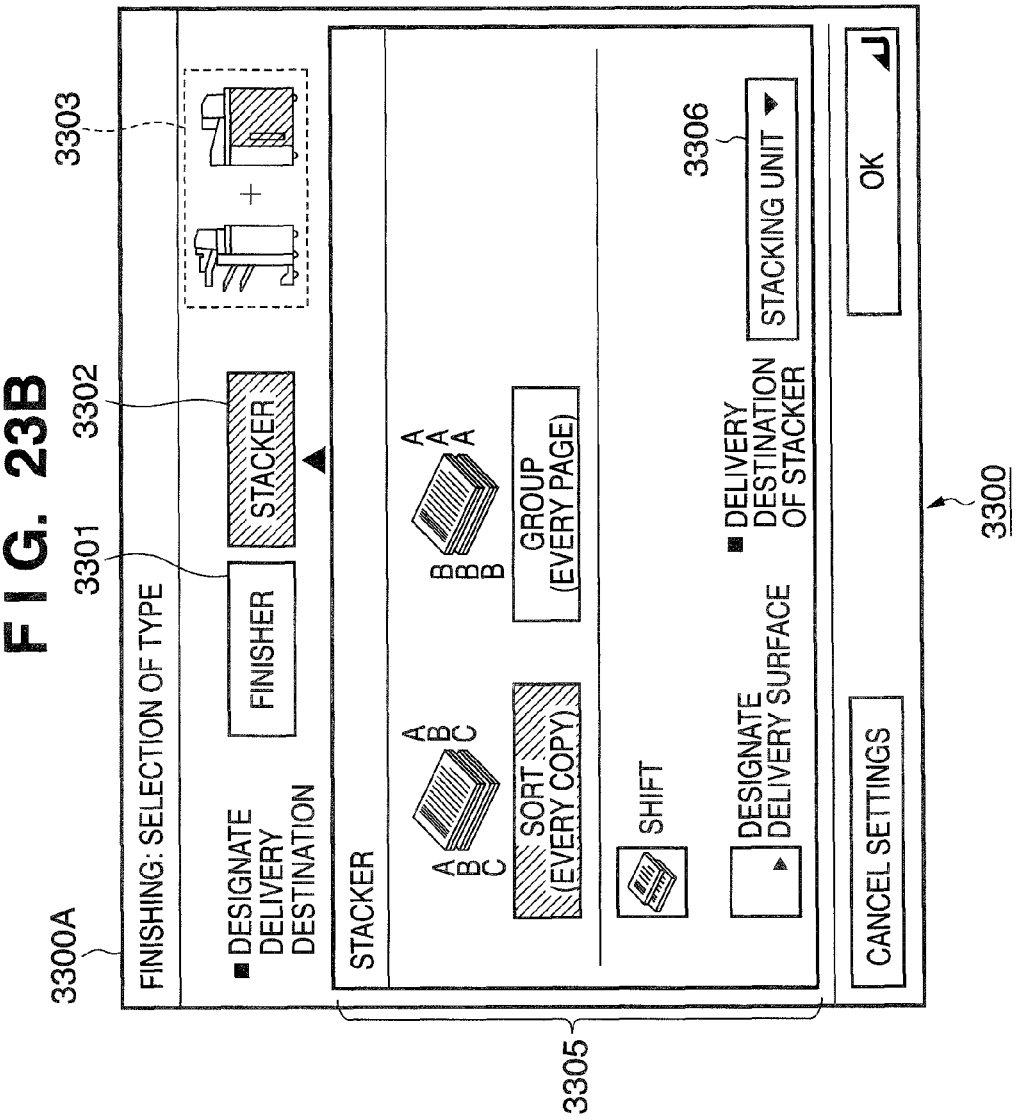

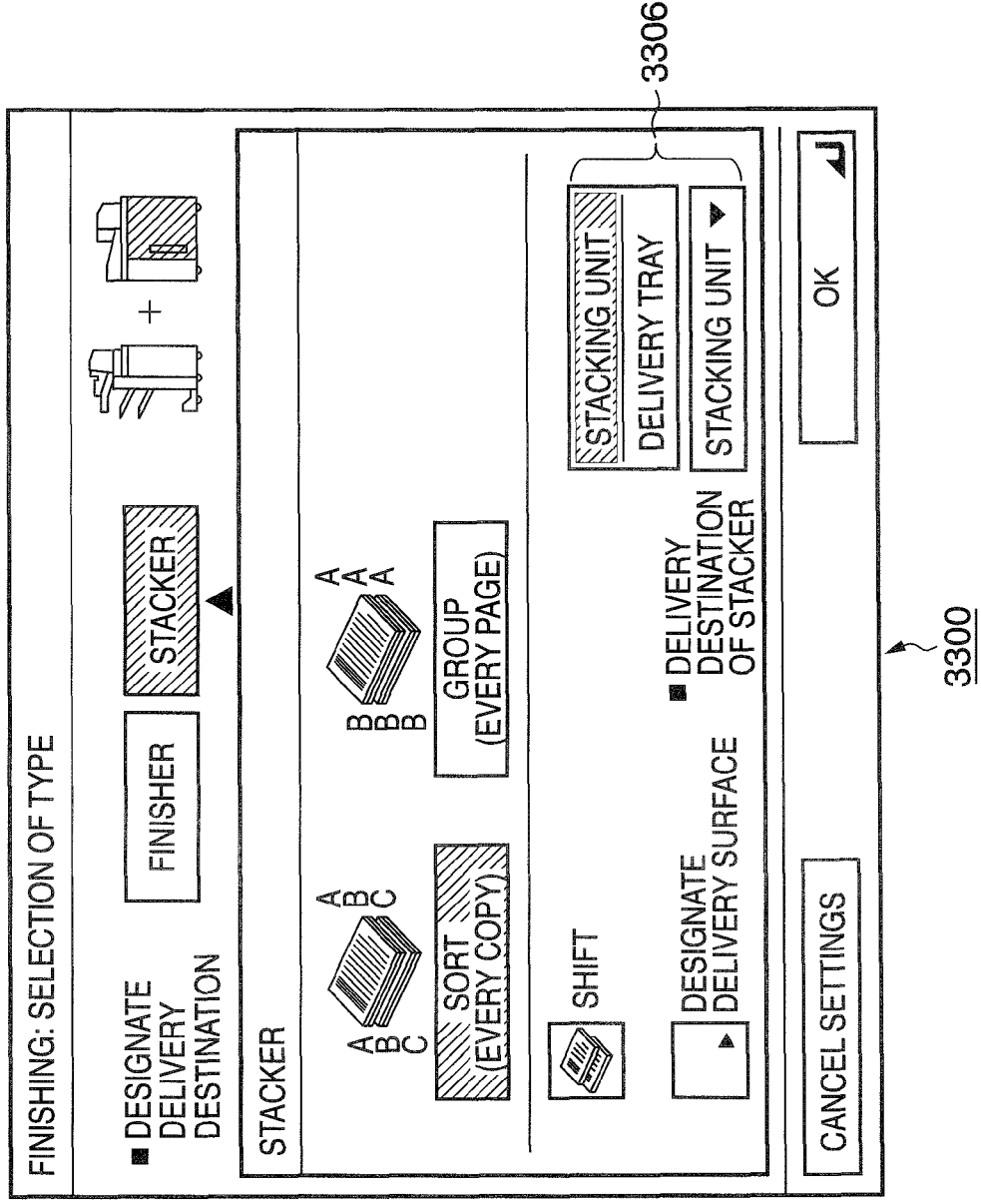

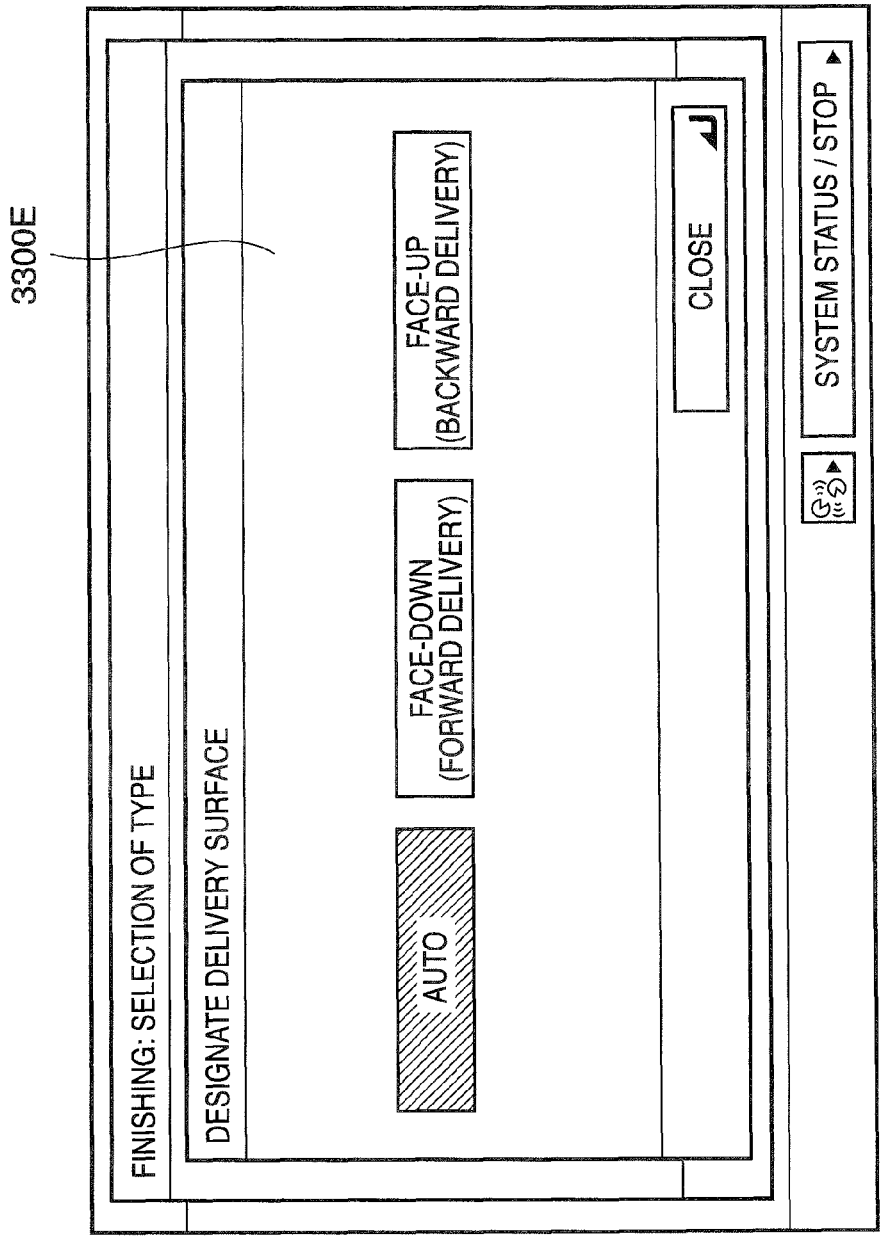

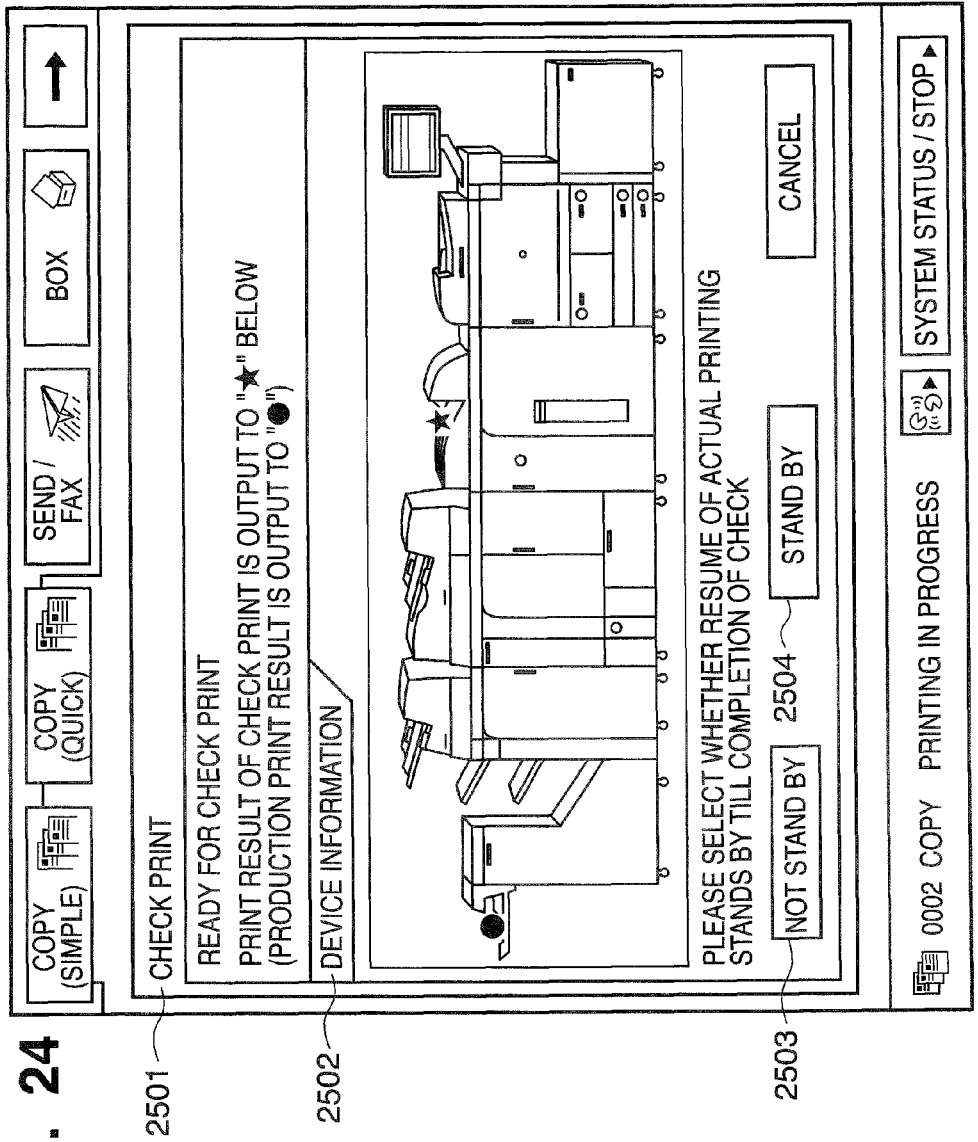

FIG. 27A

| T0 | TX | TY | TZ |
|---|---|---|---|
| [STEP 1] CAUSE PRINTER UNIT 203 TO START PRODUCTION PRINT OPERATION | [STEP 2] CAUSE PRINTER UNIT 203 TO EXECUTE CHECK PRINT OPERATION<br><br>(IN CHECK PRINT OPERATION, CAUSE PRINTER UNIT 203 TO PRINT ALL OR ONE PAGE AMONG PRODUCTION PRINT DATA) …※1<br><br>(DURING THIS PERIOD, PRODUCTION PRINT OPERATION IS INTERRUPTED) …※2 | [STEP 3] EXECUTE DISPLAY IN FIG. 25, AND WAIT UNTIL OPERATOR INPUTS ONE OF FOLLOWING INSTRUCTIONS VIA DISPLAY IN FIG. 25<br><br>[IT IS INHIBITED TO AUTOMATICALLY RESUME PRODUCTION PRINT OPERATION EVEN AFTER CHECK PRINT]<br><br>(INSTRUCTION A) INSTRUCTION TO STOP PROCESSING WITHOUT RESUMING PRODUCTION PRINT OPERATION<br><br>(INSTRUCTION B) INSTRUCTION TO RESUME PRODUCTION PRINT OPERATION WITHOUT CHANGING CONDITIONS OF PRODUCTION PRINT OPERATION | [STEP 4] EXECUTE ONE OF FOLLOWING PROCESSES<br><br>[PROCESSING A] IF INPUT FROM KEY 2601 IN FIG. 25 IS RECEIVED (CORRESPONDING TO INSTRUCTION A), STOP (END) PROCESSING OF JOB HAVING UNDERGONE CHECK PRINT WITHOUT RESUMING PRODUCTION PRINT OPERATION<br><br>[PROCESSING B] IF KEY 2602 IS PRESSED WITHOUT INPUTTING SETTING CHANGE REQUEST WITH KEY 2603 IN FIG. 25 (CORRESPONDING TO INSTRUCTION B), RESUME PRODUCTION PRINT OPERATION WITHOUT CHANGING PRINTING CONDITIONS OF PRODUCTION PRINT OPERATION<br><br>(※IN THIS CASE, CAUSE PRINTER UNIT 203 TO PRINT ONLY PRINT DATA WHICH HAS NOT BEEN PROCESSED BEFORE INTERRUPTING PRINTING) |

FIG. 28

| NUMBER | JOB NAME | FINISHER FOR USE |
|---|---|---|
| 1 | JOB A | SADDLE STITCHING APPARATUS |
| 2 | JOB B | SADDLE STITCHING APPARATUS |
| 3 | JOB C | LARGE-VOLUME STACKER |
| 4 | JOB D | GLUE BINDING APPARATUS |

PRINTING SYSTEM, JOB PROCESSING METHOD, AND STORAGE MEDIUM

BACKGROUND OF THE INVENTION

1. Field of the Invention

The present invention relates to a printing system, job processing method, and storage medium.

2. Description of the Related Art

In a conventional printing industry, a publication is issued through various processes. These processes include entry of a document, designing of the document, layout editing, comprehensive layout (presentation by printing), proofreading (layout correction and color correction), proof (proof print), block copy preparation, printing, post-process, and shipping.

The commercial printing industry uses an offset reproduction printing press in the printing step, and the block copy preparation step is inevitable. However, once the block copy is prepared, it is difficult and disadvantageous in cost to correct it. In block copy preparation, therefore, careful proofreading (i.e., careful layout check and color confirmation) is indispensable. Some period of time is generally taken until a publication is issued.

Most of apparatuses used in respective processes are bulky and require expert knowledge, and know-how of experts is essential.

In this situation, a POD (Print On Demand) printing system using an electrophotographic or inkjet print apparatus has been proposed in recent years (see Japanese Patent Laid-Open Nos. 2004-310746 and 2004-310747).

The POD printing system eliminates the aforementioned block copy preparation and other complicated processes.

However, there is room to study on practical use of the POD printing system.

Assume that a printing company adopts the POD printing system. In this printing environment, it is important to efficiently produce customer-satisfactory printed materials as many as possible within a short period.

In this printing environment, the need is expected to confirm by an operator at the printing site whether the printing system outputs customer-satisfactory printed materials. Another need is also expected to continue the print operation of the printing system without wastefully stopping it.

Under these circumstances, the need may arise to check printed materials without wastefully stopping the print operation of the printing system. However, this need has not arisen yet, so no concrete proposal has been made.

SUMMARY OF THE INVENTION

It is an object of the present invention to provide a printing system, job processing method, and storage medium which enable a check on printed materials without wastefully stopping the print operation of the printing system.

According to one aspect of the present invention, a printing system comprising:

a receive controller that enables by using a user interface unit an input of an instruction during performing of first print processing with a print apparatus; and an operation controller that enables the print apparatus to perform check processing before completion of the first print processing in the case where the instruction is input, the check processing being second print processing by using print data which is used in the first print processing, the operation controller enabling the print apparatus to continue the first print processing after the second print processing.

According to another aspect of the present invention, a job processing method comprising the steps of:

enabling by using a user interface unit an input of an instruction during performing of first print processing with a print apparatus;

enabling the print apparatus to perform check processing before completion of the first print processing in the case where the instruction is input, the check processing being second print processing by using print data which is used in the first print processing; and enabling the print apparatus to continue the first print processing after the second print processing.

Further features of the present invention will become apparent from the following description of exemplary embodiments (with reference to the attached drawings).

BRIEF DESCRIPTION OF THE DRAWINGS

FIG. 11B is a view for explaining a control example associated with the operation unit 204;

FIG. 12B is a timing chart for explaining a control example associated with the printing system 1000;

FIG. 13C is a view for explaining a control example associated with the operation unit 204;

FIG. 14C is a view for explaining a control example associated with the operation unit 204;

FIG. 14D is a view for explaining a control example associated with the operation unit 204;

FIG. 14E is a view for explaining a control example associated with the operation unit 204;

FIG. 14F is a view for explaining a control example associated with the operation unit 204;

FIG. 23A is a view for explaining a control example associated with the operation unit 204;

FIG. 23B is a view for explaining a control example associated with the operation unit 204;

FIG. 23C is a view for explaining a control example associated with the operation unit 204;

FIG. 23E is a view for explaining a control example associated with the operation unit 204;

FIG. 24 is a view for explaining a control example associated with the operation unit 204;

FIG. 28 is a table for explaining a control example associated with the printing system 1000;

DESCRIPTION OF THE EMBODIMENTS

First Embodiment

Figure 1:
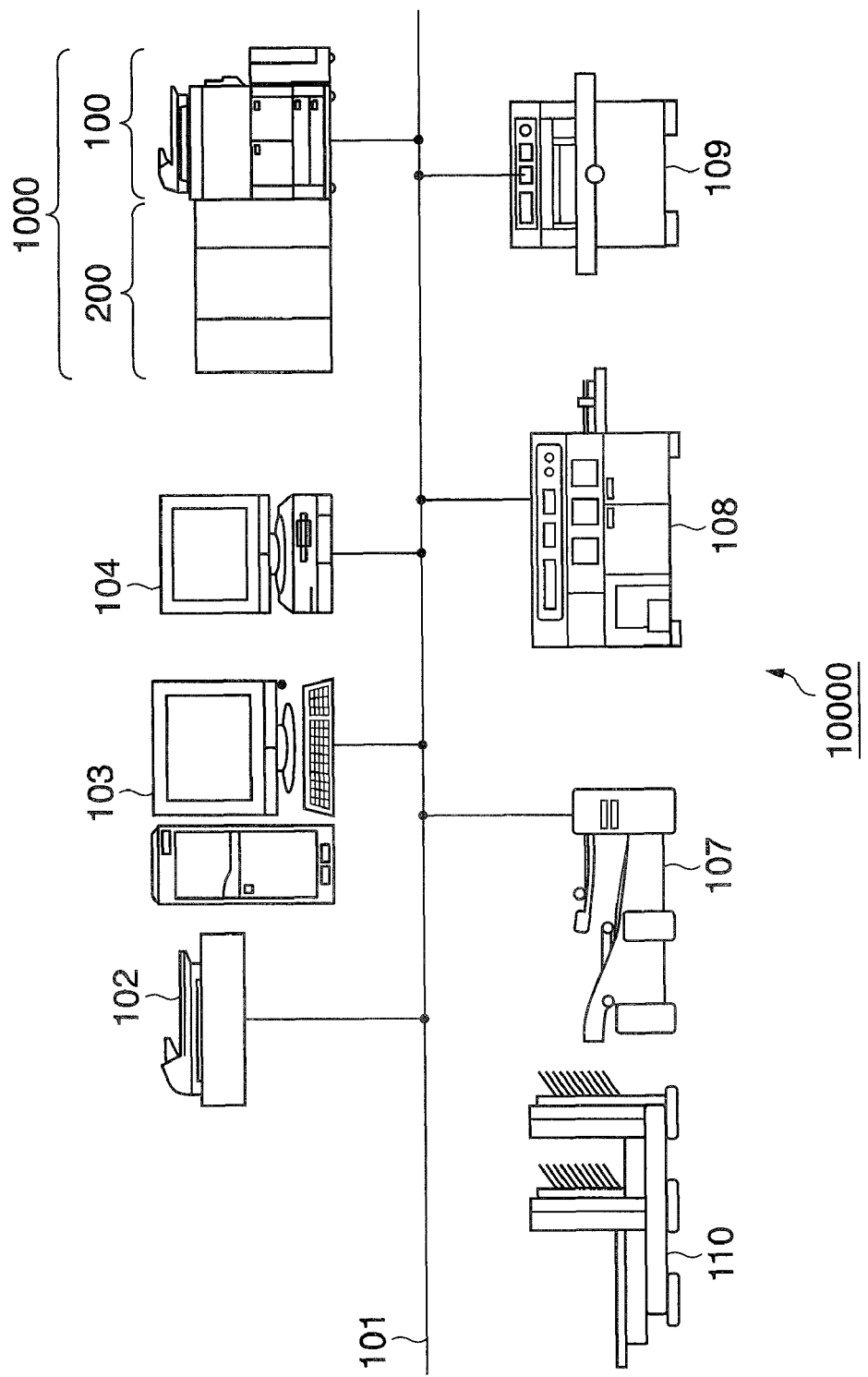
FIG. 1 is a view for explaining an overall POD system 10000.

A POD system 10000 in FIG. 1 comprises a printing system 1000, scanner 102, server computer 103 (PC 103), and client computer 104 (PC 104), which are connected to each other via a network 101. The POD system 10000 also comprises a paper folding apparatus 107, cutting apparatus 109, saddle stitching apparatus 110, case binding apparatus 108, and the like.

The printing system 1000 comprises a print apparatus 100 and sheet processing apparatus 200. As the print apparatus 100, the embodiment will exemplify an MFP (Multi Function Peripheral) having a plurality of functions such as the copy and printer functions. However, the print apparatus 100 may be a single function type print apparatus having only the copy or printer function.

The PC 103 manages data exchange with a variety of apparatuses connected to the network 101. The PC 104 transmits image data to the print apparatus 100 and PC 103 via the network 101. The paper folding apparatus 107 folds sheets printed by the print apparatus 100. The case binding apparatus 108 case-binds sheets printed by the print apparatus 100. The cutting apparatus 109 cuts each bundle of sheets printed by the print apparatus 100. The saddle stitching apparatus 110 saddle-stitches sheets printed by the print apparatus 100.

In the use of the paper folding apparatus 107, case binding apparatus 108, cutting apparatus 109, and saddle stitching apparatus 110, the user takes out sheets printed by the print apparatus 100 from the printing system 1000, sets them in an apparatus for use, and causes the apparatus to process them. A plurality of apparatuses in the POD system 10000 of FIG. 1 except for the saddle stitching apparatus 110 are connected to the network 101 so as to communicate data with each other.

The configuration of the printing system 1000 will be explained with reference to the system block diagram of FIG. 2.

Figure 2:
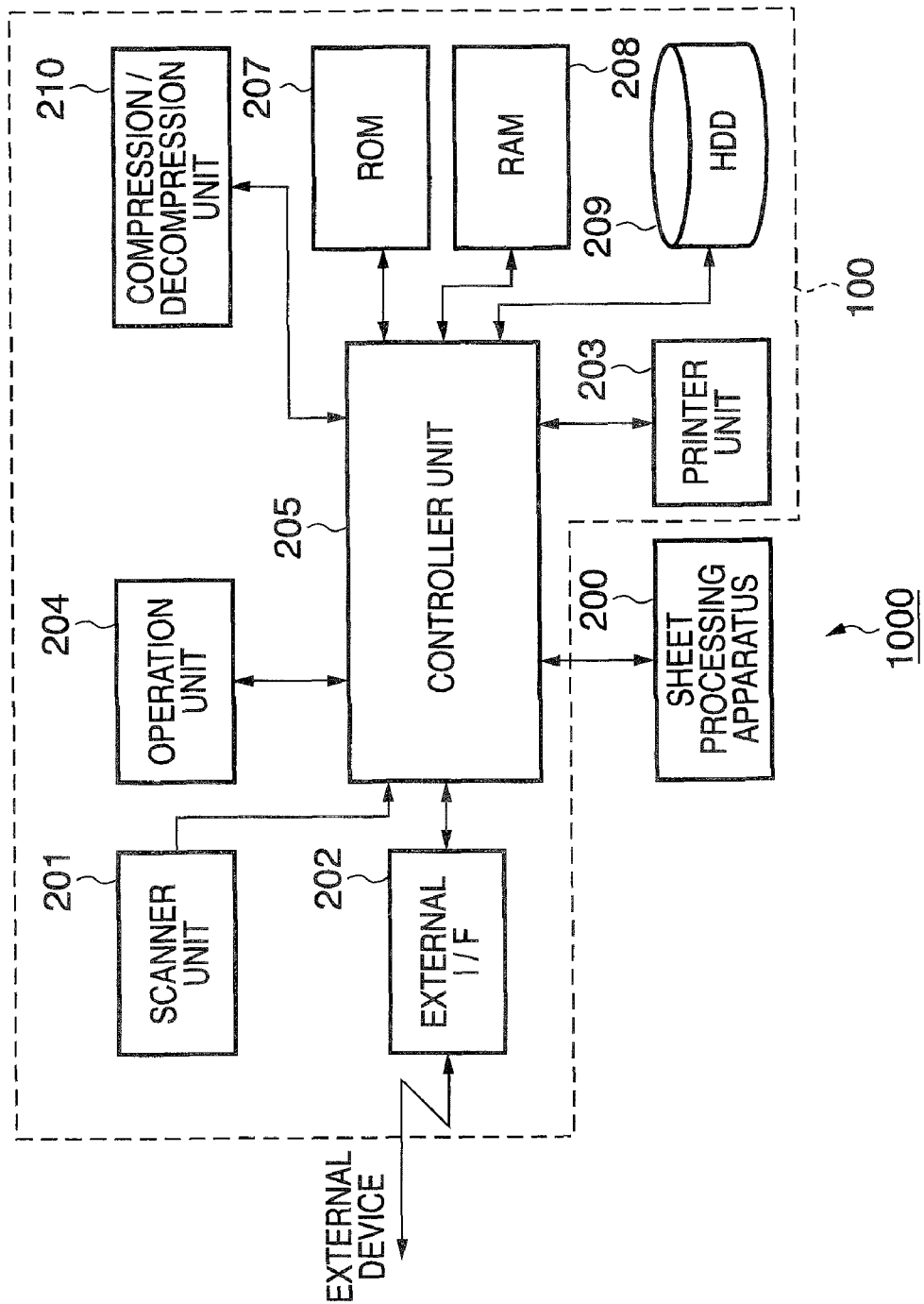
FIG. 2 is a block diagram for explaining an example of the internal configuration of a printing system 1000.

The print apparatus 100 incorporates units shown in FIG. 2 in the printing system 1000 except for the sheet processing apparatus 200. An arbitrary number of sheet processing apparatuses 200 are connectable to the print apparatus 100.

The printing system 1000 is configured so that the sheet processing apparatus 200 connected to the print apparatus 100 can execute sheet processing for sheets printed by the print apparatus 100. It is also possible to form the printing system 1000 from only the print apparatus 100 without connecting the sheet processing apparatus 200.

The sheet processing apparatus 200 can communicate with the print apparatus 100, and execute sheet processing (to be described later) upon receiving an instruction from the print apparatus 100. A scanner unit 201 scans an image on a document, converts the image into image data, and transfers the image data to another unit. An external I/F 202 exchanges data with other apparatuses connected to the network 101. A printer unit 203 prints an image based on input image data on a sheet. An operation unit 204 has a hard key input unit (key input unit) 402 and touch panel unit 401 (to be described later), and accepts an instruction from the user via them. The operation unit 204 provides various displays on its touch panel.

A control unit 205 comprehensively controls the processes and operations of various units and the like in the printing system 1000. The control unit 205 also controls the operation of the print apparatus 100 and that of the sheet processing apparatus 200 connected to the print apparatus 100. A ROM 207 stores various computer programs to be executed by the control unit 205. For example, the ROM 207 stores programs to cause the control unit 205 to execute various processes of flowcharts to be described later, and display control programs necessary to display various setup windows to be described later. The ROM 207 further stores a program to cause the control unit 205 to interpret PDL (Page Description Language) code data received from the PC 103, PC 104, or the like and expand the PDL code data into raster image data. In addition, the ROM 207 stores a boot sequence, font information, and the like. A RAM 208 stores image data sent from the scanner unit 201 and external I/F 202, various programs loaded from the ROM 207, and setting information. The RAM 208 also stores information on the sheet processing apparatus 200 (e.g., information on the number of (0 to n) sheet processing apparatuses 200 connected to the print apparatus 100, information on the function of each sheet processing apparatus 200, or the connection order of the sheet processing apparatuses 200).

An HDD (Hard Disk Drive) 209 includes a hard disk, and a drive unit which reads/writes data from/in the hard disk. The HDD 209 is a large-capacity storage device which stores image data input from the scanner unit 201 and external I/F 202 and compressed by a compression/decompression unit 210. The control unit 205 can cause the printer unit 203 to print image data stored in the HDD 209 on the basis of an instruction from the user. The control unit 205 can also transmit image data stored in the HDD 209 to an external apparatus such as the PC 103 via the external I/F 202 on the basis of an instruction from the user.

The compression/decompression unit 210 compresses/decompresses image data and the like stored in the RAM 208 and HDD 209 in accordance with various compression schemes such as JBIG and JPEG.

Figure 3:
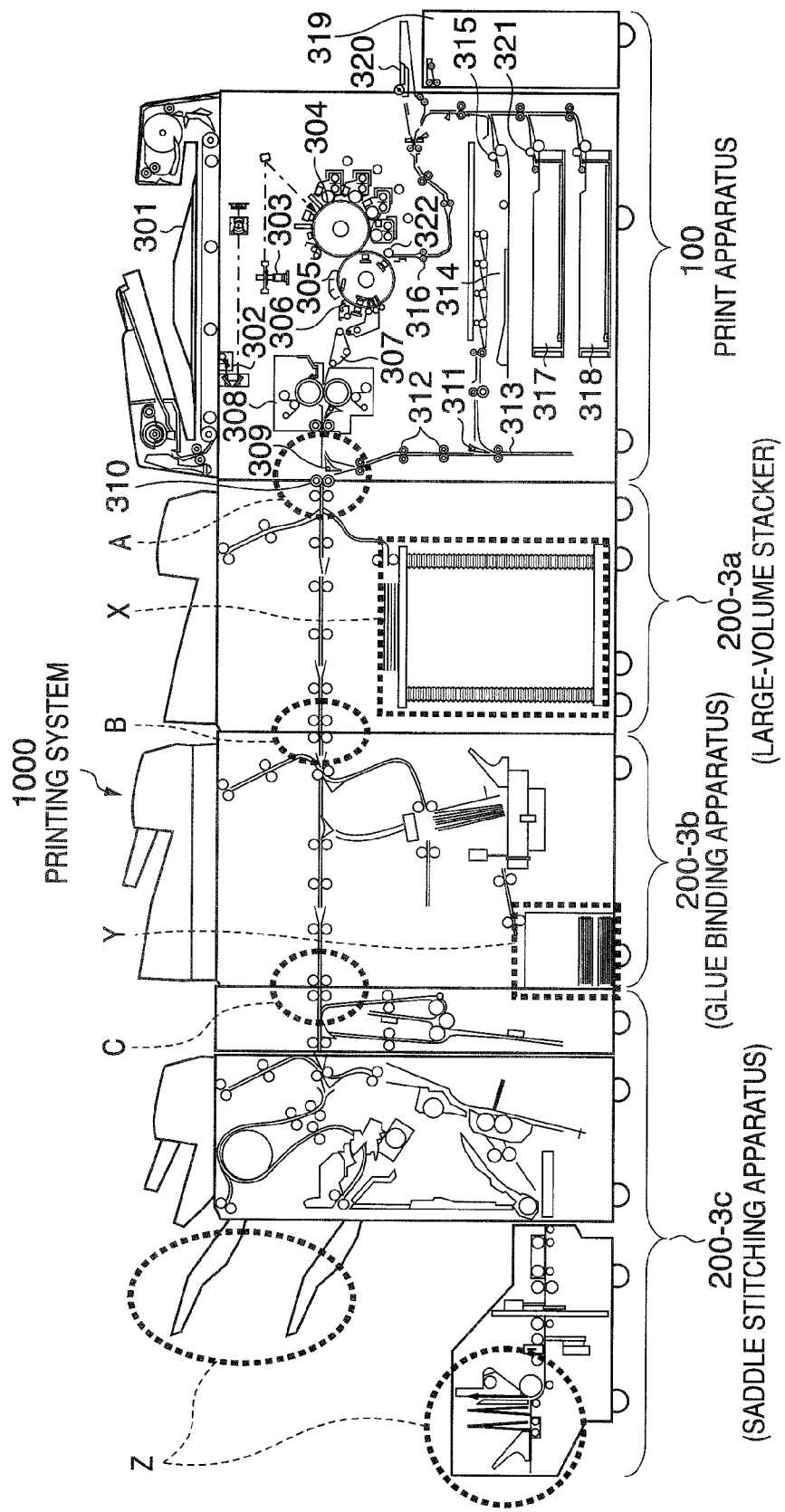
FIG. 3 is a sectional view for explaining an example of the configuration of the printing system 1000.

The configuration of the printing system 1000 will be explained with reference to FIG. 3. FIG. 3 is a sectional view of the print apparatus 100 and the sheet processing apparatus 200 connected to it.

An auto document feeder (ADF) 301 separates a document bundle on the support surface of the document tray sequentially in the order of pages from the first document sheet, and feeds each document sheet to the glass document table in order to scan the document sheet by a scanner 302.

The scanner 302 scans the image of the document sheet fed onto the glass document table, and converts the image into image data by a CCD. A rotary polygon mirror 303 receives a light ray (e.g., a laser beam) modulated in accordance with the image data, and irradiates a photosensitive drum 304 with the light ray as a reflected scan beam via a reflecting mirror. A latent image formed by the laser beam on the photosensitive drum 304 is developed with toner, and the toner image is transferred onto a sheet material on a transfer drum 305. A series of image forming processes are executed sequentially with yellow (Y), magenta (M), cyan (C), and black (K) toners, forming a full-color image. After four image forming processes, the sheet material bearing the full-color image is separated by a separation gripper 306 from the transfer drum 305, and conveyed to a fixing unit 308 by a pre-fixing conveyor 307. The fixing unit 308 has a combination of rollers and belts, and incorporates a heat source such as a halogen heater. The fixing unit 308 fuses and fixes, by heat and pressure, toner on a sheet material bearing a toner image. A delivery flapper 309 is swingable about the swing shaft, and regulates the sheet material conveyance direction. When the delivery flapper 309 swings clockwise in FIG. 3, a sheet material is conveyed straight, and discharged outside the apparatus by delivery rollers 310.

The control unit 205 controls the print apparatus 100 to execute single-sided printing according to this sequence.

To form images on the two surfaces of a sheet material, the delivery flapper 309 swings counterclockwise in FIG. 3, and the course of the sheet material changes downward to supply the sheet material to the double-sided conveyor. The double-sided conveyor has a reverse flapper 311, reverse rollers 312, a reverse guide 313, and a double-sided tray 314. The reverse flapper 311 swings about the swing shaft, and regulates the sheet material conveyance direction. To process a double-sided print job, the control unit 205 controls to swing the reverse flapper 311 counterclockwise in FIG. 3 and supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314. The double-sided tray 314 temporarily supports the sheet material, and a refeed roller 315 supplies the sheet material again to registration rollers 316. At this time, the sheet material is sent while a surface opposite to the first surface in the transfer process faces the photosensitive drum. The second image is formed on the second surface of the sheet by the same process as that described above. After the images are formed on the two surfaces of the sheet material, the sheet undergoes the fixing process and is discharged outside from the main body of the print apparatus 100 via the delivery rollers 310. The control unit 205 controls the print apparatus 100 to execute double-sided printing according to this sequence.

The print apparatus 100 comprises a paper feed section which stores sheets necessary for print processing. The paper feed section has paper feed cassettes 317 and 318 (each capable of storing, e.g., 500 sheets), a paper feed deck 319 (capable of storing, e.g., 5,000 sheets), and a manual feed tray 320. The paper feed cassettes 317 and 318 and the paper feed deck 319 allow setting sheets of different sizes and materials discriminatively in the respective paper feed units. The manual feed tray 320 also allows setting various sheets including a special sheet such as an OHP sheet. The paper feed cassettes 317 and 318, the paper feed deck 319, and the manual feed tray 320 respectively have paper feed rollers, which successively feed sheets one by one.

The sheet processing apparatuses 200 shown in FIG. 3 will be explained.

In the printing system 1000 according to the embodiment, an arbitrary number of sheet processing apparatuses 200 of arbitrary types are connectable as long as they can convey a sheet from an upstream apparatus to a downstream apparatus via the sheet feeding path. For example, as shown in FIG. 3, a large-volume stacker 200-3a, glue binding apparatus 200-3b, and saddle stitching apparatus 200-3c are connected in the order named closer from the print apparatus 100, and selectively available in the printing system 1000. Each sheet processing apparatus 200 has a sheet discharge portion, and the user can take out a processed sheet from the sheet discharge portion of the sheet processing apparatus.

The control unit 205 accepts, together with a print execution request via the operation unit 204, a request to execute sheet processing of a type desired by the user among sheet processing candidates of types executable by the sheet processing apparatuses 200 connected to the print apparatus 100. Upon accepting a print execution request for a target job from the user via the operation unit 204, the control unit 205 causes the printer unit 203 to execute print processing necessary for the job. The control unit 205 controls to convey printed sheets of the job via the sheet feeding path to a sheet processing apparatus capable of executing sheet processing desired by the user. Then, the control unit 205 causes the sheet processing apparatus to execute the sheet processing.

Assume that a target job whose print execution request is accepted from the user requires large-volume stacking processing by the large-volume stacker 200-3a when the printing system 1000 has a system configuration shown in FIG. 3. This job is called a "stacker job".

When processing the stacker job in the system configuration of FIG. 3, the control unit 205 controls to convey sheets of the job printed by the print apparatus 100 into the large-volume stacker 200-3a via point A in FIG. 3. Then, the control unit 205 causes the large-volume stacker 200-3a to stack the sheets of the job. The control unit 205 causes the large-volume stacker 200-3a to hold the printed materials of the job stacked in the large-volume stacker 200-3a at delivery destination X inside the large-volume stacker 200-3a without conveying them to another apparatus (e.g., a succeeding apparatus).

The user can directly take out, from delivery destination X, the printed materials of the stacker job held at delivery destination X in FIG. 3. This can omit a series of apparatus operations and user operations to convey sheets to the most downstream delivery destination Z in the sheet conveyance direction in FIG. 3 and take out the printed materials of the stacker job from delivery destination Z.

Assume that a target job whose print execution request is accepted from the user requires sheet processing (e.g., either glue binding of case binding and pad binding) by the glue binding apparatus 200-3b in the system configuration of FIG. 3. This job is called a "glue binding job".

When processing the glue binding job in the system configuration of FIG. 3, the control unit 205 controls to convey sheets printed by the print apparatus 100 into the glue binding apparatus 200-3b via points A and B in FIG. 3. Then, the control unit 205 causes the glue binding apparatus 200-3b to bind the sheets of the job with glue. The control unit 205 causes the glue binding apparatus 200-3b to hold the printed materials of the job glue-bound by the glue binding apparatus 200-3b at delivery destination Y inside the glue binding apparatus 200-3b without conveying them to another apparatus (e.g., a succeeding apparatus).

Assume that a target job whose print execution request is accepted from the user requires sheet processing by the saddle stitching apparatus 200-3c in the system configuration of FIG. 3. The sheet processing by the saddle stitching apparatus 200-3c includes, e.g., saddle stitching, punching, cutting, shift delivery, and folding. This job is called a "saddle stitching job".

When processing the saddle stitching job by the system configuration in FIG. 3, the control unit 205 controls to convey sheets of the job printed by the print apparatus 100 into the saddle stitching apparatus 200-3c via points A, B, and C. Then, the control unit 205 causes the saddle stitching apparatus 200-3c to process the sheets of the job. The control unit 205 causes the saddle stitching apparatus 200-3c to hold the printed materials of its saddle stitching job at delivery destination Z in the saddle stitching apparatus 200-3c.

Delivery destination Z has a plurality of delivery destination candidates. This is because the saddle stitching apparatus 200-3c can execute a plurality of types of sheet processes and the delivery destination changes in each sheet process.

As described with reference to FIGS. 1 to 3, the printing system 1000 according to the embodiment allows connecting a plurality of sheet processing apparatuses to the print apparatus 100. These sheet processing apparatuses can be arbitrarily combined and connected to the print apparatus 100. The connection order of the sheet processing apparatuses can be freely changed as long as the sheet feeding paths of the apparatuses link with each other. There are a plurality of types of sheet processing apparatus candidates connectable to the print apparatus 100.

The internal structures of the sheet processing apparatuses 200 connectable to the print apparatus 100 will be explained for each type with reference to FIGS. 4 to 6.

The internal structure of the large-volume stacker applicable as the sheet processing apparatus 200 will be explained with reference to the sectional view shown in FIG. 4. The large-volume stacker conveys a sheet from an upstream apparatus selectively to one of three feeding paths: a sample tray path, stack path, and straight path.

The stack path in the large-volume stacker is a sheet feeding path for conveying sheets to the stack tray. The stack tray in FIG. 4 is a stacking unit mounted on an extensible stay. A demountable truck supports the extensible stay from below it. With the truck, the operator can carry sheets stacked on the stack tray.

Assume that the control unit 205 accepts a request from the user via the operation unit 204 to execute a job set to perform sheet stacking processing by the large-volume stacker. In this case, the control unit 205 conveys sheets printed by the print apparatus 100 to the stack path of the large-volume stacker, and delivers them to the stack tray via the stack path.

Figure 4:
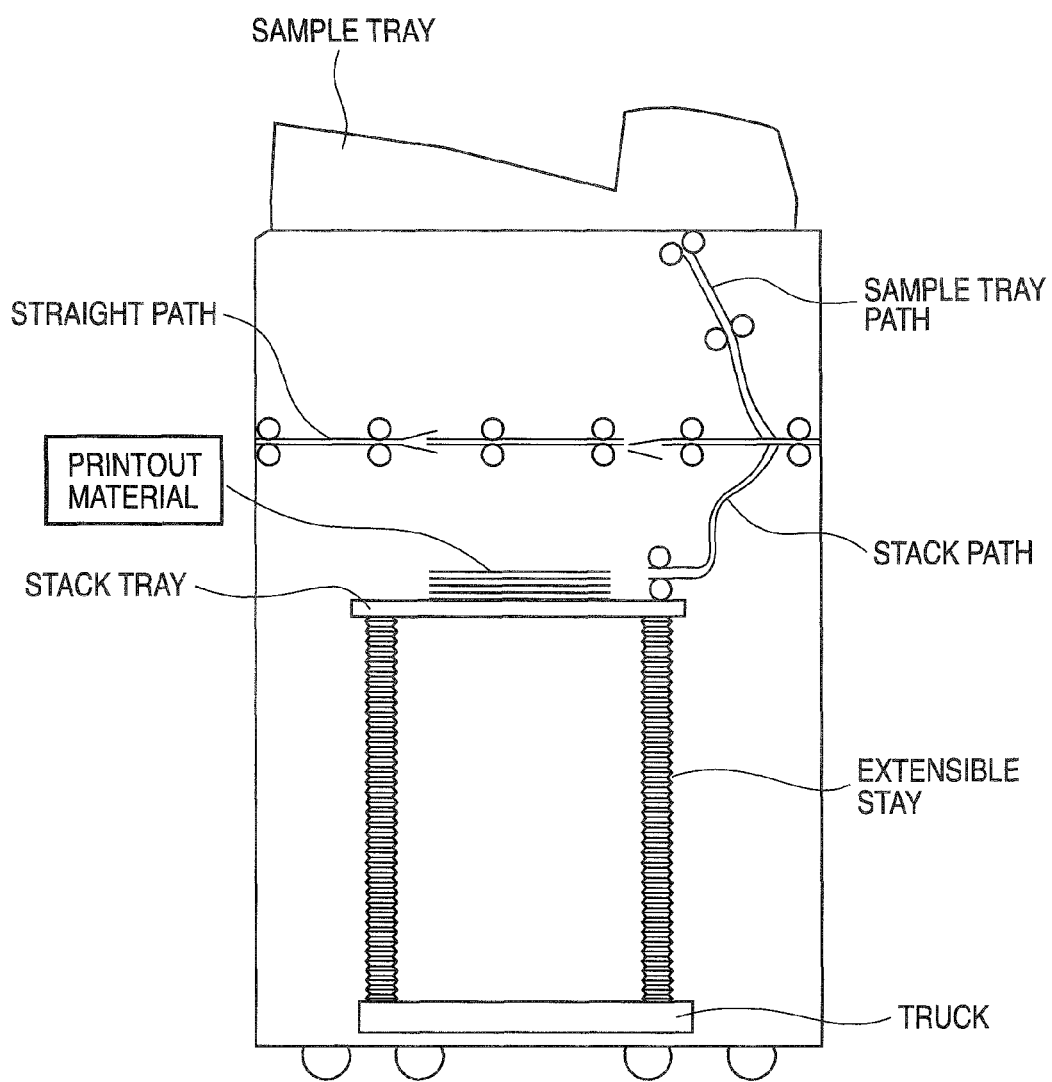
FIG. 4 is a sectional view showing an example of the internal structure of a large-volume stacker.

The straight path of the large-volume stacker shown in FIG. 4 is a sheet feeding path for conveying, to a succeeding apparatus, sheets of a job requiring no sheet stacking processing using the stack tray of the large-volume stacker.

The sample tray path is a sheet feeding path for discharging sheets to the sample tray. The sample tray path is used to easily take out an output material from the stack tray when performing, e.g., work requiring a check on an output. In this case, for example, the control unit 205 causes the large-volume stacker to convey sheets printed by the print apparatus 100 to the sample tray path, and discharge them onto the sample tray.

A plurality of sheet sensors necessary to detect the sheet conveyance status and jam are arranged on the sheet feeding path in the large-volume stacker.

The CPU (not shown) of the large-volume stacker notifies the control unit 205 of sheet detection information from each sensor via a signal line for data communication. Based on the information from the large-volume stacker, the control unit 205 grasps the sheet conveyance status and jam in the large-volume stacker. When another sheet processing apparatus is connected between the large-volume stacker and the print apparatus 100, the CPU (not shown) of the sheet processing apparatus notifies the control unit 205 of sensor information of the large-volume stacker.

The internal structure of the glue binding apparatus will be explained with reference to the sectional view shown in FIG. 5.

The glue binding apparatus conveys a sheet from an upstream apparatus selectively to one of three feeding paths: a cover path, main body path, and straight path. The glue binding apparatus also has an inserter path. The inserter path is a sheet feeding path for conveying a sheet on the insertion tray to the cover path.

Figure 5:
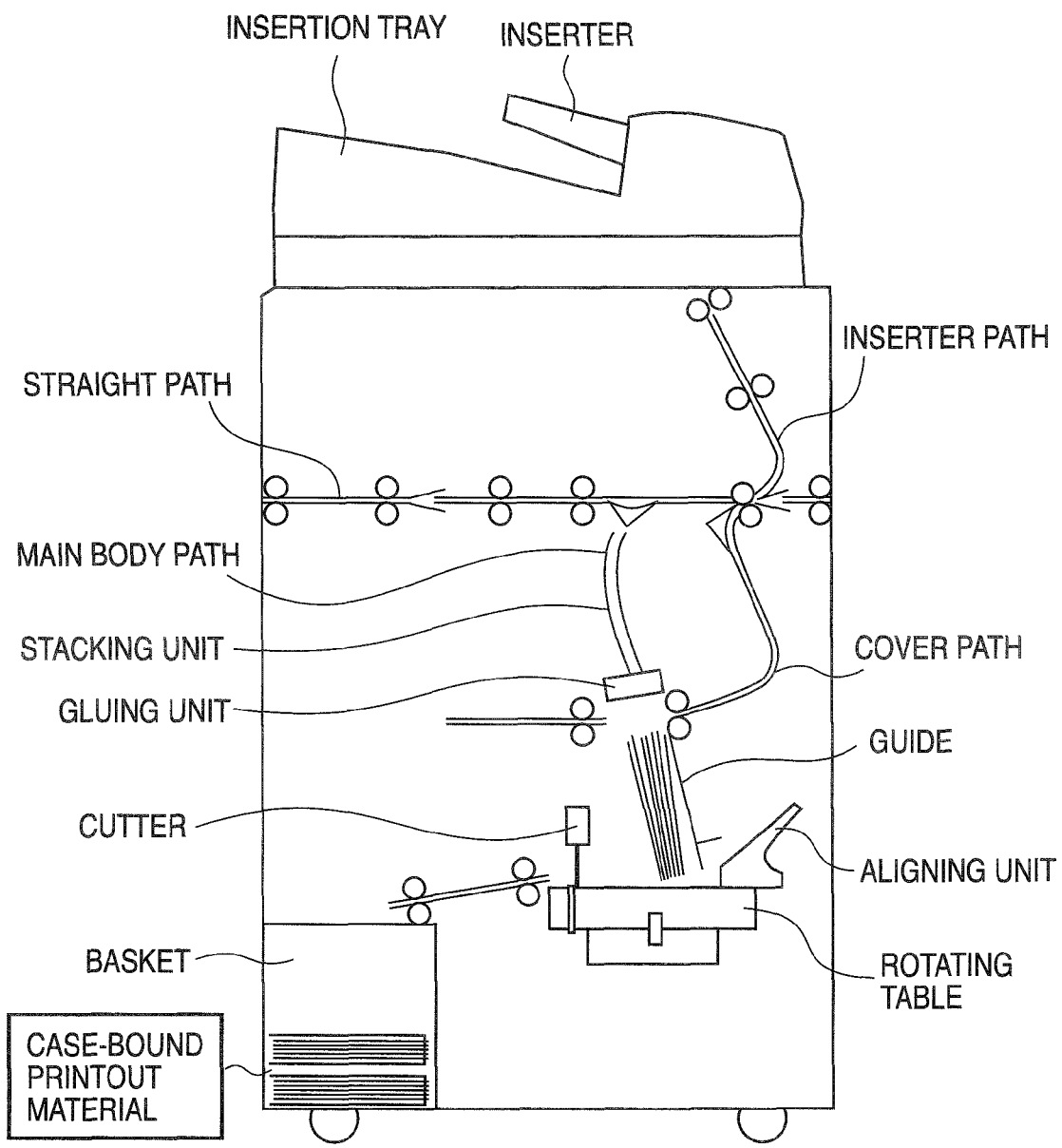
FIG. 5 is a sectional view showing an example of the internal structure of a glue binding apparatus.

The straight path of the glue binding apparatus in FIG. 5 is a sheet feeding path for conveying, to a succeeding apparatus, sheets of a job requiring no glue binding by the glue binding apparatus.

The main body path and cover path of the glue binding apparatus shown in FIG. 5 are sheet feeding paths for conveying sheets necessary to create case-bound printed materials.

For example, when creating case-bound printed materials using the glue binding apparatus, the control unit 205 causes the printer unit 203 to print image data of the body on sheets serving as the body of the case-bound printed materials. Case-bound printed materials of one booklet are created by wrapping a bundle of body sheets for one booklet with one cover. The body sheet bundle in case binding will be called a "main body".

The control unit 205 controls to convey sheets printed by the print apparatus 100 to the main body path shown in FIG. 5. In case binding, the control unit 205 causes the glue binding apparatus to wrap the main body printed by the print apparatus 100 with a cover sheet conveyed via the cover path.

For example, the control unit 205 causes the glue binding apparatus to sequentially stack main body sheets conveyed from an upstream apparatus on the stacking unit via the main body path in FIG. 5. After stacking sheets bearing body data on the stacking unit by the number of sheets of one booklet, the control unit 205 controls to convey one cover sheet necessary for the job via the cover path. The control unit 205 controls a gluing unit in FIG. 5 to glue the spine of the sheet bundle of one set corresponding to the main body. Then, the control unit 205 controls the gluing unit to bond the spine of the main body to the center of the cover. In bonding the main body to the cover, the main body is conveyed and pushed down in the apparatus. As a result, the cover is folded to wrap the main body with one cover. The sheet bundle of one set is stacked on a rotating table in FIG. 5 along the guide.

After the sheet bundle of one set is set on the rotating table in FIG. 5, the control unit 205 causes a cutter in FIG. 5 to cut the sheet bundle. At this time, the cutter can execute three-side cutting processing to cut three edges of the sheet bundle of one set other than an edge serving as the spine.

The control unit 205 uses an aligning unit to push the sheet bundle having undergone three-side cutting processing toward a basket, putting the sheet bundle into the basket.

The internal structure of the saddle stitching apparatus will be explained with reference to the sectional view shown in FIG. 6.

The saddle stitching apparatus comprises various units for selectively executing stapling, cutting, punching, folding, shift delivery, saddle stitching, and the like for sheets from the print apparatus 100. The saddle stitching apparatus does not have a straight path for conveying sheets to a succeeding apparatus. For this reason, the saddle stitching apparatus is connected last, as shown in FIG. 3, when connecting a plurality of sheet processing apparatuses to the print apparatus 100.

Figure 6:
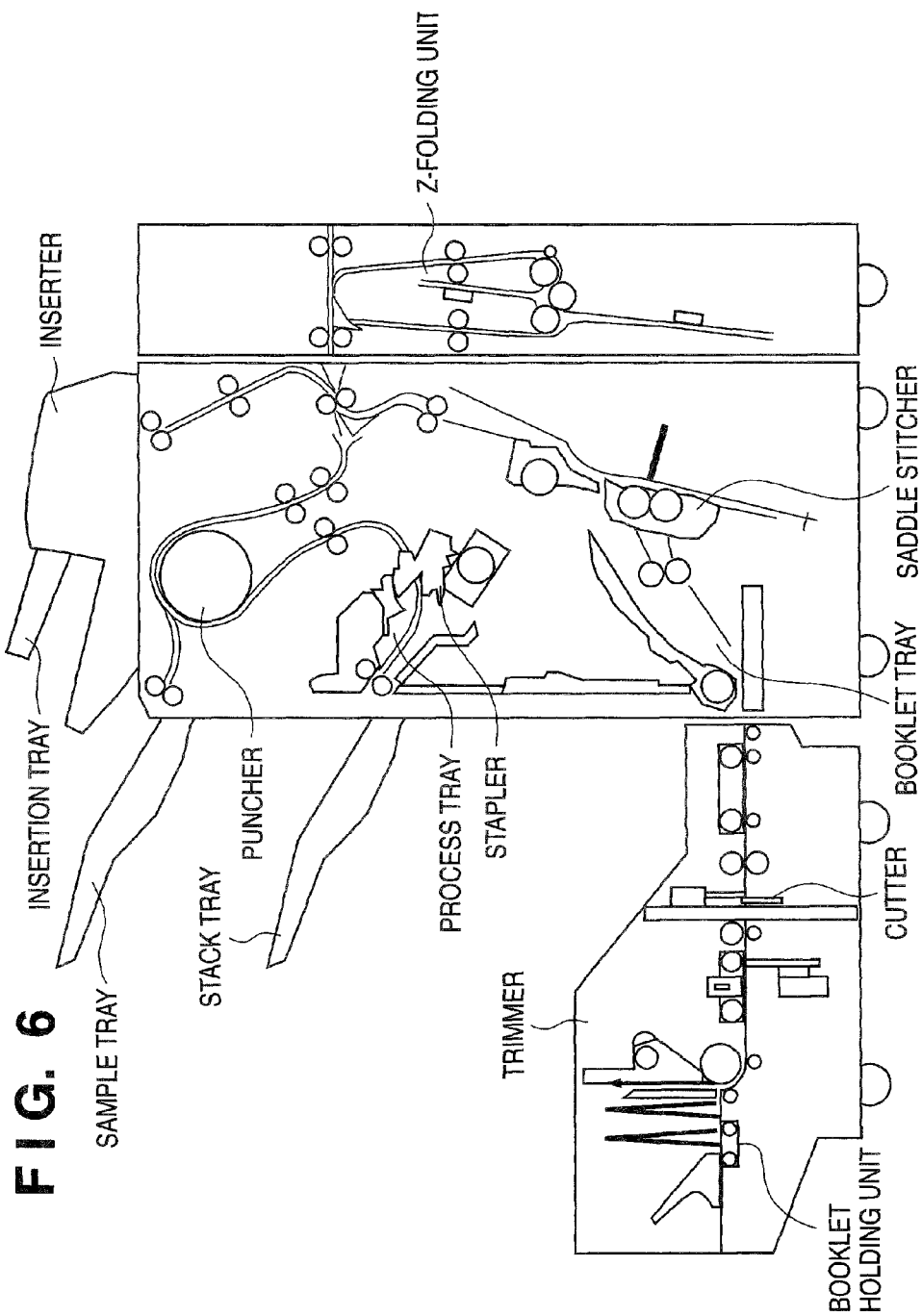
FIG. 6 is a sectional view showing an example of the internal structure of a saddle stitching apparatus.

As shown in FIG. 6, the saddle stitching apparatus has a sample tray and stack tray outside the apparatus, and a booklet tray inside the apparatus.

Upon accepting an instruction to staple sheets by the saddle stitching apparatus, the control unit 205 causes the saddle stitching apparatus to sequentially stack sheets printed by the print apparatus 100 on the process tray inside the saddle stitching apparatus. After stacking sheets of one bundle on the process tray, the control unit 205 causes a stapler to staple them. The control unit 205 causes the saddle stitching apparatus to discharge the stapled sheet bundle from the process tray to the stack tray in FIG. 6.

When executing a job for which the control unit 205 accepts an instruction to Z-fold sheets by the saddle stitching apparatus, the control unit 205 causes a Z-folding unit to Z-fold sheets printed by the print apparatus 100. The control unit 205 controls to make the folded sheets pass through the saddle stitching apparatus and deliver them onto a discharge tray such as the stack tray or sample tray.

Upon accepting an instruction to perform punching by the saddle stitching apparatus, the control unit 205 causes a puncher to punch sheets printed by the print apparatus 100. The control unit 205 controls to make the punched sheets pass through the saddle stitching apparatus and deliver them onto a discharge tray such as the stack tray or sample tray.

When executing a job for which the control unit 205 accepts an instruction to saddle-stitch sheets by the saddle stitching apparatus, the control unit 205 causes a saddle stitcher to stitch a bundle of sheets by one set at two center portions. The control unit 205 causes the saddle stitcher to clamp the sheet bundle at the center by rollers and fold the sheets into two at the center, thereby creating a booklet such as a brochure. The sheet bundle saddle-stitched by the saddle stitcher is conveyed onto the booklet tray.

Upon accepting a cutting instruction for a job for which the control unit 205 accepts an instruction to saddle-stitch sheets, the control unit 205 controls to convey a saddle-stitched sheet bundle from the booklet tray to a trimmer. The control unit 205 causes a cutter to cut the sheet bundle conveyed to the trimmer, and a booklet holding unit to hold the sheet bundle. The saddle stitching apparatus in FIG. 6 can also cut three edges of a saddle-stitched sheet bundle.

When the saddle stitching apparatus does not have any trimmer, the user can take out a sheet bundle bound by the saddle stitcher from the booklet tray.

The saddle stitching apparatus can also attach a sheet (e.g., a cover sheet printed in advance) set on the insertion tray in FIG. 6 to a sheet (printed by the print apparatus 100) conveyed from the print apparatus 100.

The arrangement of the operation unit 204 will be described with reference to FIG. 7.

The operation unit 204 comprises the touch panel unit 401 and key input unit 402. The touch panel unit 401 is formed from an LCD (Liquid Crystal Display) and a transparent electrode adhered onto the LCD, and displays various setup windows for accepting an instruction from the user. The touch panel unit 401 has both a function of displaying various windows and an instruction input function of accepting an instruction from the user. The key input unit 402 comprises a power key 501, start key 503, stop key 502, user mode key 505, and ten-key pad 506. The start key 503 is used to cause the print apparatus 100 to execute a copy job and send job. The ten-key pad 506 is used to set a numerical value such as the number of copies.

The control unit 205 controls the printing system 1000 to perform various processes based on user instructions accepted via various windows displayed on the touch panel unit 401 and user instructions accepted via the key input unit 402.

Figure 7:
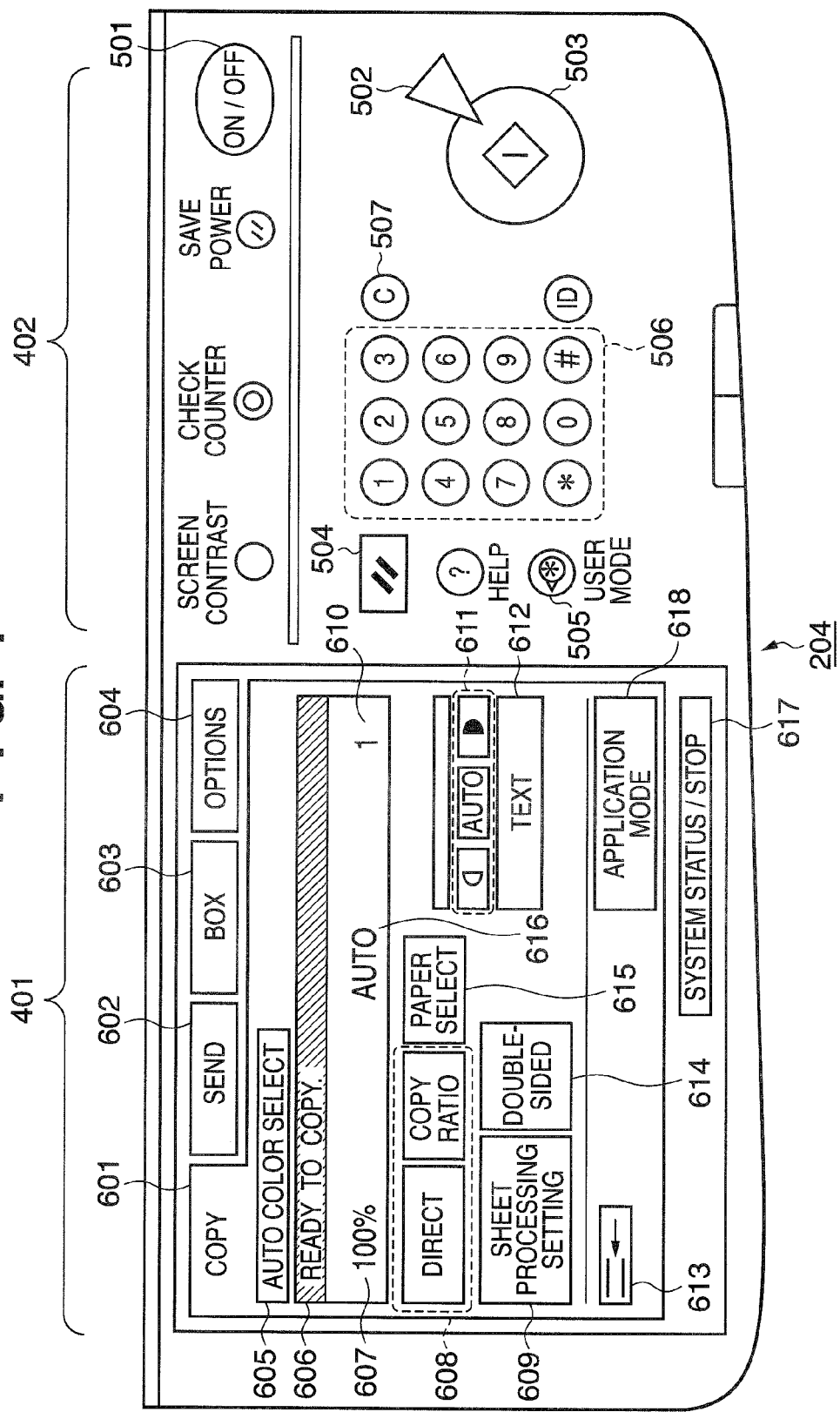
FIG. 7 is a view showing an example of an operation unit 204.
Figure 8:
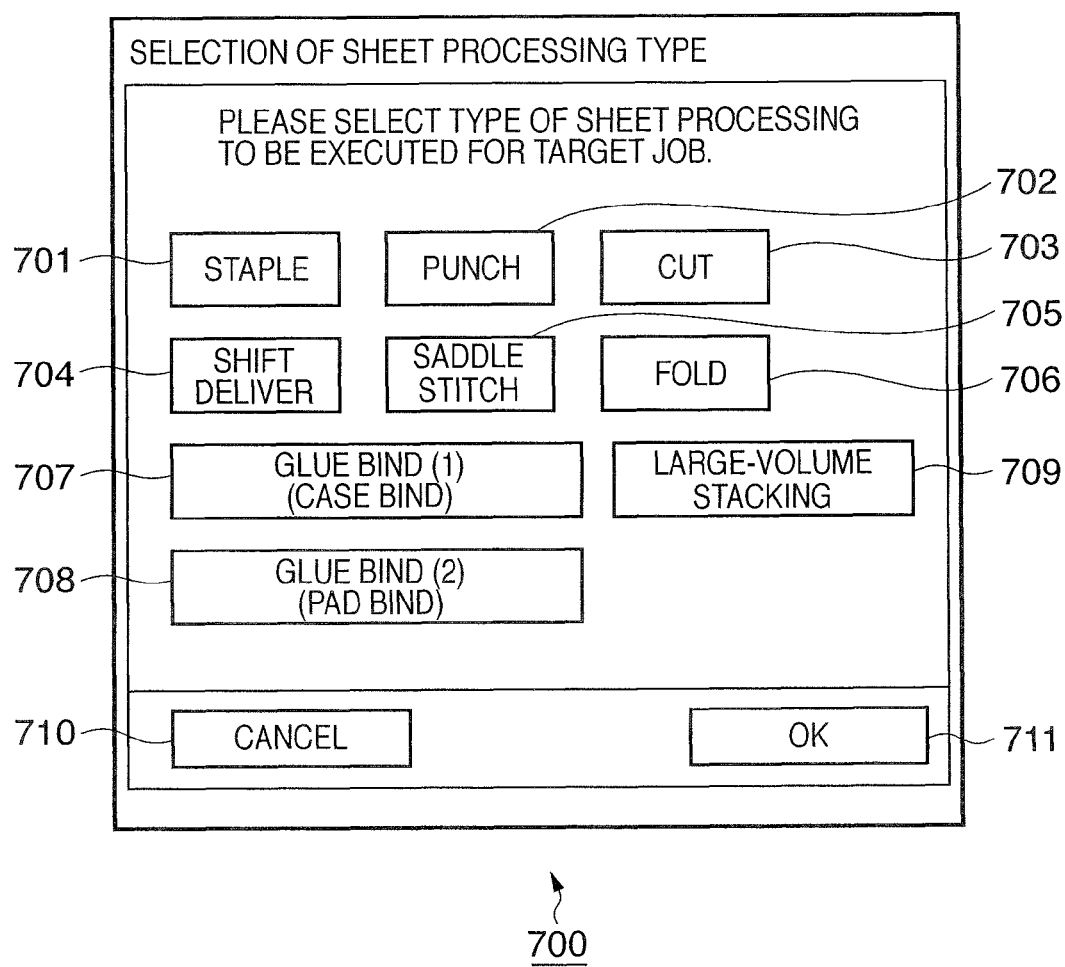
FIG. 8 is a view showing an example of a user interface window.

FIG. 8 is a view showing a display example of a setup window for prompting the user to select the type of sheet processing to be executed for sheets printed by the print apparatus 100. When the user presses a sheet processing setting key 609 shown in FIG. 7 in the window displayed on the touch panel unit 401, the control unit 205 causes the touch panel unit 401 to display the window in FIG. 8. The window in FIG. 8 is a setup window which allows the user to select the type of sheet processing executable by the sheet processing apparatus 200 in the printing system 1000. The control unit 205 accepts, from the user via the window in FIG. 8, settings of sheet processing to be executed for a target job, and causes the sheet processing apparatus 200 to execute the sheet processing according to the settings.

Figure 9:
FIG. 9 is a view showing an example of a user interface window.

A window shown in FIG. 9 is a setup window which allows the user to register information for specifying the number, types, and connection order of sheet processing apparatuses connected to the print apparatus 100 in the case where the sheet processing apparatuses 200 are connected to the print apparatus 100. When the user presses the user mode key 505, the control unit 205 controls the touch panel unit 401 to display the window shown in FIG. 9.

For example, when the printing system 1000 has the system configuration as shown in FIG. 3, the user sets registration information that three sheet processing apparatuses, i.e., the large-volume stacker, glue binding apparatus, and saddle stitching apparatus are connected to the print apparatus 100 sequentially from the large-volume stacker, as shown in FIG. 9. The control unit 205 causes the RAM 208 to hold, as system configuration information, the information on the sheet processing apparatuses 200 that is set by the user via the window in FIG. 9. The control unit 205 properly reads out and refers to the system configuration information. From the system configuration information, the control unit 205 confirms the number, types, and connection order of sheet processing apparatuses connected to the print apparatus 100.

Assume that the user makes a setting in the window of FIG. 9 to connect the saddle stitching apparatus having no straight path between sheet processing apparatuses. In this case, the control unit 205 causes the touch panel unit 401 to present an error display and notify the user that the setting is invalid. Further, as shown in FIG. 9, the control unit 205 causes the touch panel unit 401 to display guidance information and notify the user of canceling this setting and connecting the saddle stitching apparatus last.

Figure 10:
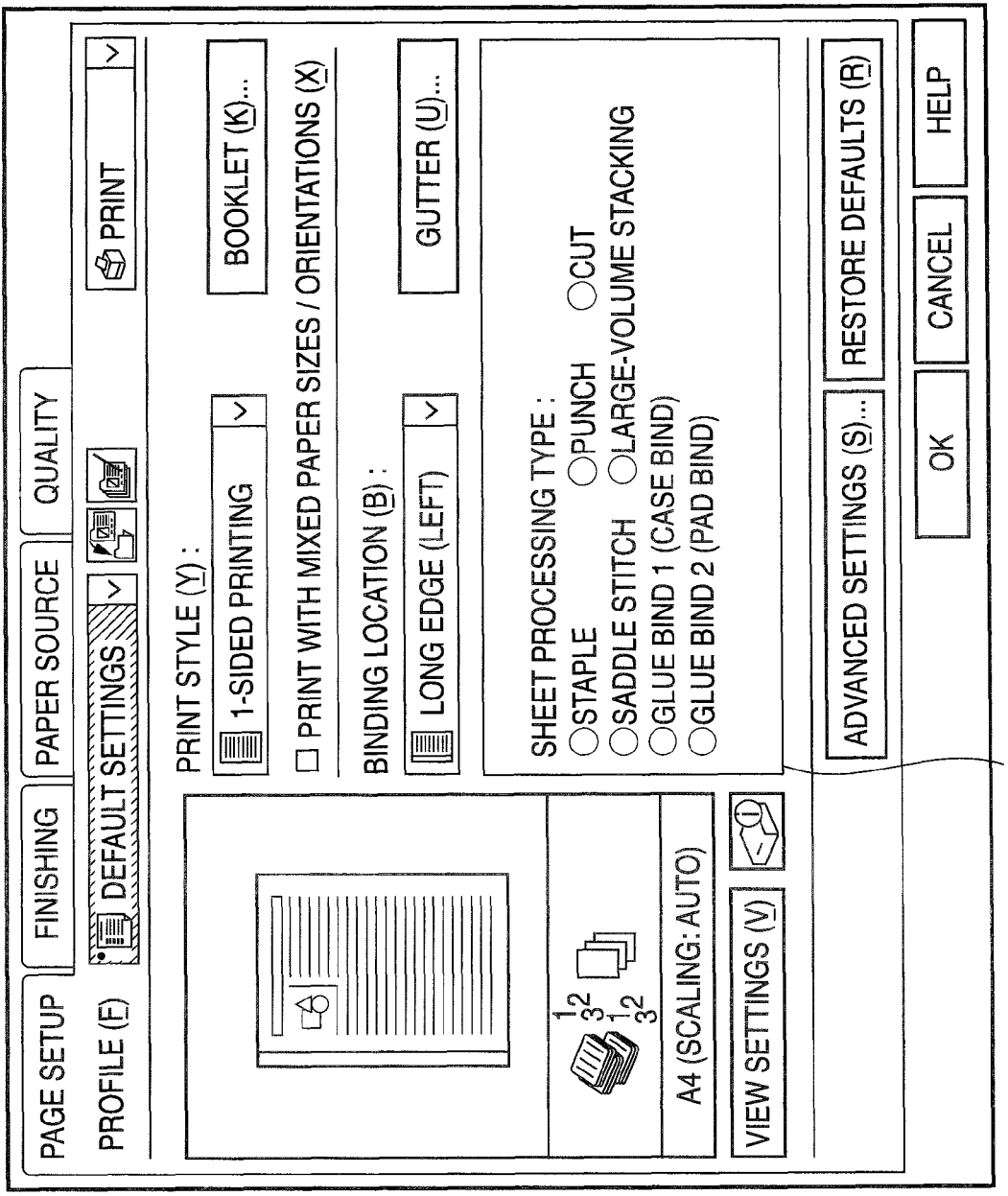
FIG. 10 is a view showing an example of a user interface window.

The embodiment exemplifies the operation unit 204 of the print apparatus 100 as an example of a user interface unit applied to the printing system 1000, but another user interface unit is also available. For example, the printing system 1000 may execute processing based on an instruction from the user interface unit of an external apparatus such as the PC 103 or PC 104. When the external apparatus remote-controls the printing system 1000, the display unit of the external apparatus displays a setup window relevant to the printing system 1000, as shown in FIG. 10. This will be exemplified using the PC 104. FIG. 10 shows an example of a window on the display of the PC 104.

Upon accepting a print request from the user, the CPU of the PC 104 causes the display to present the window as shown in FIG. 10. The CPU accepts the settings of print processing conditions from the user of the PC 104 via the window. For example, the CPU of the PC 104 accepts, from the user via a setting field 1702, the type of sheet processing to be executed by the sheet processing apparatus 200 for a print job subjected to a print execution request. Upon accepting the print execution request in response to a press of an OK key in FIG. 10, the CPU of the PC 104 associates the print processing conditions accepted via the window with image data to be printed. The CPU of the PC 104 controls to transmit the resultant data as one job to the printing system 1000 via the network 101.

In the printing system 1000, the control unit 205 accepts the print execution request of the job via the external I/F 202. Then, the control unit 205 controls the printing system 1000 to process the job from the PC 104 on the basis of the print processing conditions from the PC 104.

In this manner, various units are available as the user interface of the printing system 1000.

Various control operations executed for the printing system 1000 by the control unit 205 serving as an example of the control unit of the embodiment will be described.

The printing system 1000 comprises the print apparatus 100 having the printer unit 203 capable of executing print processing of data in the HDD 209 capable of storing data of jobs. The printing system 1000 is configured to connect the print apparatus 100 and a plurality of sheet processing apparatuses 200. Each of the sheet processing apparatuses 200 connectable to the print apparatus 100 can execute sheet processing (also called finishing or post-processing) for sheets (also called printed materials or print media) of a job printed by the printer unit 203. Each sheet processing apparatus 200 allows the operator to take out a printed material having undergone sheet processing by the apparatus 200. The printing system 1000 according to the embodiment can selectively supply job sheets printed by the printer unit 203 from the printer unit 203 to the sheet processing apparatuses 200.

The printing system 1000 has a test print function (also called a test copy function). The printing system 1000 has a check print function different from the test print function. The control unit 205 controls the printing system 1000 to selectively execute the operations of these two functions on the basis of an instruction from the operator via the user interface unit (UI unit) for each target job.

Although the printing system 1000 according to the embodiment has these two functions, the embodiment is also applicable to a configuration having only the check print function.

An operation by the test print function will be described first.

Assume that the operator sets "50" copies with the ten-key pad 506 as the number of copies for a target job while the touch panel unit 401 executes the display in FIG. 7. Also assume that the operator sets "staple" by pressing a key 701 in the display of FIG. 8 as a setting of finishing (synonymous with sheet processing and post-processing). This job is a "job requiring printing of 50 copies and stapling". In this manner, the target job is a "job requiring printing of copies and requiring finishing". In this case, the control unit 205 permits execution of the test copy operation for the job, and controls the operation unit 204 so that the operator can decide whether to execute the test copy operation via the window in FIG. 11A.

Figure 11A:
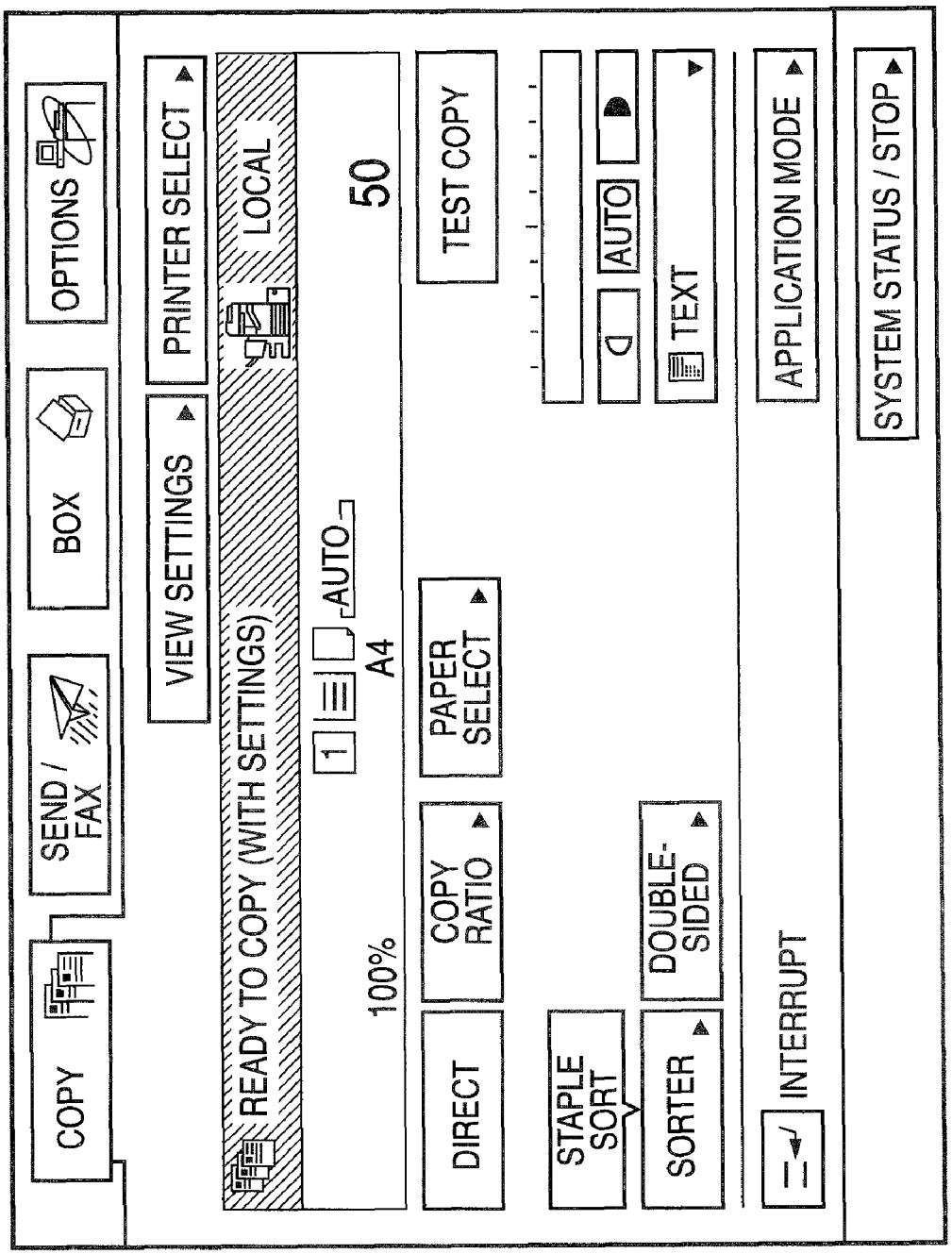
FIG. 11A is a view for explaining a control example associated with the operation unit 204.

As shown in FIG. 11A, the control unit 205 controls the touch panel unit 401 to present display contents reflecting the fact that the operator has already set the above-described two setting items. In addition, as shown in FIG. 11A, the control unit 205 causes the touch panel unit 401 to enable the "test copy" button (soft key) which allows the operator to designate test copy (test print) for the job. When the operator presses the active test copy button, the operation unit 204 notifies the control unit 205 of the information. The control unit 205 determines that it has accepted a test copy operation execution request from the operator for the job, and processes the job as one requiring the test copy operation.

When the target job is not a "job requiring printing of copies and requiring execution of finishing", the control unit 205 inhibits the printing system 1000 from executing the test copy operation for the job. In this case, the control unit 205 inhibits the touch panel unit 401 from enabling the "test copy" button. The touch panel unit 401 hatches or grays out the "test copy" button. Alternatively, the control unit 205 inhibits the display of the button (controls to hide the button). By this operation, the control unit 205 inhibits acceptance of a test copy operation execution request from the operator for the job.

Assume that the target job is a "job requiring printing of copies and requiring execution of finishing", but the job is being printed. In this case, the control unit 205 inhibits acceptance of a test copy operation execution request from the operator for the job, and inhibits the printing system 1000 from executing the test copy operation for the job. To the contrary, assume that the target job is not being printed. In this case, the control unit 205 permits acceptance of a test copy operation execution request from the operator for the job, and permits the printing system 1000 to execute the test copy operation for the job. The timing when acceptance of the test copy operation execution request is permitted is before the print operation of the job starts, and before the HDD 209 stores print data of the job.

Details of control related to the test copy function of the printing system 1000 will be explained.

[Control Related to Test Copy Function of Printing System 1000]

Figure 12A:
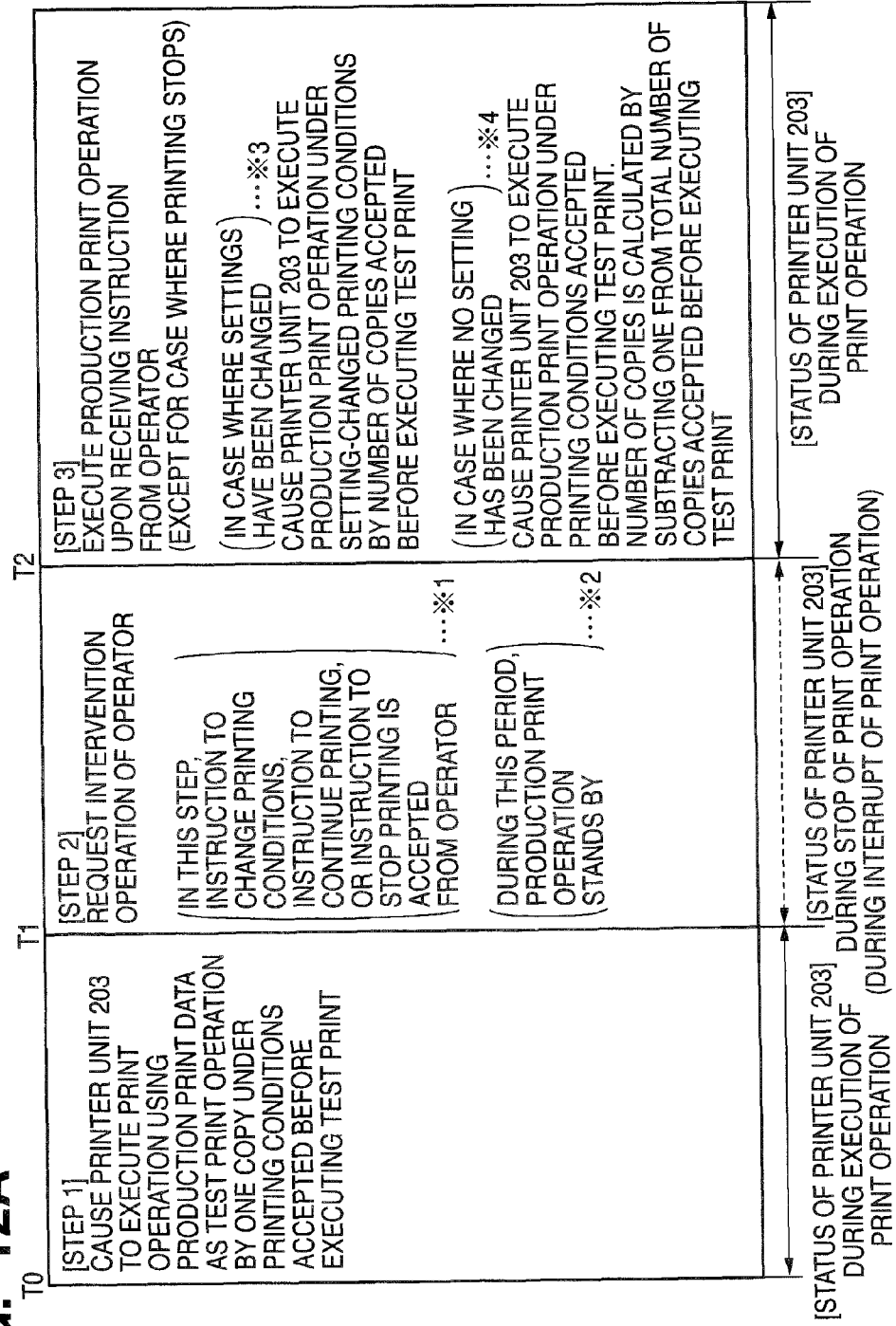
FIG. 12A is a timing chart for explaining a control example associated with the printing system 1000.

FIG. 12A is a timing chart illustrating the control sequence of the test copy function executed by the control unit 205 using T0 as a base point.

Assume that the operator presses the "test copy" button in FIG. 11A displayed on the touch panel unit 401 under the control of the control unit 205. In response to this, the control unit 205 causes the touch panel unit 401 to execute a display shown in FIG. 11B.

The display in FIG. 11B allows the operator to designate the type of test copy to be executed by the printing system 1000 as the test copy operation of a test copy execution-requested job.

Figure 11C:
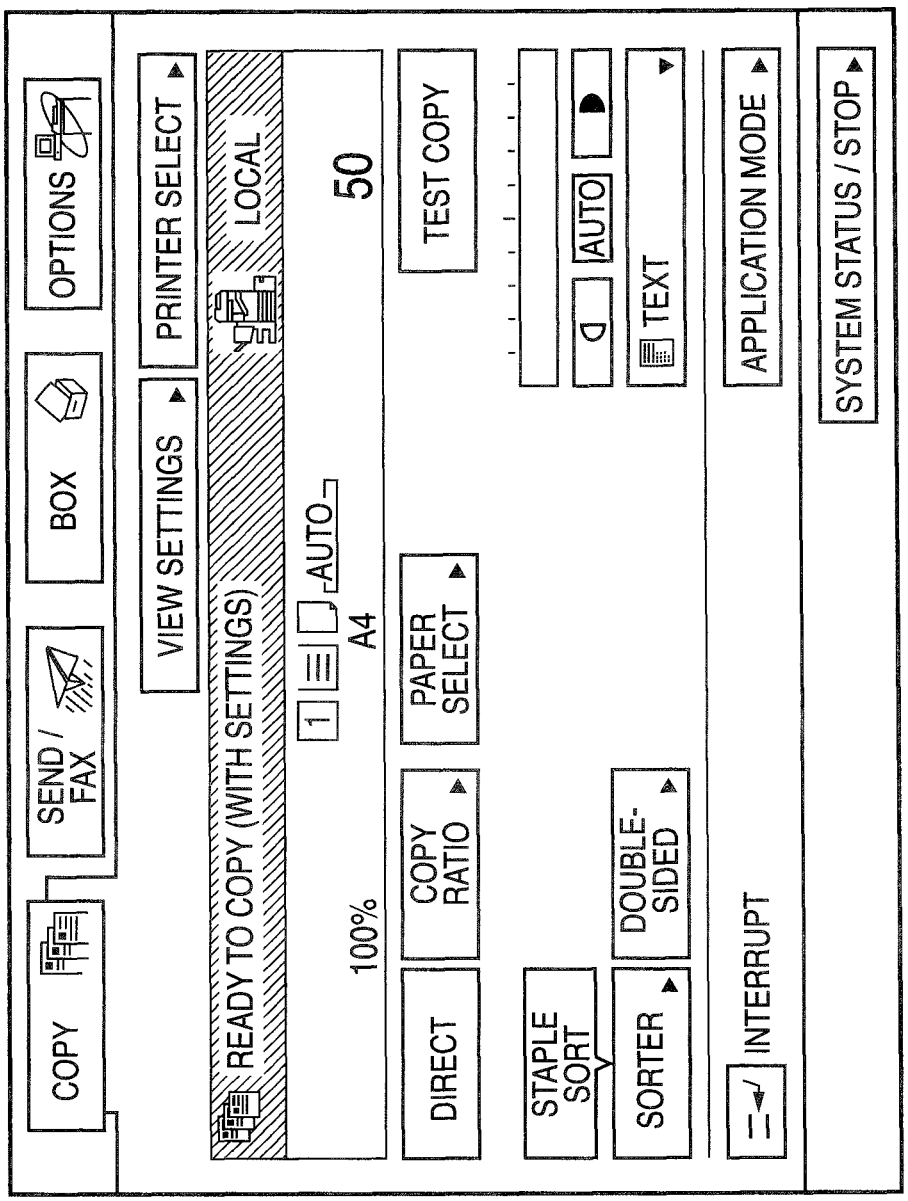
FIG. 11C is a view for explaining a control example associated with the operation unit 204.

For example, the operator presses an "all pages" button in the display window of FIG. 11B and presses an OK button in FIG. 11B. In response to the operator operation, the control unit 205 changes the display contents of the touch panel unit 401 to a display window in FIG. 11C. In the display window in FIG. 11C, execution of the test copy operation for the target job is finalized. The operator presses the start key 503 in this state. In response to this, the control unit 205 determines that it has accepted the test copy execution request of the job from the operator. Then, the control unit 205 causes the printing system 1000 to start the test copy operation for the job.

In this case, the control unit 205 causes the print apparatus 100 to print the print data of all the pages of the job once as the test copy operation for the job on the basis of the aforementioned operator setting. After that, the control unit 205 causes the sheet processing apparatus 200 to staple a printed bundle of all the pages by one set. In the printing system 1000 of the embodiment, the saddle stitching apparatus executes this stapling.

Assume that the operator presses the "designated pages" button in the display window of FIG. 11B, and designates arbitrary pages via the "setting field of the range of designated pages" having start and end page input fields in the display of FIG. 11B. Then, the operator presses an OK button in FIG. 11B and the start key 503. In response to this, the control unit 205 determines that it has accepted the test copy execution request of the job from the operator. The control unit 205 causes the printing system 1000 to start the test copy operation for the job.

In this case, the control unit 205 inhibits the print apparatus 100 from printing print data of all the pages of the job once as the test copy operation of the job. The control unit 205 causes the print apparatus 100 to print only print data of pages set by the operator via the designated page range setting fields in the display of FIG. 11B. For this job, a stapling execution request is set as a processing condition. However, printing of all pages is inhibited in this test copy operation, so the control unit 205 inhibits the print apparatus 100 from creating a printed bundle of one set. The control unit 205 controls the printing system 1000 to inhibit execution of stapling the test copy printed materials of the designated pages.

As described above, the embodiment can execute a plurality of types of test copy operations.

Figure 11D:
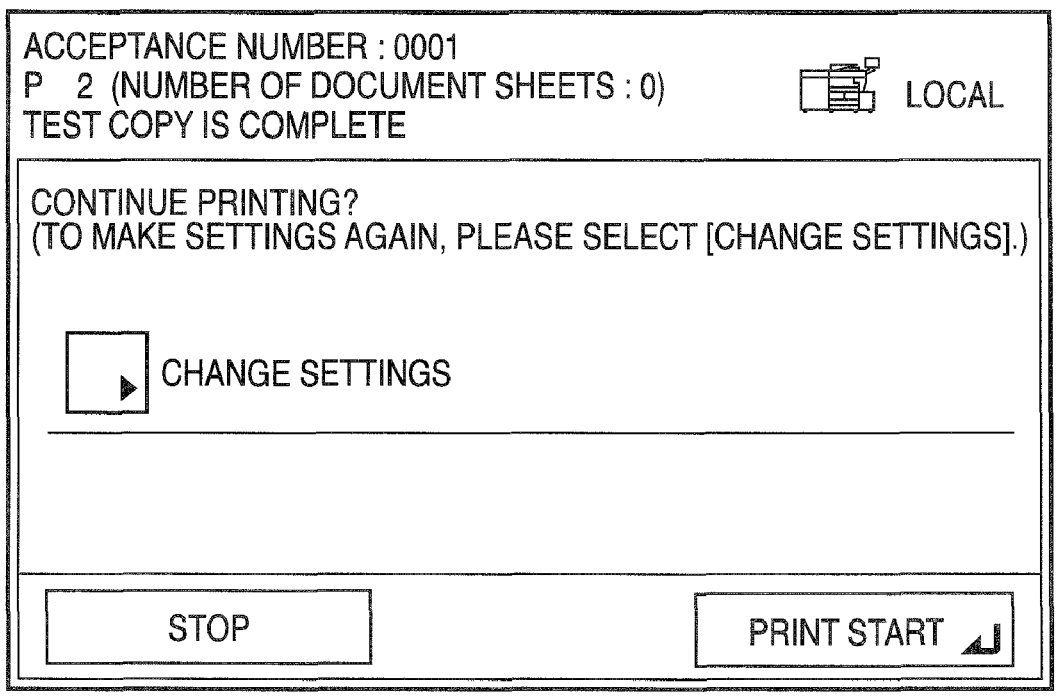
FIG. 11D is a view for explaining a control example associated with the operation unit 204.

The timing when a test copy operation execution request for the job is accepted with the start key 503 corresponds to time T0 in FIG. 12A. The timing when the test copy operation of the job ends corresponds to time T1 in FIG. 12A. The period when the print apparatus 100 executes the test copy operation corresponds to the period from time T0 in FIG. 12A to time T1 in FIG. 12A, and the test copy operation corresponds to [step 1] in FIG. 12A. The period from time T1 in FIG. 12A to time T2 in FIG. 12A corresponds to the period when the control unit 205 waits for input of an operator instruction on a production print operation for the job having undergone the test copy operation. For example, the control unit 205 causes the touch panel unit 401 to execute a display illustrated in FIG. 11D upon completion of the test copy operation which started at time T0 in FIG. 12A in the printing system 1000. The control unit 205 controls to alternatively accept, from the operator via the display illustrated in FIG. 11D, one of the following instructions as processing of the job having undergone the test copy operation in [step 1] of FIG. 12A.

(Instruction 1)

Instruction 1 is an instruction to cause the printing system 1000 to start the production print operation for a job (i.e., a job having undergone the test copy operation in [step 1] of FIG. 12A) without changing any printing condition. When the operator presses the "print start" key in the display of FIG. 11D, the control unit 205 determines that the operator has issued instruction 1. Upon accepting instruction 1, the control unit 205 causes the printing system 1000 to start the production print operation for the job without changing print processing conditions set before test copy. For example, the control unit 205 controls the printing system 1000 to execute, in the production print operation of the job, processing complying with printing conditions set by the operator for the job immediately before time T0 in FIG. 12A. When executing the test copy operation in [step 1] of FIG. 12A, the control unit 205 stores print data of all the pages of the job in the HDD 209. The control unit 205 holds the print data in the HDD 209 till the completion of the production print operation of the job. In the embodiment, the control unit 205 executes the following processing when the production print operation of the job having undergone the test copy operation is done in [step 3] of FIG. 12A. That is, the control unit 205 causes the print apparatus 100 to execute a print operation using print data of the job that has already been held in the HDD 209 in [step 1] of FIG. 12A.

(Instruction 2)

Instruction 2 is an instruction to cancel (stop) the start of the production print operation for a job having undergone test copy. When the operator presses the "stop" key in the display of FIG. 11D, the control unit 205 determines that the operator has issued instruction 2. Upon accepting instruction 2, the control unit 205 inhibits the printing system 1000 from starting the production print operation for the job, and cancels execution of the production print operation for the job. When the production print operation is canceled on the basis of instruction 2, the control unit 205 controls to erase, from the HDD 209, print data of all the pages of the job that have been held in the HDD 209 in [step 1] of FIG. 12A.

(Instruction 3)

Figure 11E:
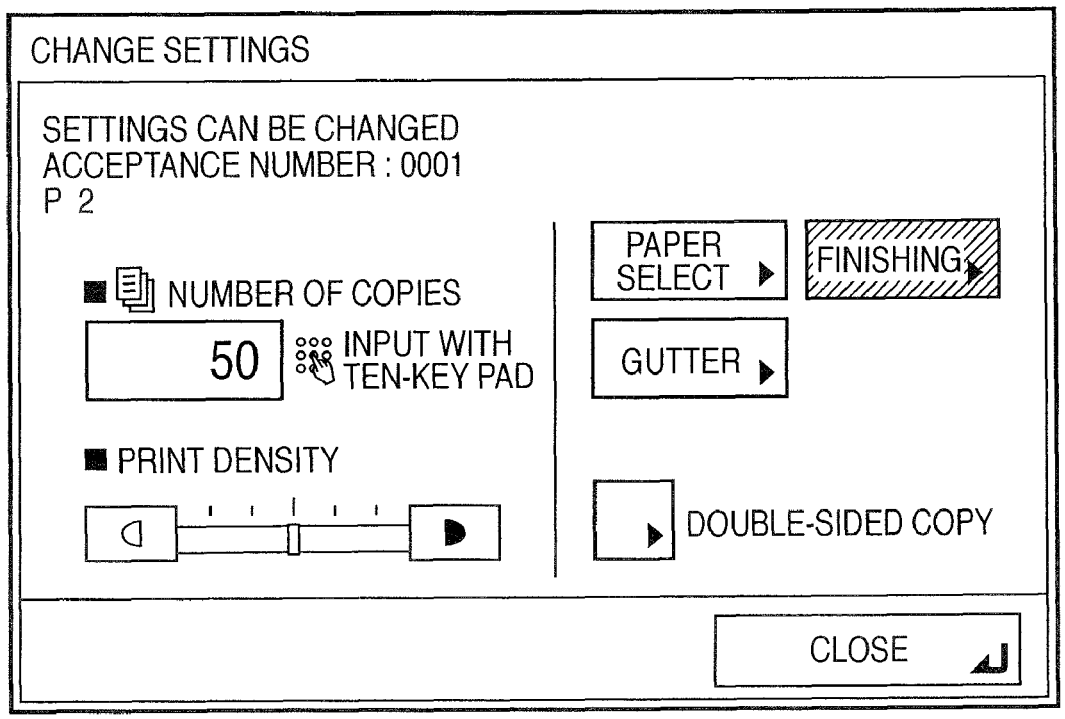
FIG. 11E is a view for explaining a control example associated with the operation unit 204.

Instruction 3 is an instruction to change the print processing conditions of a job prior to the start of the production print operation of the job. When the operator presses the "change settings" key in the display of FIG. 11D, the control unit 205 determines that the operator has issued instruction 3. Upon accepting instruction 3, the control unit 205 controls the operation unit 204 so that the operator can change the processing conditions of the job before the printing system 1000 starts the production print operation for the job. For example, when the operator presses the "change settings" key in FIG. 11D, the control unit 205 causes the touch panel unit 401 to execute the display in FIG. 11E without starting the production print operation of the job. The control unit 205 accepts, from the operator via the display in FIG. 11E, a change of the production printing conditions accepted from the operator for the job immediately before time T0 in FIG. 12A. For example, the control unit 205 controls the operation unit 204 to enable accepting a setting change of the number of copies, a setting change of finishing, a setting change of the binding margin, a setting change from single-sided printing to double-sided one, a setting change from double-sided printing to single-sided one, and the like. Upon completion of the setting change in the display of FIG. 11E, the operator presses the "close" key in FIG. 11E. Then, the control unit 205 controls the touch panel unit 401 to return to the display in FIG. 11D. If the operator presses the "print start" key in the display of FIG. 11D, the control unit 205 controls the printing system 1000 to execute a print operation complying with the setting-changed print processing conditions accepted from the operator via the display in FIG. 11E as the production print operation of the job.

The operation executed by the printing system 1000 during the period from time T1 to time T2 in FIG. 12A corresponds to [step 2] in FIG. 12A. The operation executed by the printing system 1000 when the operator issues (instruction 2) or (instruction 3) corresponds to [step 3] starting from time T2 in FIG. 12A. That is, in [step 3] from time T2 in FIG. 12A, the control unit 205 starts the production print operation of a job having undergone the test copy operation in [step 1] of FIG. 12A.

Execution of the test copy operation requires the operation in [step 2] of FIG. 12A as an intervention operation by the operator between [step 1] of FIG. 12A and [step 3] of FIG. 12A. The control unit 205 controls not to start the production print operation in [step 3] of FIG. 12A unless the operator inputs an explicit request in [step 2] of FIG. 12A. The control unit 205 controls the printing system 1000 to shift to the operation in [step 3] of FIG. 12A in response to an input from the operator via the "print start" key in FIG. 11D in [step 2] of FIG. 12A.

In [step 3] of FIG. 12A, one of the following operations is executed as the production print operation of a job having undergone the test copy operation.

Assume that the operator changes settings in [step 2] of FIG. 12A. In this case, the control unit 205 causes the printer unit 203 to execute print processing of the job as the production print operation of the job under the setting-changed printing conditions by the number of copies accepted before executing test copy. To the contrary, assume that the operator does not change settings in [step 2] of FIG. 12A. In this case, the control unit 205 causes the printer unit 203 to execute print processing of the job as the production print operation of the job under printing conditions accepted immediately before T0 in FIG. 12A, i.e., unchanged printing conditions accepted before executing test copy. As for a job for which the operator designates "all pages" in test copy, the control unit 205 controls to set the number of copies in the production print operation by subtracting one from the total number of copies accepted before test copy.

In the embodiment, the control unit 205 controls the printing system 1000 to output the production printed materials of a job subjected to test copy to the same destination as that of the test copy printed materials of the job.

Assume that the printing system 1000 has the system configuration shown in FIG. 3, and a test copy operation execution request is accepted from the operator for a job for which "saddle stitching" is designated as finishing (sheet processing) by the saddle stitching apparatus 200-3c shown in FIG. 3. In this case, the control unit 205 causes the printer unit 203 to print the print data of the job on print media necessary for the job, thereby obtaining the test copy printed materials of the job. Thereafter, the control unit 205 causes the saddle stitching apparatus 200-3c in FIG. 3 to saddle-stitch the printed media. The control unit 205 causes the saddle stitching apparatus 200-3c in FIG. 3 to output the printed materials to an undermost destination in the apparatus among three destinations Z of the saddle stitching apparatus 200-3c in FIG. 3. Note that the printing system 1000 creates test copy printed materials of one set (i.e., a printed bundle of one copy). The control unit 205 causes the printing system 1000 to execute the series of test copy operations in [step 1] of FIG. 12A. To create the production printed materials of the job, the control unit 205 causes the printer unit 203 to print the print data of the job on print media necessary for the job. The control unit 205 causes the saddle stitching apparatus 200-3c in FIG. 3 to execute saddle stitching corresponding to finishing requested by the operator for the printed media. The control unit 205 causes the saddle stitching apparatus 200-3c in FIG. 3 to output the production printed materials to the same destination as that of the test copy printed materials of the job (i.e., the undermost destination in the apparatus among three destinations Z of the saddle stitching apparatus 200-3c in FIG. 3). The control unit 205 controls the printing system 1000 to create production printed materials by the number of copies calculated by subtracting one from the total number of copies set by the operator immediately before T0 in FIG. 12A.

In this manner, according to the embodiment, the control unit 205 enables the printing system 1000 to execute in [step 3] of FIG. 12A the print operation of outputting the production printed materials of a job subjected to test copy to the same destination as that of the test copy printed materials of the job.

The condition under which it is permitted to accept the execution request of the check print function (to be described later) from the operator, and the timing when the request is accepted are different from those for the test copy function. Control related to the printed material destination is also different between the check print function (to be described later) and the test copy function.

The printing system 1000 according to the embodiment can execute discriminative control operations between the test copy function and the check print function (to be described later). When executing the check print function (to be described later), the control unit 205 performs control different (discriminative) from that for the test copy function.

The test copy function is considered to be necessary even in the office environment. For example, the user may want to create the printed materials of a target job in a desired output form without any unintended output or failure. Preferably, the user may want to check the output form before the start of creating the production printed materials of the job, and if the output form needs to be corrected, change the print processing conditions of the job and then create production printed materials. This need is considered to arise not only in a printing environment such as the POD environment but also in the office environment.

However, a digital printing system requested in the printing environment such as the POD environment must consider other needs in addition to those which can be met by the test copy function.

For example, in a printing environment such as the office environment, it suffices to consider only one job of the user in most cases, and only the test copy function is sufficient. However, in a printing environment such as the POD environment, it does not suffice to consider only one job, and the productivity of all print jobs accepted by the printing system and the qualities of these print jobs are also important.

In a printing environment such as the POD environment, the client who requests creation of printed materials is a customer, and the operator who operates the printing system is a worker in a printing company. In this printing environment, demands to receive printed material creation requests from customers as many as possible and quickly process the jobs within a short period are assumed. To cope with this situation, the printing system will need to efficiently create customer-satisfactory printed materials as many as possible within a short period.

To meet these demands, according to the embodiment, the printing system 1000 comprises various configurations associated with the check print function (to be described later). With these configurations, the print operation of the printing system 1000 can continue without wastefully stopping even while, for example, the operator executes check work on the quality of printed materials. The printing system 1000 is configured to continuously process a plurality of jobs without undesirably decreasing the operating ratio of the printing system 1000.

Control related to the check print function will be described.

[Control Related to Check Print Function of Printing System 1000]

The check print function according to the embodiment is a function of causing the printing system 1000 to create the check printed material of a target job during the period from the start to end of the print operation of the job by the printing system 1000.

For example, the control unit 205 accepts a print execution request for a target job from the operator via the operation unit 204. In response to the print execution request, the control unit 205 causes the printing system 1000 to start the print operation of the job. The control unit 205 controls the operation unit 204 to accept a check print operation execution request from the operator for the job being printed while the printing system 1000 actually executes the print operation. Further, the control unit 205 accepts a check print request from the operator for the job while the printer unit 203 executes the print operation of the job. In response to the check print request from the operator, the control unit 205 interrupts the print operation of the job in progress by the printer unit 203. Immediately after the printing system 1000 interrupts the print operation of the job subjected to the check print operation, the control unit 205 causes the printing system 1000 to execute the check print operation of the job. In the check print operation, the printing system 1000 creates the check printed materials of the check print-requested job. In the check print operation, the control unit 205 reads out print data of the print operation-interrupted job from the HDD 209, and causes the print apparatus 100 to execute print processing. Immediately upon completion of the check print operation, the control unit 205 controls the printing system 1000 to automatically resume (continue) the interrupted print operation of the job.

A print operation, processing of which is interrupted in response to a check print operation execution request and automatically resumes in the printing system 1000 at the end of the check print operation, will be referred to as the production print operation of a job having undergone the check print operation, or as the print operation of a check print-requested job. A printed material created by the print operation of a job subjected to check print will be referred to as the production printed material of a job subjected to the check print operation, or the printed material of a check print-requested job. In contrast, a printed material created by the check print operation will be referred to as the check printed material of a check print-requested job.

In the embodiment, the control unit 205 controls the printing system 1000 to selectively execute the first and second type check print operations as the check print operation on the basis of an instruction from the operator.

The first type check print operation is to cause the printing system 1000 to print the print data of all pages once (i.e., by one set) used in the production print operation of a check print-requested job.

The second type check print operation is to cause the printing system 1000 to print only print data of one page of a check print-requested job. In the second type check print operation, the control unit 205 controls the printing system 1000 to print a page being printed when the operator inputs a check print request via the operation unit 204.

Assume that the printing system 1000 has started the print operation of a job of 100-page document data. The operator inputs the check print request of the job via the operation unit 204 at the timing when the printer unit 203 prints the 25th page. Further, the operator issues a check print request for only one page. In this case, the control unit 205 controls the printing system 1000 to print, as the check print operation, only print data of the 25th page being printed upon receiving the check print request. According to the embodiment, the printing system 1000 is configured to issue a paper feed command to the printer unit 203 for each page. In the second type check print operation, therefore, the control unit 205 controls the printing system 1000 to print the same page as that for which the paper feed command has been issued upon receiving the check print request. According to the embodiment, the control unit 205 controls the printing system 1000 to execute the second type check print operation of printing only the same page as one being printed upon receiving the check print request.

The operator of the printing system 1000 checks the result of a check printed material created and output by the check print operation according to the embodiment. The printing system 1000 according to the embodiment is configured to selectively execute at least the following three processes in response to a request from the operator who has checked the output result of the check printed material.

[1. Example of Processing Executed by Printing System 1000 Under Control of Control Unit 205 in Accordance with Request from Operator Who Confirmed Check Printed Material Output by Check Print—Cancel (Stop) Production Printing]

Assume that, as a result of a visual check, the operator determines that the check printed material of a job having undergone the check print operation does not meet a desired output form. Based on a request from the operator, the control unit 205 controls the printing system 1000 to stop (cancel) the production print operation of the job that has automatically resumed in the printing system 1000 immediately after executing the check print operation. As a result, the processing of the job forcibly ends. The control unit 205 accepts a request from the operator via a key 2401F of a window 2400F in FIG. 14F (to be described later).

[2. Example of Processing Executed by Printing System 1000 Under Control of Control Unit 205 in Accordance with Request from Operator Who Confirmed Check Printed Material Output by Check Print—Change Print Processing Conditions Specific to Production Print Job Subjected to Check Print]

Assume that, as a result of a visual check, the operator determines that a check printed material does not meet a desired output form. Based on a request from the operator, the control unit 205 controls the printing system 1000 to suspend the production print operation of the job that has automatically resumed in the printing system 1000 immediately after executing the check print operation. During the suspension, the control unit 205 accepts a setting from the operator via the operation unit 204 to change the output form of the job. For example, the control unit 205 can accept a setting change of the type of print medium necessary for the production print operation of a job, and a setting change of the print density. As other setting change targets, the control unit 205 can also accept a setting change of increasing/decreasing the number of copies, and a setting change of post-processing such as stapling. The control unit 205 controls the operation unit 204 to accept a setting change of print processing conditions specific to the job from the operator. The control unit 205 controls the printing system 1000 to create and output production printed materials again from the beginning under the changed print processing conditions on the basis of a request from the operator. In this way, the operator can change settings specific to a job subjected to check print. The control unit 205 accepts a suspension request from the operator via a key 2401D of a window 2400D in FIG. 14D (to be described later). The control unit 205 accepts a setting change from the operator via a window 2300A in FIG. 13F or a window 2400C in FIG. 14C (to be described later).

[3. Example of Processing Executed by Printing System 1000 Under Control of Control Unit 205 in Accordance with Request from Operator Who Confirmed Check Printed Material Output by Check Print—Change Print Processing Conditions which Commonly Influence Print Jobs Including Jobs Other than Production Print Job Subjected to Check Print]

This case is applied when the operator visually checks a check printed material and determines that device-specific adjustment values of the printing system 1000 that influence not only the target job but also other jobs must be changed. This corresponds to, e.g., a case where the operator confirms the output result of check print and determines that the device-specific adjustment values (parameters) of the printing system 1000 including the print apparatus 100 must be corrected. The device-specific parameters include parameters (e.g., the temperature of the fixing unit of the printer unit 203 and the print medium conveyance speed) directly related to print processing of the printing system 1000, and a print density value serving as a reference value of the apparatus. In the embodiment, the device-specific parameters include at least the following four parameters:

(1) adjustment of the creep (shift) correction amount of the print position on a print medium
(2) automatic tone correction
(3) density correction
(4) text/background contrast adjustment When such an adjustment value is changed, the control unit 205 controls the printing system 1000 to reflect the adjustment value change result in the printout result of a print job from the printing system 1000 including the print apparatus 100. That is, these device-specific adjustment values (parameters) are also condition values which influence print processing of a target job. In the embodiment, the device-specific adjustment values (parameters) are also an example of the print processing conditions of a target print job.

In addition to these adjustment values, the embodiment also assumes elements which change a printout result, such as the feeder of the scanner unit 201 of the print apparatus 100, the wire of the printer unit 203, and various rollers for conveying a print medium. These members get dirty depending on the use frequency and use period. In this case, the members are cleaned to obtain a higher-quality output result. Thus, according to the embodiment, the control unit 205 controls the printing system 1000 to execute at least one of the following three measures on the basis of a request from the operator after executing check print:

(1) cleaning of the feeder
(2) cleaning of the wire
(3) cleaning of the rollers

Assume that the control unit 205 causes various relevant units of the printing system 1000 to clean these members. Also in this case, the printout result of a print job from the printing system 1000 including the print apparatus 100 changes. Cleaning the members of the printing system 1000 is also processing which influences print processing of a target job. Hence, cleaning the members of the printing system 1000 is also an example of changing the print processing conditions of a target print job.

The control unit 205 causes the printing system 1000 to change the device-specific processing conditions (parameters) of the printing system 1000 in accordance with an operator operation after executing the check print operation. Then, the control unit 205 controls the printing system 1000 to process a target job having undergone check print by a print process according to the changed device-specific parameters. In addition, the control unit 205 controls the printing system 1000 to process jobs other than the target job, such as another queued job, by the print process according to the changed device-specific parameters.

The control unit 205 controls the printing system 1000 to successively process a plurality of jobs by the printing system 1000 after executing check print and changing, on the basis of an operator request, device-specific processing conditions which influence the print processing conditions of the jobs. This is also different from the above-described test copy function.

Assume that the control unit 205 causes the printing system 1000 to execute the test copy operation. In this case, the control unit 205 controls to change, in accordance with an instruction accepted from the operator via the operation unit 204, "print processing conditions relating to the print operation of a job subjected to the test copy operation but not relating to the print operation of another job". To the contrary, assume that the control unit 205 causes the printing system 1000 to execute the check print operation. In this case, the control unit 205 controls to change, in accordance with an instruction accepted from the operator via the operation unit 204, "print processing conditions relating to the print operation of a job subjected to the test copy operation and also relating to the print operation of another job". The control unit 205 accepts a setting change from the operator via, e.g., the window 2400C in FIG. 14C (to be described later) after executing check print.

The configuration relevant to check print will be further explained with reference to FIGS. 12B to 14H and the like.

Assume that the control unit 205 causes the operation unit 204 to execute the display in FIG. 7. The display processing corresponds to a process in step S101 of FIG. 16 (to be described later). Assume that the control unit 205 accepts a series of printing conditions of a target job from the operator via the display in FIG. 7. The processing to accept printing conditions corresponds to a process in step S102 of FIG. 16 (to be described later). This job will be referred to as job X. Job X is a job to scan a document of 10 pages in total by the scanner unit 201 and print the print data of the scanned document by the printer unit 203 via the HDD 209.

Also assume that the operator sets the following illustrative processing conditions as the printing conditions of job X via the display in FIG. 7:

(1) "paper size=A3 size, and paper type=thick paper" as settings of a print medium necessary for printing
(2) copy ratio=100%
(3) finishing setting=stapling
(4) total copy count=100 copies The operator sets the parameters of processing conditions (1) to (4) via the operation unit 204 executing the display in FIG. 7. In this case, the control unit 205 controls the operation unit 204 to reflect the setting contents by the operator. For example, the control unit 205 controls the touch panel unit 401 to update the display contents of the touch panel unit 401 of the operation unit 204 from those in FIG. 7 to those in FIG. 13A.

Figure 13A:
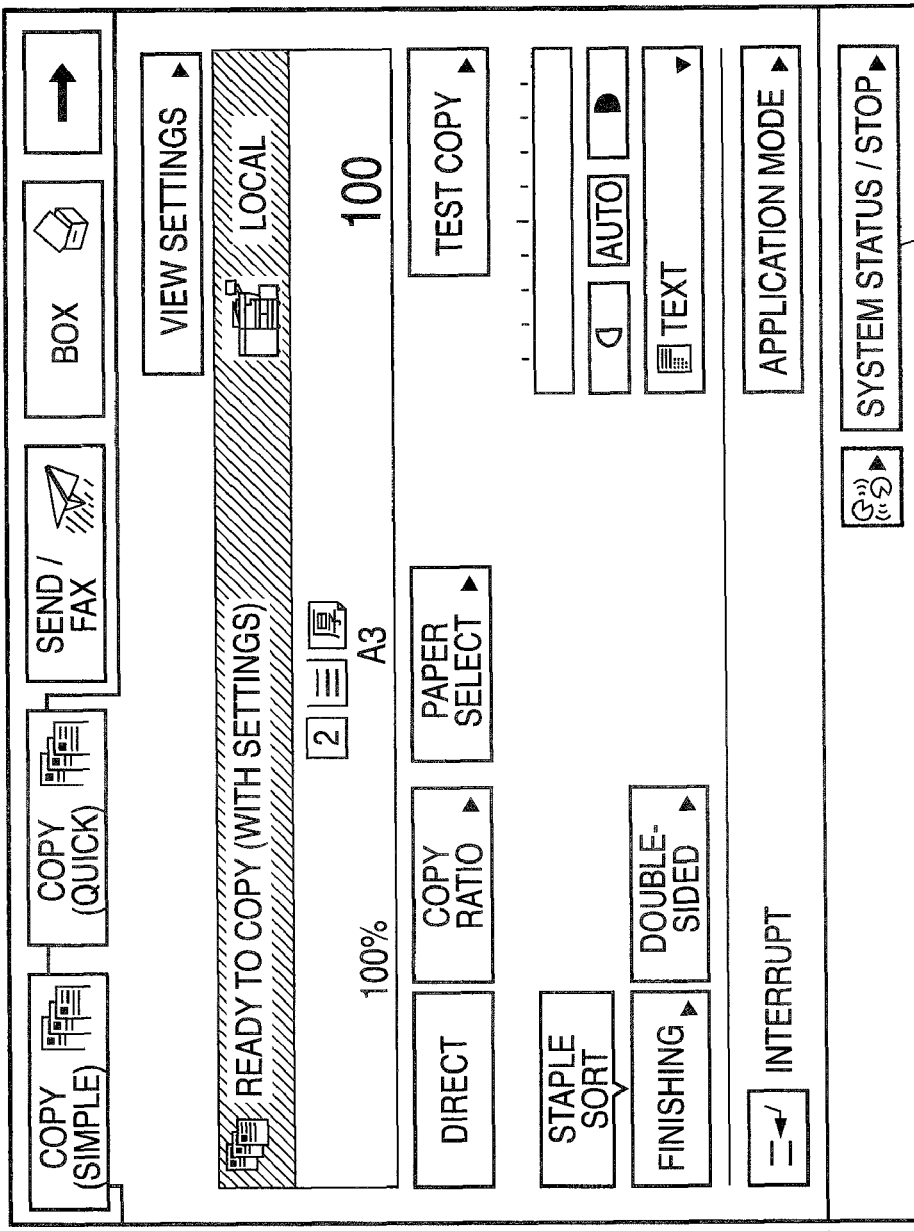
FIG. 13A is a view for explaining a control example associated with the operation unit 204.

As is apparent from the setting conditions shown in FIG. 13A, job X is a "job requiring printing of copies and requiring execution of finishing". In this case, similar to the above-mentioned case, the control unit 205 permits acceptance of a test copy operation execution instruction from the operator for job X. Then, the control unit 205 causes the touch panel unit 401 to enable the "test copy" key as in the window shown in FIG. 13A as a key used to input a test copy execution instruction from the operator for job X. When the operator presses the "test copy" key in FIG. 13A, the control unit 205 causes the touch panel unit 401 to execute the display in FIG. 11B. The control unit 205 accepts the settings of the test copy operation for job X from the operator via the display in FIG. 11B. As described with reference to FIG. 12A, the control unit 205 enables the printing system 1000 to execute the test copy operation even for job X. The control unit 205 controls the printing system 1000 to execute the production print operation of job X after executing the test copy operation of job X.

A case where the production print operation of job X starts will be described. Assume that the operator presses the start key 503 while the touch panel unit 401 executes the display in FIG. 13A. Then, the control unit 205 determines that it has accepted the print operation execution request of job X from the operator via the operation unit 204. Determination of whether the print execution request (print start request) has been accepted corresponds to a process in step S103 of FIG. 16. This print operation corresponds to the production print operation of job X subjected to the check print operation. The timing when the production print operation of job X starts corresponds to time T0 in FIG. 12B.

As described above, the operator presses the start key 503 while the touch panel unit 401 displays the window in FIG. 13A. Assume that the HDD 209 does not hold any print-requested job except for job X when the operator presses the start key 503. If this condition is satisfied, the control unit 205 responds to the print execution request of job X from the operator, and causes the printing system 1000 to start a series of print operations of job X. As the series of print operations of job X, the control unit 205 controls the printing system 1000 to execute the following operations.

Upon accepting the print execution request of job X from the operator via the start key 503, as described above, the control unit 205 causes the scanner unit 201 to scan a 10-page document of job X sequentially from the first page. Simultaneously when causing the printing system 1000 to start the scan operation, the control unit 205 causes the touch panel unit 401 to execute a display which prompts the operator to confirm the progress (processing status) of job X. For example, the control unit 205 causes the touch panel unit 401 to display a window shown in FIG. 13B. The control unit 205 controls the touch panel unit 401 to popup-display the window 2300A at the timing when the print execution request of job X is accepted from the operator. The processing to popup-display the window 2300A corresponds to a process in step S104 of FIG. 16 (to be described later). The window 2300A is a job processing status window capable of notifying the operator in real time of the progress such as the processing status of a job for which the print operation has started. The job processing status window 2300A is a "print status window" described in FIG. 16.

The control unit 205 acquires status information of job X from each unit which executes an operation (e.g., scan operation, storage operation, print operation, or finishing operation of job X) necessary to complete a series of print operations of job X. The control unit 205 controls the touch panel unit 401 to reflect the status information in the display contents of the window 2300A.

In performing the series of print operations of job X, the control unit 205 causes the scanner unit 201 to scan the 10-page document of job X sequentially from the first page, as described above. The control unit 205 causes the HDD 209 to sequentially store print data of the scanned job X. The storage processing corresponds to step S105 in FIG. 16 (to be described later). Assume that the HDD 209 has not completely stored print data of the first page of job X in this stage. For example, the control unit 205 has not yet received a data storage information notification from the HDD 209. In this case, the control unit 205 controls the touch panel unit 401 to change the display contents of the window 2300A representing the processing status of job X to those shown in FIG. 13B.

Figure 13B:
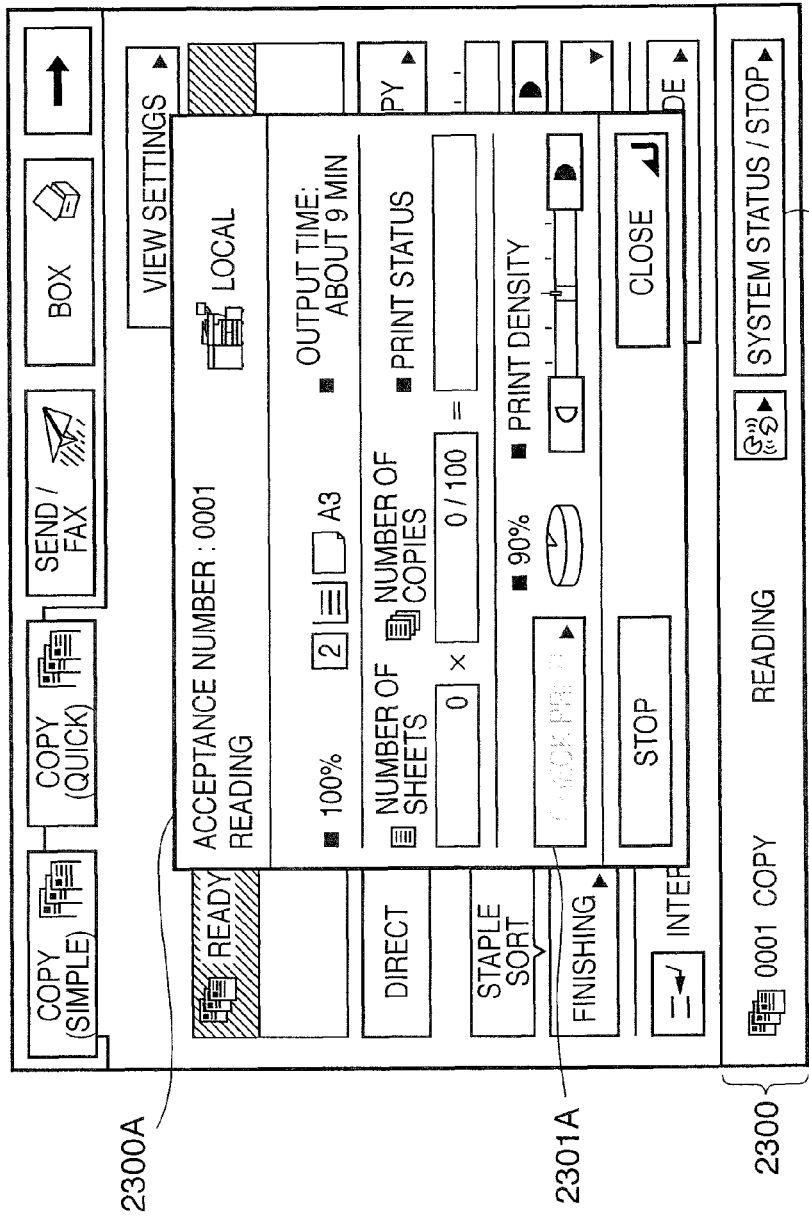
FIG. 13B is a view for explaining a control example associated with the operation unit 204.

The display contents of the window shown in FIG. 13B contain a message "reading a job (job X in this example) of acceptance number 0001." as a display for prompting the operator to confirm that print data of job X is read from the HDD 209. The window shown in FIG. 13B allows the operator to confirm that job X requires printing of 100 copies, but neither one copy nor one sheet has been printed.

A display field 2300 at the bottom of windows illustrated in FIGS. 13A to 14H and 15 is a status display portion capable of displaying status information when there is status information of high priority to be announced to the operator. For example, no actual processing of job X has started yet in the state of FIG. 13A. In this case, the control unit 205 controls the touch panel unit 401 not to display any status information in the display field 2300, as shown in FIG. 13A. In the state of FIG. 13B, read of job X from the HDD 209 is in progress. In this case, the control unit 205 controls the touch panel unit 401 to display information representing the processing status of job X in the display field 2300.

Assume that the progress of job X changes from the state in which the touch panel unit 401 displays the window in FIG. 13B. For example, print data of the first page of job X is transferred at least from the scanner unit 201 to the HDD 209. The control unit 205 receives this information from the HDD 209. In response to this, the control unit 205 causes the printer unit 203 to start printing the print data of the first page of job X that is stored in the HDD 209. At this time, the control unit 205 causes the printing system 1000 to execute a storage operation of storing print data of subsequent pages of job X in the HDD 209, in parallel with the print operation of the first page of job X.

Further, the control unit 205 controls the touch panel unit 401 to update the display contents of the job processing status window 2300A representing the processing status of job X from contents shown in FIG. 13B to those shown in FIG. 13C, so as to cope with a change of the progress of job X.

The display contents of the display shown in FIG. 13C are updated so that the operator can confirm that the print operation of print data of job X is in execution at the same time as the storage operation of print data of job X in the HDD 209. For example, the display in FIG. 13C shows a message "reading+printing in progress for a job (job X in this example) of acceptance number 0001." The window in FIG. 13C allows the operator to confirm that job X requires printing of 100 copies and the first sheet of the first copy (printing of the first set) is being printed. To notify the operator of this information even after the popup display of the window 2300A disappears, the control unit 205 also displays the same information in the display field 2300, as shown in FIG. 13C.

The stage in which the touch panel unit 401 displays the window in FIG. 13C corresponds to the stage in which the printer unit 203 has started the print operation of job X and job X is being printed. That is, job X corresponds to a job being printed by the printer unit 203. In this case, the control unit 205 permits acceptance of a check print request from the operator to output the check printed material of job X from the printing system 1000. The control unit 205 controls the touch panel unit 401 to accept a check print request from the operator for job X on condition that job X is being printed.

For example, the control unit 205 controls the touch panel unit 401 to enable a key 2301A in the window 2300A, as shown in FIG. 13C. The control unit 205 accepts, via the active key 2301A, the check print request of job X corresponding to a job being printed.

Assume that job X is not a job being printed by the printer unit 203. In this case, the control unit 205 inhibits acceptance of a check print request from the operator for job X.

For example, in the stage of FIG. 13B, the storage operation of job X in the HDD 209 has started, but printing of print data of job X has not started. In this case, the control unit 205 inhibits acceptance of a check print request for job X in the stage of FIG. 13B. The control unit 205 controls the touch panel unit 401 to disable the key 2301A so that the operator cannot press the key 2301A, as shown in FIG. 13B. In this fashion, when the target job in the printing system 1000 is not a job being printed, the control unit 205 controls to inhibit acceptance of the check print request of the job from the operator. As a method of disabling the key 2301A, the key 2301A may be grayed out, as shown in FIG. 13B, hatched, or hidden.

Then, assume that the progress of job X changes from the display of FIG. 13C. For example, the scanner unit 201 transfers all the pages of the 10-page document of job X to the HDD 209. The HDD 209 completely stores all the 10 pages of job X. Print data of job X from the HDD 209 is being printed in order to completely print a total of 100 copies necessary for job X. The control unit 205 acquires various pieces of information from the operation unit 204, scanner unit 201, HDD 209, and printer unit 203 to specify this situation. In this way, even when the processing status changes, the control unit 205 controls the touch panel unit 401 to update the display contents of the window 2300A to ones based on the acquired pieces of information.

Figure 13D:
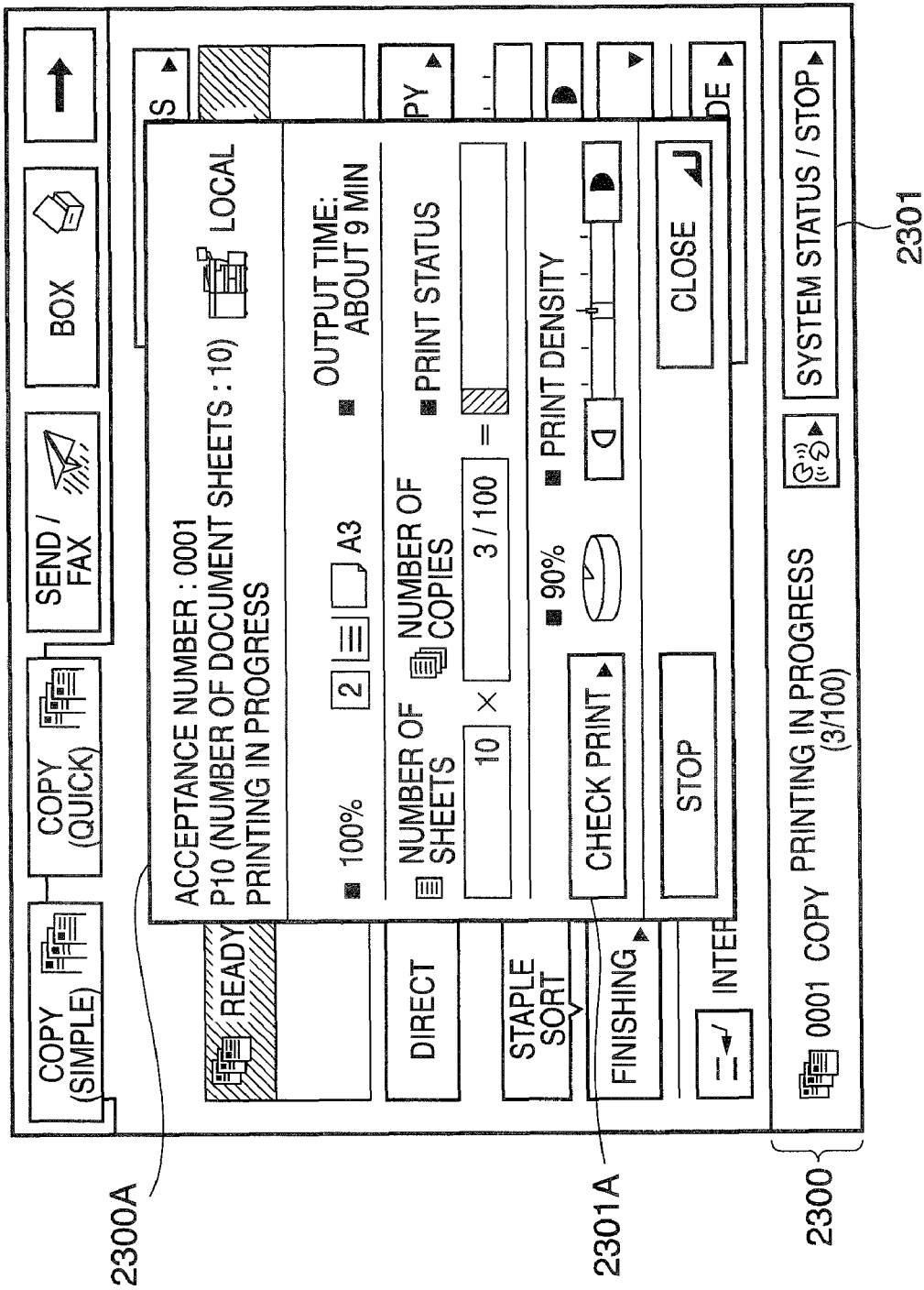
FIG. 13D is a view for explaining a control example associated with the operation unit 204.

For example, the control unit 205 controls the touch panel unit 401 to change the display contents of the window 2300A representing the processing status of job X to those shown in FIG. 13D, so as to cope with a change of the progress of job X.

The display shown in FIG. 13D allows the operator to confirm that the storage operation of print data of job X in the HDD 209 is complete and the print data of job X is being printed. For example, the window in FIG. 13D displays a message "printing in progress for a job (job X in this example) of acceptance number 0001." The window in FIG. 13D notifies the operator that job X is a job requiring printing of 100 copies in total, and the 10th sheet of the third copy (printing of the third set) is being printed. The display stage in FIG. 13D also corresponds to a stage in which job X is being printed, similar to the display stage in FIG. 13C. Also in this case, the control unit 205 controls the touch panel unit 401 to enable the "check print" key 2301A in the window 2300A, as shown in the display of FIG. 13D. In this manner, when a print execution-request target job is a job being printed, the control unit 205 controls to permit (enable) acceptance of a check print request from the operator for the job. To notify the operator of the job processing status even after the popup display of the window 2300A disappears, the control unit 205 controls the touch panel unit 401 to display the job processing status even in the display field 2300.

As described above, the control unit 205 controls the touch panel unit 401 to update the display contents of the window 2300A in real time for a print execution-requested job in synchronism with the processing status of the job in the printing system 1000. For example, the control unit 205 controls the touch panel unit 401 to sequentially update the display contents of the window 2300A representing the processing status of job X in accordance with the progress of job X in the printing system 1000. The control unit 205 also controls the touch panel unit 401 to change the display contents of the display field 2300 at the bottom of the touch panel unit 401 to those synchronized with the processing status of the target job.

The control unit 205 decides whether to accept the check print request of a target job on the basis of whether the printing system 1000 is printing the print execution-requested job. For example, the control unit 205 controls the operation unit 204 so that the operator can press the key 2301A as shown in FIGS. 13C and 13D on condition that the printer unit 203 is printing job X. By this control, the control unit 205 permits acceptance of the check print request of job X from the operator via the key 2301A. As described above, when the target job whose print execution request has been issued is a job being printed, the control unit 205 controls to permit (enable) acceptance of a check print request from the operator for the job.

In contrast, when job X is not being printed, the control unit 205 disables the key 2301A so that the operator cannot press it, as shown in FIG. 13B, and inhibits acceptance of a check print request from the operator for job X. In this fashion, when the print execution-requested target job is not a job being printed, the control unit 205 controls to inhibit (disable) acceptance of a check print request from the operator for the job.

Assume that the operator presses the active key 2301A in the job processing status window 2300A of FIG. 13D while the touch panel unit 401 executes the display in FIG. 13D. In response to the key operation, the control unit 205 causes the touch panel unit 401 to execute a display shown in FIG. 13E. This processing corresponds to a case where YES is determined in step S109 of FIG. 16 and the process advances to step S110 (to be described later).

Figure 13E:
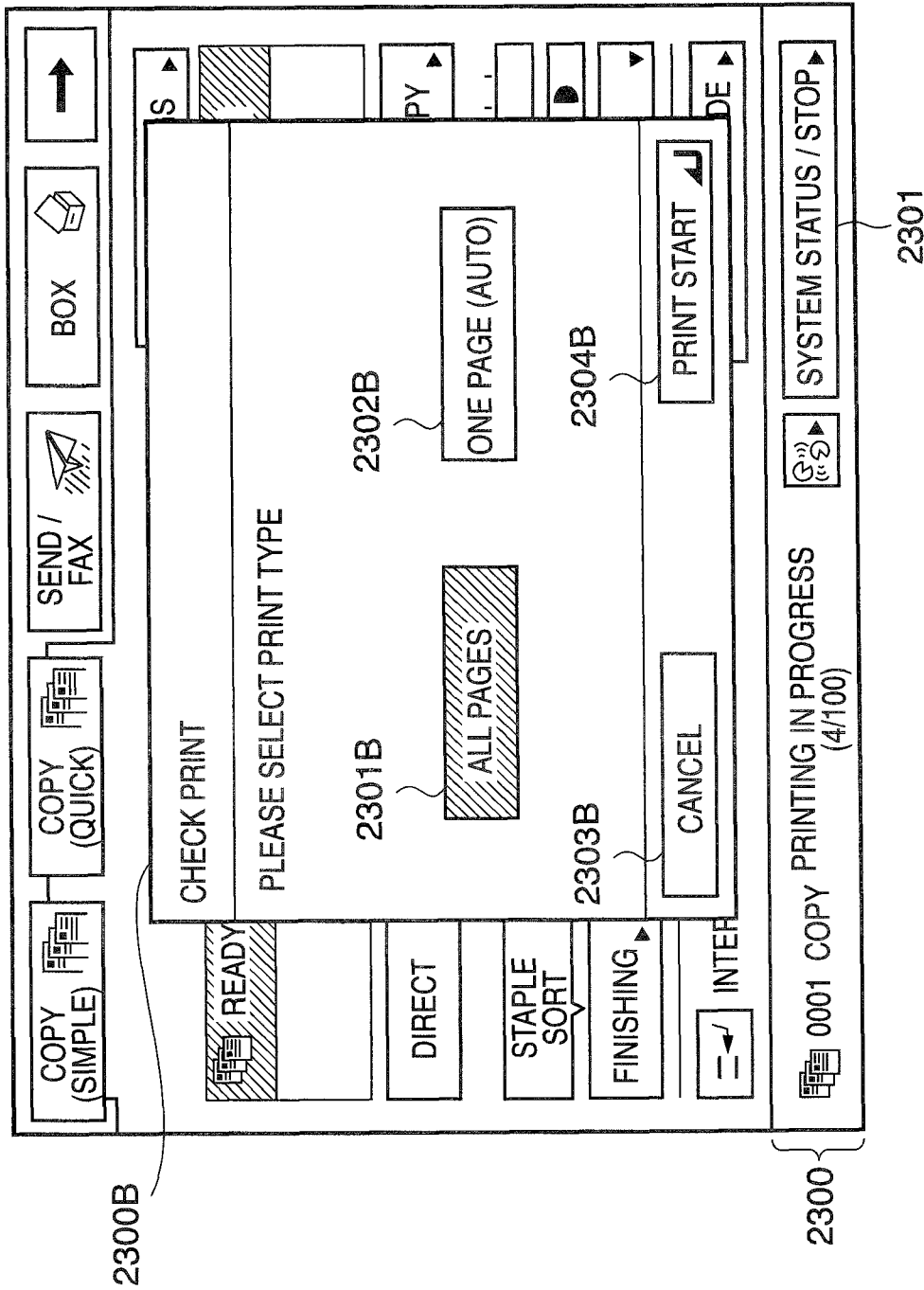
FIG. 13E is a view for explaining a control example associated with the operation unit 204.

A window 2300B shown in FIG. 13E is a display window which allows the operator to decide which of the first and second type check print operations is to be executed for a job subjected to a check print operation. The window 2300B in FIG. 13E corresponds to a "check print type selection window" described in FIG. 16.

An "all pages" key 2301B in the window 2300B is a display key which allows the operator to input an instruction to cause the printing system 1000 to execute the first type check print operation for a job for which execution of the check print operation is permitted.

An "one page (auto)" key 2302B in the window 2300B is a display key which allows the operator to input an instruction to cause the printing system 1000 to execute the second type check print operation for a job for which execution of the check print operation is permitted.

The control unit 205 controls to alternatively select the keys 2301B and 2302B. The control unit 205 controls to select the key 2302B in the window 2300B except a case where the operator selects the key 2301B. When the operator decides either check print operation by selecting either key, and presses a "print start" key 2304B in the display of FIG. 13E, the control unit 205 determines that it has accepted a check print operation execution request from the operator. If the operator does not press the key 2304B, the control unit 205 controls not to start any check print operation for the job for which execution of the check print operation is permitted.

For example, at present, the operation unit 204 executes the display in FIG. 13E, and the operator has not pressed the key 2304B. This determination corresponds to a case where NO is determined in step S111 of FIG. 16 (to be described later). In this status, the control unit 205 inhibits starting the check print operation of job X. The control unit 205 controls the printing system 1000 to continue the production print operation of job X by the printing system 1000 in order to complete the production print operation of job X. The control unit 205 controls the touch panel unit 401 to update the display contents of the job processing status window for job X in synchronism with the print status so as to notify the operator of this status in real time.

Regarding this point, for example, the third copy (third set) of job X requiring printing of 100 copies of 10-page print data by the production print operation is being printed in the display stage of FIG. 13D. The control unit 205 causes the operation unit 204 to execute the display in FIG. 13E. In addition, the control unit 205 confirms that the operator has not pressed the key 2304B in the display of FIG. 13E. In this situation, the control unit 205 causes the printing system 1000 to continue the production print operation of job X permitted as the target of the check print operation. For example, the control unit 205 confirms that the printer unit 203 is printing the fourth copy (fourth set) of job X. In this case, the control unit 205 controls the touch panel unit 401 to notify the operator that "printing in progress for job X of acceptance number 0001, and the fourth copy (fourth set) out of a total of 100 copies (100 sets) is being printed". For example, even while the window 2300B is kept displayed, the control unit 205 controls to display a message "0001 copy printing in progress (4/100)" as the processing status of job X in the display field 2300, as shown in FIG. 13E.

Then, assume that the operator presses the "all pages" key 2301B in the window 2300B of FIG. 13E and then presses the "print start" key 2304B. In response to the key operation, the control unit 205 determines that the operator has input a first type check print operation execution request. This determination corresponds to a case where YES is determined in step S111 of FIG. 16 (to be described later). In response to the input request, the control unit 205 controls the printing system 1000 to stop (interrupt) the production print operation of job X corresponding to a job in execution in the printing system 1000. The control unit 205 controls the printing system 1000 to start the first type check print operation as the check print operation of job X without executing the second type check print operation immediately after interrupting the production print operation of job X.

To the contrary, assume that the operator presses the "one page (auto)" key 2302B in the window 2300B of FIG. 13E and then presses the "print start" key 2304B. In response to the key operation, the control unit 205 determines that the operator has input a second type check print operation execution request. In this case, the control unit 205 stops (interrupts) the production print operation of job X corresponding to a job in execution in the printing system 1000. The control unit 205 controls the printing system 1000 to start the second type check print operation as the check print operation of job X without executing the first type check print operation immediately after interrupting the production print operation of job X.

In the "first type check print operation" which starts in the printing system 1000 instead of the production print operation, print data of all target pages are printed once by one set in the production print operation. In this example, the control unit 205 controls the printing system 1000 to print once print data of 10 pages of job X as the first type check print operation of job X.

In contrast, in the "second type check print operation" which starts in the printing system 1000 instead of the production print operation, only one specific page out of all target pages is printed by one set in the production print operation. In the embodiment, the control unit 205 controls to print a page being printed upon input of a check print request. For example, the operator presses the "one page (auto)" key 2302B in the window 2300B, and presses the "print start" key 2304B. At the timing when the operator inputs an instruction via the key 2304B, the control unit 205 instructs the printer unit 203 to start printing the seventh page of job X as the print operation of the fourth set of job X. In this stage, the control unit 205 reads out print data of the seventh page of job X from the HDD 209, and issues a paper feed command to the printer unit 203 to feed one print medium from the paper feed unit in order to print the seventh page. The control unit 205 controls the printing system 1000 to print only the print data of the seventh page of job X on one print medium as the second type check print operation immediately after interrupting the production print operation of job X. When the operator presses the key 2302B and then the key 2304B, the control unit 205 confirms a page number which is to be printed in the production print operation of the job. The control unit 205 controls to print only the confirmed page in the check print operation. In this manner, a page to be printed in the second type check print operation is automatically decided on the basis of the timing when the operator inputs a check print request. The decided page is printed on one print medium.

Assume that the operator presses a "cancel" key 2303B in FIG. 13E. In response to the key operation, the control unit 205 cancels check print settings for a job for which execution of the check print operation is permitted. In this case, the control unit 205 controls the operation unit 204 to end the popup display of the window 2300B and display again, on the touch panel unit 401, the window 2300A representing the progress of the job. In this case, for example, the window 2300A for job X is displayed again.

The embodiment has described a configuration in which the control unit 205 itself automatically specifies a print page subjected to check print, and controls to print only the specific page on one print medium in the second type check print operation. However, the printing system 1000 may employ another configuration. For example, the operator presses the key 2302B, and specifies one arbitrary page among print data of a job for which execution of check print is permitted. In response to press of the key 2304B after the selection of the arbitrary page by the operator, the control unit 205 controls to print out the print data of the arbitrary page designated by the operator on one print medium. This configuration is also applicable. Even in this configuration, the check print request is based on the condition that the job is being printed.

As described above, the operator designates either the key 2301B or key 2302B in the window 2300B of FIG. 13E in order to select the type of check print, and further designates the key 2304B in order to input a check print request. Then, the control unit 205 determines that the operator has issued the check print request. This processing corresponds to a case where YES is determined in step S111 of FIG. 16 (to be described later). In response to this, the control unit 205 controls the printing system 1000 to automatically interrupt (stop) the production print operation of job X. This processing corresponds to a process in step S114 of FIG. 16 (to be described later). The control unit 205 controls the printing system 1000 to automatically start a check print operation of a type selected by the operator in the window 2300B as check print of job X after interrupting the production print operation of job X. This processing corresponds to a process in step S115 of FIG. 16 (to be described later). Assume that the printing system 1000 completes (ends) the check print operation for job X. At the end of the check print operation of job X, the control unit 205 controls the printing system 1000 to automatically resume (continue) the production print operation of job X. These processes correspond to those in steps S116 and S117 of FIG. 16 (to be described later).

Assume that the printing system 1000 resumes the production print operation of a job having undergone the check print operation. In the resumed operation, the control unit 205 controls the printing system 1000 not to print part of the job which has already been printed immediately before the operator inputs the execution request of the check print operation. The control unit 205 controls the printing system 1000 to print only part (remaining part) of the job which has not been printed immediately before executing the check print operation.

For example, job X subjected to the check print operation is a "job requiring printing of a series of 10-page print data by 100 copies (100 sets) in total" as the production print operation. In the above-mentioned example, up to the seventh page of the fourth copy (fourth set) has been printed by the production print operation of job X immediately before the operator inputs a check print operation execution request for job X using the key 2304B in FIG. 13E. In this case, the control unit 205 controls the printing system 1000 to sequentially execute the following operations as the production print operation of job X that automatically resumes at the end of the check print operation.

(1) The control unit 205 causes the printing system 1000 to print the print data of the eighth to 10th pages of job X page by page using three print sheets in order to completely print the fourth copy (fourth set).

(2) The control unit 205 causes the printing system 1000 to completely print the fifth set to the final 100th set.

More specifically, the control unit 205 causes the printing system 1000 to print 953 sheets corresponding to the sum of [three remaining print sheets of the fourth set] and [(10 sheets×95 sets) for printing of the fifth to 100th sets].

When performing the check print operation in the embodiment, the control unit 205 controls the printing system 1000 to automatically execute the following operations in series.

[Operation 1] The control unit 205 causes the printing system 1000 to start the print operation of a target job in response to a print execution request input from the operator using the start key 503. This print operation corresponds to the production print operation of a target job subjected to the check print operation. The start timing of the print operation corresponds to time T0 in FIG. 12B. [Operation 1] corresponds to the operation in [step 1] of FIG. 12B executed by the printing system 1000 during the period immediately before time TX after time T0 in FIG. 12B.

[Operation 2] The control unit 205 interrupts the production print operation in response to input of a check print operation execution request from the operator using the key 2304B. The control unit 205 causes the printing system 1000 to automatically start the check print operation of the job immediately after interrupting the production print operation. In the check print operation, print processing is executed using print data of the print operation-interrupted job. Assume that the operator presses the key 2301B in the window 2300B before the input from the key 2304B. In this case, the control unit 205 causes the printing system 1000 to execute the first type check print operation as the check print operation. To the contrary, assume that the operator presses the key 2302B in the window 2300B before the input from the key 2304B. In this case, the control unit 205 causes the printing system 1000 to execute the second type check print operation as the check print operation. The check print start timing corresponds to time TX in FIG. 12B. The check print operation in [operation 2] corresponds to the operation in [step 2] of FIG. 12B executed during the period immediately before time TY after time TX in FIG. 12B.

[Operation 3] The control unit 205 causes the printing system 1000 to automatically resume (continue) the production print operation of the print-interrupted job immediately after the end of the check print operation. The timing when the print operation resumes corresponds to time TY in FIG. 12B. [Operation 3] corresponds to the operation in [step 3] of FIG. 12B executed during the period immediately before the end in FIG. 12B after time TY in FIG. 12B.

As is apparent from the control sequence in FIG. 12B, the control unit 205 controls the printing system 1000 to continue the print operation of the printing system 1000 without wastefully stopping it in the use of the check print function.

For example, the control unit 205 enables the printer unit 203 to execute the print operation as in [step 1] of FIG. 12B during the period from time T0 to time TX in FIG. 12B. The control unit 205 controls the printing system 1000 to maintain (continue) the print operation by the printer unit 203 without stopping it as in [step 2] of FIG. 12B during the period from time TX to time TY in FIG. 12B. The control unit 205 also controls the printing system 1000 to maintain (continue) the print operation by the printer unit 203 without stopping it as in [step 3] of FIG. 12B during the period from time TY to the end in FIG. 12B.

In this way, even when the control unit 205 causes the printing system 1000 to execute an operation related to the check print function, the print operation in the printing system 1000 can continue without wastefully stopping.

The mechanism concerning the check print function is also different from the above-described test copy function.

For example, in a case where the printing system 1000 executes the test copy operation as shown in FIG. 12A, the control unit 205 controls the printing system 1000 to stop the print operation of a job subjected to the test copy operation during the period from time T1 to time T2 in FIG. 12A. In a case where the printing system 1000 executes the check print operation, the control unit 205 controls the printing system 1000 so that the printer unit 203 can continue the print operation of a job subjected to the test copy operation during any period in FIG. 12B, as shown in FIG. 12B.

The control unit 205 controls the printing system 1000 according to the embodiment to execute the check print operation at higher operating ratio than that of the printing system 1000 in executing the test copy operation.

As described above, the control unit 205 inhibits execution of the print operation of a job subjected to the test copy operation during the period between T1 and T2 in FIG. 12A. Even in this situation, for example, the HDD 209 stores print data of another queued job different from the job subjected to the test copy operation. In this case, the control unit 205 permits execution of the print operation of the different job during the period between T1 and T2 in FIG. 12A. On condition that a job having undergone the test copy operation waits for an intervention operation by the operator, the control unit 205 enables the printing system 1000 to execute the print operation of the different job.

In addition to the aforementioned effects, the embodiment can attain an effect capable of preventing an undesired decrease in the operating ratio of the printing system 1000 even when the printing system 1000 executes the test copy operation. As a further effect, the effect of shortening a total time necessary to process a plurality of jobs can be maximized.

As described above, the control unit 205 interrupts the production print operation of job X in response to an input from the operator via the key 2304B while the printer unit 203 executes the production print operation of job X. After interrupting the print operation of job X, the control unit 205 causes the printing system 1000 to start the check print operation of job X. At the end of the check print operation of job X, the control unit 205 causes the print apparatus 100 to resume (continue) the production print operation of print-interrupted job X. After executing again the production print operation of job X, the control unit 205 causes the touch panel unit 401 to automatically display the window 2300A for job X again.

As described above, when the operator presses the key 2304B, the control unit 205 controls the touch panel unit 401 to automatically end the popup display of the window 2300B in FIG. 13E and display the window 2300A of job X again. For example, the control unit 205 causes the touch panel unit 401 to execute a display shown in FIG. 13F when the production print operation of job X resumes.

Figure 13F:
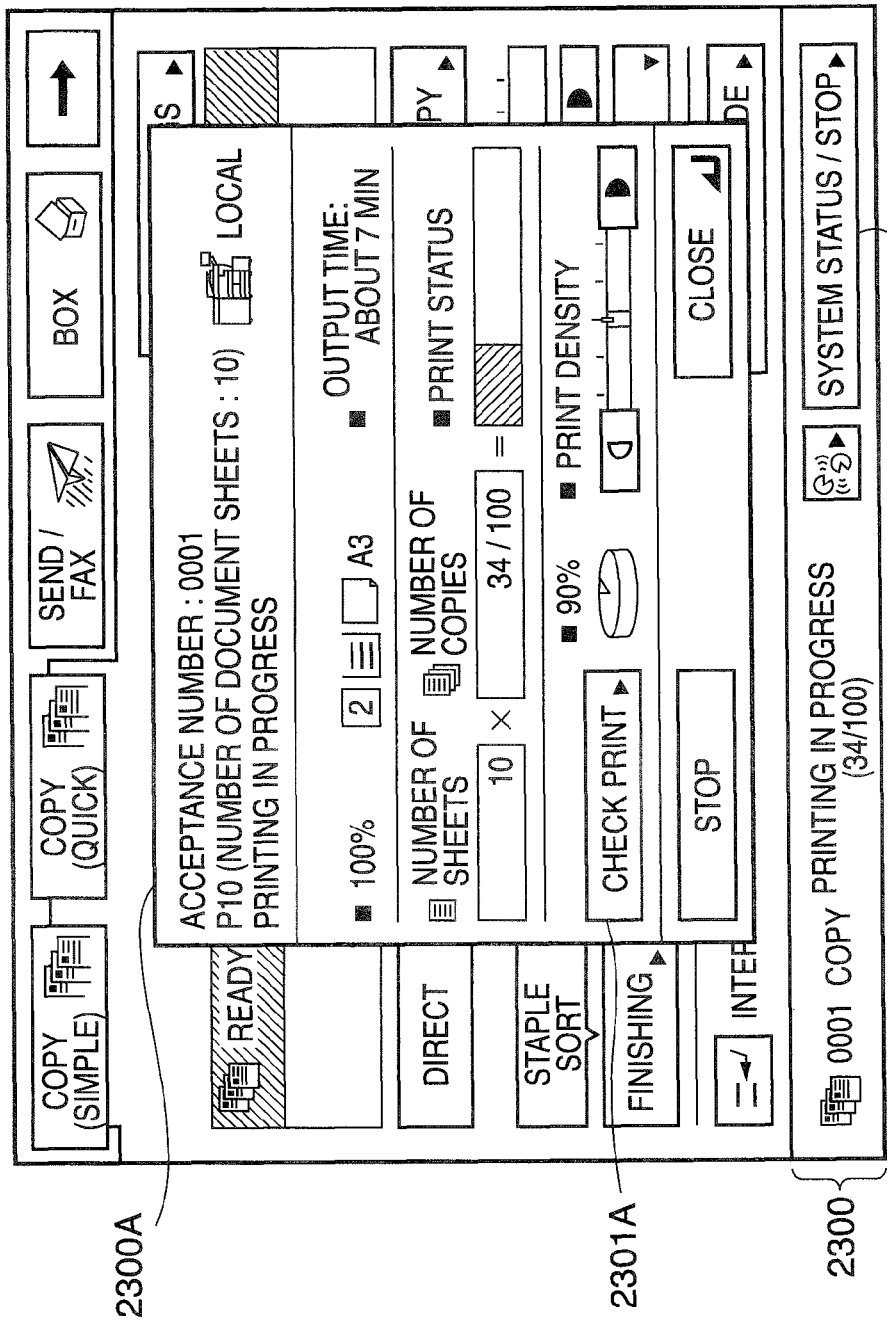
FIG. 13F is a view for explaining a control example associated with the operation unit 204.

In the stage in which the touch panel unit 401 executes the display in FIG. 13F, the check print operation of job X ended, and the print operation of job X has resumed. This stage corresponds to a stage in which the printing system 1000 executes the operation in [step 3] of FIG. 12B.

Assume that the control unit 205 causes the printing system 1000 to automatically resume the print operation of job X at the end of the check print operation of job X, as described above. Also assume that the production print operation of job X resumed IN the printing system 1000 progresses to currently print the 10th sheet of the 34th copy (34th set) of job X. In this case, the control unit 205 controls the touch panel unit 401 so that the display contents of the window for job X corresponding to a job of acceptance number 0001 match the current print progress, as represented by the window 2300A in FIG. 13F.

The control unit 205 controls the touch panel unit 401 to enable the "check print" key 2301A even in the window 2300A displayed again on the touch panel unit 401 as shown in FIG. 13F. Assume that the operator presses the active key 2301A in the window 2300A of FIG. 13F. In response to the key operation, the control unit 205 causes the touch panel unit 401 to display again the check print type window 2300B shown in FIG. 13E.

Assume that the operator presses again the key 2304B via the window 2300B in FIG. 13E displayed again on the touch panel unit 401. In response to the second check print request via the key 2304B, the control unit 205 controls the printing system 1000 to sequentially execute the following operations.

[Operation A1] The control unit 205 interrupts again the production print operation of job X that has resumed in the printing system 1000 at the end of the first check print operation of job X.

[Operation A2] The control unit 205 causes the printing system 1000 to execute the second check print operation of job X immediately after interrupting the print operation of job X. The second check print operation also executes print processing using print data of print operation-interrupted job X. Assume that the operator presses the key 2301B in the window 2300B before input of the second check print request via the key 2304B. In this case, the control unit 205 causes the printing system 1000 to execute the first type check print operation as the second check print operation. In contrast, assume that the operator presses the key 2302B in the window 2300B before input of the second check print request via the key 2304B. In this case, the control unit 205 causes the printing system 1000 to execute the second type check print operation as the second check print operation.

[Operation A3] The control unit 205 causes the printing system 1000 to automatically resume (continue) again the production print operation of job X immediately after the end of the second check print operation for job X. In this fashion, the second print resume operation of job X having undergone the check print operation twice is performed.

In the production print operation of job X that resumes in [operation A3], part of job X that has not been processed immediately before the start of [operation A2] is printed without printing part of job X that has been processed immediately before the start of [operation A2]. Assume that the operator inputs the second check print request via the key 2304B for job X immediately after the display in FIG. 13F. In this case, up to the 10th sheet of the 34th set of job X corresponding to a job requiring printing of a series of 10-page print data by 100 sets in total has been printed. Hence, the control unit 205 controls to print the 35th to 100th sets of job X as [operation A3].

On condition that the production print operation of a job for which printing has resumed is not complete and is in execution, the control unit 205 controls the operation unit 204 to permit acceptance of a check print request for the job again from the operator. Assume that the operator issues the check print request again. In this case, the control unit 205 causes the printing system 1000 to execute again the above-described series of processes (i.e., interruption of the production print operation, check print of the job, and resume of the production print operation of the job) for the job for which the check print request is issued again.

According to the embodiment, the control unit 205 permits acceptance of a check print request for a job repetitively from the operator as long as the production print operation is in execution. The control unit 205 controls the printing system 1000 to repetitively execute the check print operation of the job every time the check print request is input.

Assume that the target job requires printing of as many as 5,000 sheets. In this case, the first check print is executed for the job upon printing the 1,000th sheet. The second check print is executed for the job upon printing the 2,500th sheet. The third check print is executed for the job upon printing the 4,000th sheet.

The printing system 1000 according to the embodiment can be controlled to execute the check print operation repetitively at regular intervals even for a single job. While continuing the print operation, the operator can periodically confirm, like sampling check, whether the output results of printed materials in the production print operation of a job requiring large-volume printing have no problem. Without decreasing the productivity, the operator can periodically check whether the density of the output results, the print position, or the like has changed during printing. If the output results of the production printed materials of a job requiring large-volume printing has changed, the operator can quickly change the printing conditions to continue the print operation. This can provide an effect capable of preventing, e.g., the following problems:

(1) a problem that the operator notices a change of the output results of printed materials halfway only after inspecting all the print results of a job requiring large-volume printing upon completion of all the production print operation of the job.

(2) a problem that the production print operation is executed again for the job from the beginning upon completion of all the production print operation due to problem (1). Also, waste of resources and a dead operating time more than necessary due to this problem.

According to the embodiment, the control unit 205 controls the printing system 1000 to selectively accept a plurality of types of requests including at least any of the following requests (1) to (4) as operator requests, acceptance of which from the operator is permitted immediately after executing the check print operation.

[Operator Request (1), Acceptance of which is Permitted by Control Unit 205 Immediately after Executing Check Print]

Request (1) is an operator request to suspend the production print operation of a job that has resumed after executing the check print operation.

The control unit 205 enables accepting request (1) from the operator via the operation unit 204 while the printing system 1000 resumes the production print operation of a job having undergone check print. Upon accepting request (1), the control unit 205 controls the print apparatus 100 to suspend the production print operation. While the job is suspended, the control unit 205 controls the operation unit 204 so that the operator can change device-specific processing conditions which influences the output result of the job and those of subsequent queued jobs. After the operator changes the processing conditions, the control unit 205 controls the printing system 1000 to resume the production print operation of the job under the changed processing conditions. Upon completion of the print operation of the job, the control unit 205 controls the printing system 1000 to start, under the changed processing conditions, the production print operation of subsequent queued jobs whose print data are stored in the HDD 209.

In this manner, the control unit 205 can change (adjust) print processing conditions relating to processing conditions specific to the printing system 1000 after executing check print of one job. The processing conditions correspond to processing parameters (common to a plurality of jobs) which influence the output results of jobs including the check print-executed job. The control unit 205 causes the printing system 1000 to successively print these jobs under the changed processing conditions.

A concrete example of control based on request (1) will be explained with reference to the aforementioned job X.

Assume that the production print operation of job X has resumed, and the print operation is in execution in the printing system 1000. While the print operation of job X resumes, the operator visually checks the output result of the check printed material of job X output by the above-described check print operation. As a result of visually checking the output result of the check printed material of job X, the operator determines that processing conditions specific to the printing system 1000 need to be changed.

In this situation, the control unit 205 controls the touch panel unit 401 to enable a "system status/stop" key 2301 even while the window 2300A is kept displayed, as shown in FIG. 13F.

Assume that the operator presses the key 2301 in this situation. In response to the operation to the key 2301, the control unit 205 causes the touch panel unit 401 to execute a display shown in FIG. 14A while continuing the production print operation of job X in the printing system 1000.

Figure 14A:
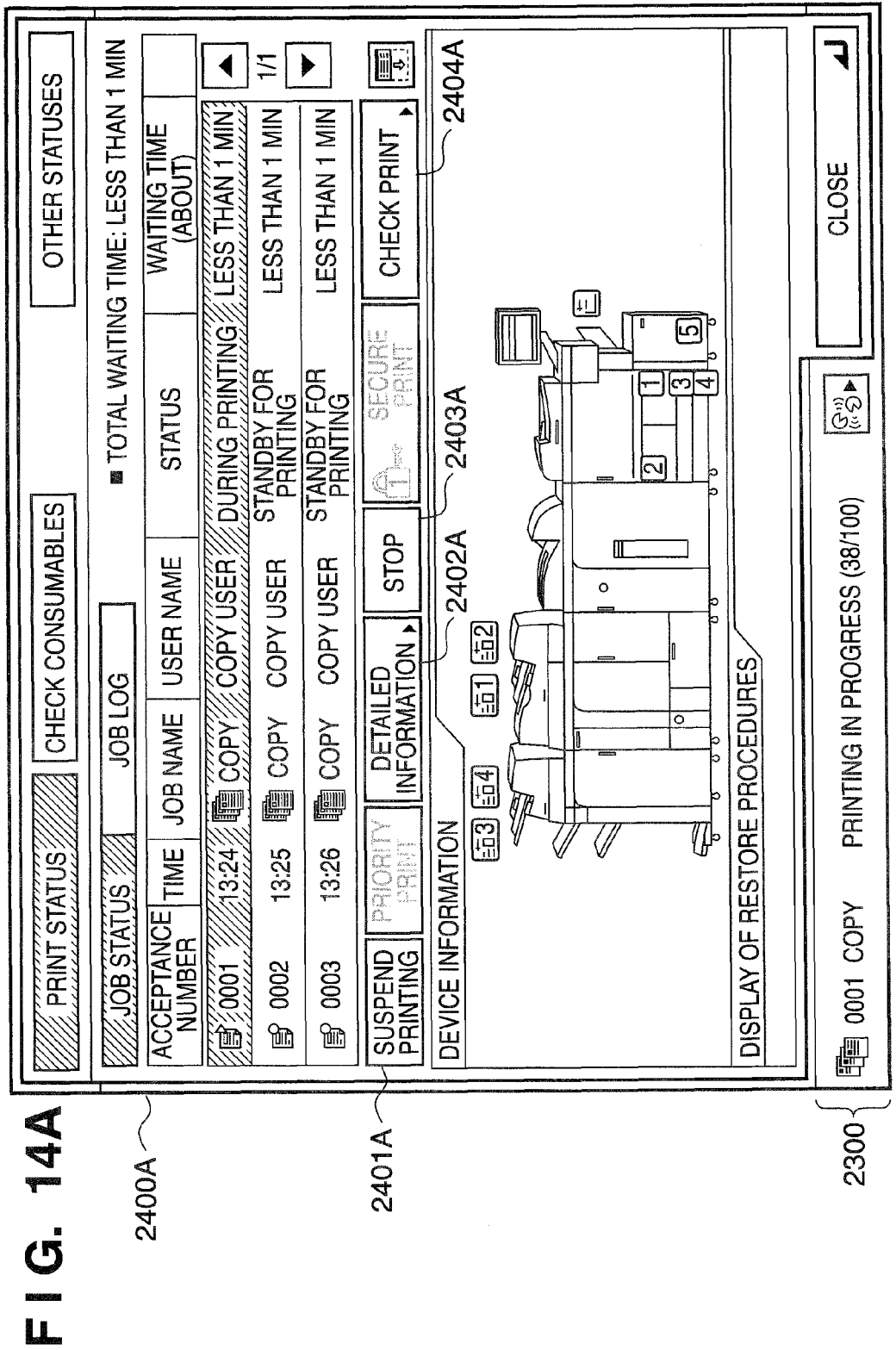
FIG. 14A is a view for explaining a control example associated with the operation unit 204.
Figure 14B:
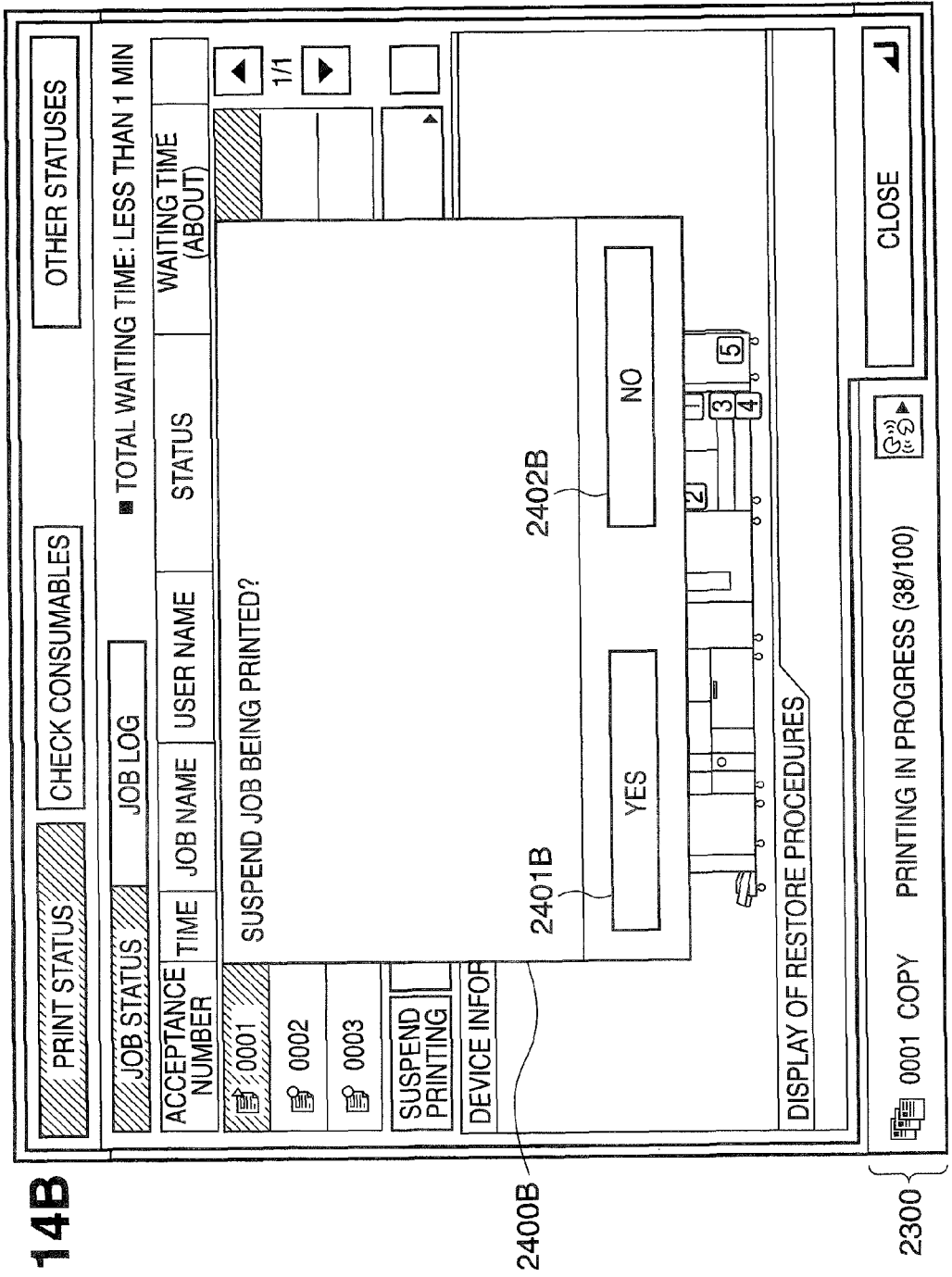
FIG. 14B is a view for explaining a control example associated with the operation unit 204.

The control unit 205 controls the touch panel unit 401 to display the display contents based on the following pieces of information in a window 2400A shown in FIG. 14A.

(Information 1) Information 1 is system configuration information of the printing system 1000. For example, this information notifies the operator of the number and order of sheet processing apparatuses connected to the print apparatus 100.

(Information 2) Information 2 is information of jobs, including a job being printed and a queued job, whose print data are stored in the HDD 209 and are to be printed by the printer unit 203. For example, information 2 contains information on the acceptance number, acceptance time, job name (job type), user name, and status.

Based on (information 1) and (information 2), the control unit 205 controls the touch panel unit 401 to display, in the window 2400A, device information visually expressing an outline of the printing system 1000, as shown in FIG. 14A.

Also based on (information 1) and (information 2), the control unit 205 controls the touch panel unit 401 to display a job list at an upper portion in the display area of the window 2400A, as shown in FIG. 14A.

When displaying the job list, the control unit 205 displays pieces of information of jobs in the job list discriminatively for each job. These jobs have print data stored in the HDD 209 and require a print operation by the printer unit 203. These jobs include a job being printed and a queued job.

For example, the production print operation of job X is in execution by the printer unit 203. In this case, the control unit 205 displays information of job X such as "(acceptance number) 0001, (time) 13:24, (job name) copy, (user name) COPY USER, (status) during printing, (waiting time) less than 1 min" at the top of the job list, as shown in FIG. 14A. As other queued jobs different from job X, the control unit 205 displays information of a job (to be referred to as job Y hereinafter) of acceptance number 0002, and information of a job (to be referred to as job Z hereinafter) of acceptance number 0003 in the second and subsequent lines of the job list. Jobs Y and Z are queued jobs different from job X.

The control unit 205 controls the order of jobs displayed in the job list in the window 2400A so that it coincides with the order of their print execution requests accepted from the operator. That is, the control unit 205 displays pieces of information of jobs in the list in the same order as the processing order by the printing system 1000.

The job list in the window 2400A allows the operator to select a desired one of jobs displayed in the job list in response to an operator operation to the touch panel unit 401. When the operator touches the display line of any job among a plurality of jobs in the job list shown in FIG. 14A, the control unit 205 determines that the operator has selected the job.

When the operator selects a desired job from the job list in the window 2400A, the control unit 205 controls the touch panel unit 401 to highlight the display line of the selected job so that the operator can specify the selected job. For example, in the display state of FIG. 14A, the operator selects job X.

The window 2400A further comprises the following display building elements.

A print suspension key 2401A is a display key which allows the operator to input an instruction to suspend the print operation of a job (job which requires a print operation by the printer unit 203 and has not been printed) selected from the job list in the window 2400A.

Assume that the operator presses the key 2401A in the display state of FIG. 14A. In this case, the control unit 205 suspends the print operation of job X in progress by the printer unit 203.

The control unit 205 controls the printing system 1000 to cancel the suspension of the print operation-suspended job and resume the print operation later in accordance with an instruction from the operator.

In the embodiment, when the operator inputs a print suspension instruction via the key 2401A, the start of executing the print operations of all jobs displayed in the job list of the window 2400A can be locked. For example, when the operator presses the key 2401A in the display stage of FIG. 14A, the control unit 205 stops the print operation of job X. The control unit 205 also inhibits the printing system 1000 from starting the print operations of queued jobs Y and Z. In this fashion, all jobs which need to be printed by the printing system 1000 can be suspended.

The control unit 205 may also control to lock (suspend) only the print operation of a job selected by the operator from the job list. Assume that the operator selects job X in the display state of FIG. 14A and presses the key 2401A. In this case, the control unit 205 may control the printing system 1000 to suspend only the print operation of job X and execute the print operations of subsequent jobs such as jobs Y and Z.

When the operator does not press the key 2401A, the control unit 205 causes the printer unit 203 to continue the print operation of a job (job X in this example) in execution while the touch panel unit 401 keeps displaying the window 2400A.

Even in this situation, the control unit 205 updates the display of the display field 2300 in correspondence with the progress of a job, as needed, in order to notify the operator in real time of information on the job being printed. For example, the 34th set of job X out of 100 sets is being printed in the display stage of FIG. 13F. However, job X progresses in the display stage of FIG. 14A. In this stage, for example, the printer unit 203 prints the 38th set of job X. In this case, as shown in FIG. 14, the control unit 205 displays, in the display field 2300, information which notifies the operator that the 38th set is being printed.

Assume that the operator presses the key 2401A in the window 2400A of FIG. 14A. In response to the press of the key 2401A, the control unit 205 causes the touch panel unit 401 to popup-display a window 2400B illustrated in FIG. 14B.

The window 2400B is a print suspension confirmation window configured to allow the operator to decide whether to suspend the print operation of a job in progress.

Assume that the operator presses a key 2402B in the window 2400B. In this case, the control unit 205 controls the touch panel unit 401 to end the display of the window 2400B and return to the display in FIG. 14A without stopping the print operation of job X in execution.

To the contrary, assume that the operator presses a key 2401B in the window 2400B. In this case, the control unit 205 stops the print operation of job X in progress. Accordingly, the control unit 205 suspends the print operation of job X.

By the above-mentioned method, the print operation by the printer unit 203 is suspended. In this situation, assume that the operator presses the user mode key 505 of the operation unit 204. In response to the key operation, the control unit 205 causes the touch panel unit 401 to execute a display illustrated in FIG. 14C.

The window 2400C is a display window capable of changing, in accordance with an instruction from the operator, processing conditions which commonly influence the print result of one job printed by the printer unit 203 and the print results of other jobs. The window 2400C is used when the printing system 1000 cleans a plurality of units of the printing system 1000 including the print apparatus 100.

Assume that the operator presses a "creep (shift) correction amount adjustment" key in the window 2400C while the production print operation of the above-described job X is suspended. In response to this operation, the control unit 205 causes the touch panel unit 401 to display a creep correction amount adjustment window (not shown).

The creep correction amount adjustment window (not shown) is a display window configured to allow the operator to input an instruction to finely adjust the print position of an image on a print medium (print sheet) that is to be printed by the printer unit 203. This window (not shown) is a display window configured to allow the operator to explicitly input a print image shift amount (creep correction amount) and the like.

The control unit 205 accepts the print position correction amount of an image on a print medium from the operator via the creep correction amount adjustment window (not shown). In the embodiment, the correction amount corresponds to a print processing condition specific to the printing system 1000. In the embodiment, this print processing condition corresponds to a parameter common to one job to be printed by the printer unit 203 and other jobs.

Assume that the operator changes the "creep correction amount" via the creep correction amount adjustment window (not shown), and then inputs an instruction to resume the print operation of job X. When suspension of the print operation of job X is canceled to resume the print operation of job X, the control unit 205 sequentially executes the following illustrative processes.

First, the control unit 205 controls print processing by the print apparatus 100 to adjust the print position of the print image of print data of job X on a print medium to a print position complying with the changed creep correction value.

Then, the control unit 205 controls print processing by the print apparatus 100 to adjust the print position of the print image of print data of job Y on a print medium to a print position complying with the changed creep correction value also in the print operation of job Y subsequent to job X.

Further, the control unit 205 controls print processing by the print apparatus 100 to adjust the print position of the print image of print data of job Z on a print medium to a print position complying with the changed creep correction value also in the print operation of job Z subsequent to job Y.

The control unit 205 controls the print apparatus 100 to complete the print operation of job X in accordance with a creep correction value whose setting has been changed by the operator via the window 2400C, and then automatically start the print operation of job Y in accordance with the setting-changed correction value. The control unit 205 controls the print apparatus 100 to automatically start the print operation of job Z in accordance with the setting-changed correction value upon completion of the print operation of job Y. In this way, the control unit 205 controls the printing system 1000 to automatically, successively process a plurality of target jobs while reflecting a correction value whose setting has been changed by the operator.

The printing system 1000 according to the embodiment is configured to deal with parameters in addition to the above-described ones as "print processing conditions relating to the print operations of jobs", for which the operator is permitted to change the settings of the print processing conditions after executing check print.

Assume that the operator presses a "density correction" key in the window 2400C while the production print operation of job X is suspended. In response to this operation, the control unit 205 causes the touch panel unit 401 to display a density correction window (not shown).

The density correction window (not shown) is a display window configured to allow the operator to input an instruction to finely adjust the print density of an image to be printed on a print medium (print sheet) by the printer unit 203. This window (not shown) is a display window configured to allow the operator to explicitly input a print image density and the like.

Assume that the operator changes the density setting in the density correction window (not shown) to be higher than the print density of the image of print data of job X on a print medium in the check print operation executed for job X. Then, the operator inputs an instruction to resume the print operation of job X. When suspension of the print operation of job X is canceled to resume the print operation of job X, the control unit 205 sequentially executes, for example, the following illustrative job processes.

First, the control unit 205 controls print processing by the print apparatus 100 to adjust the print density of the print image of print data of job X on a print medium to a print density complying with the changed density value.

Then, the control unit 205 controls print processing by the print apparatus 100 to adjust the print density of the print image of print data of job Y on a print medium to a print density complying with the changed density value even in the print operation of job Y subsequent to job X.

Further, the control unit 205 controls print processing by the print apparatus 100 to adjust the print density of the print image of print data of job Z on a print medium to a print density complying with the changed density value even in the print operation of job Z subsequent to job Y.

As described above, even when the operator changes the print density setting via the window 2400C in FIG. 14C, the control unit 205 processes a plurality of jobs, similar to the aforementioned case. That is, the control unit 205 controls the printing system 1000 to automatically, successively process all target jobs including jobs X, Y, and Z in accordance with the print density whose setting has been changed by the operator.

Other print processing conditions relating to the print operations of jobs exist in addition to processing conditions such as the "creep correction value" and "density correction value" described above. Other print processing conditions include "print processing conditions relating to automatic tone correction" and "processing conditions relating to text/background contrast adjustment". The control unit 205 also controls to allow the operator to change these print processing conditions via a window (not shown) displayed on the touch panel unit 401 in response to operator operations to an "automatic tone correction" key, "text/background contrast adjustment" key, and the like in the window 2400C.

In the embodiment, the control unit 205 can further accept an instruction from the operator via the window 2400C to execute the following illustrative cleaning by the printing system 1000.

(Feeder Cleaning) This processing is to clean the document feed unit of the auto document feeder (ADF) 301 in the scanner unit 201. A concrete example of performing this processing will be explained.

Assume that the operator presses a "feeder cleaning" key in the window 2400C while the production print operation of job X is suspended. In response to the key operation, the control unit 205 causes the touch panel unit 401 to display a feeder cleaning execution window (not shown) which allows the operator to input an instruction to start feeder cleaning by the ADF 301.

The feeder cleaning execution window (not shown) is a display window configured to present a guidance message such as "please set 10 blank sheets or so at the feeder and press the 'start' key" to the operator. This window (not shown) has a "start" key to cause the ADF 301 to clean the feeder.

Assume that the operator sets blank sheets for dirt removal on the document tray of the ADF 301 and presses the start key (not shown) in accordance with the guidance. In response to the key operation, the control unit 205 causes the ADF 301 to feed the blank sheets. The ADF 301 successively conveys the blank sheets by document feed rollers. As a result, dirt such as powder of a pencil attached to the document feed rollers of the ADF 301 is removed from the document feed rollers and attaches to the blank sheets. By successively feeding a specific number of blank sheets for dirt removal, dirt is removed from the document feed rollers.

In the embodiment, the processing to cause the printing system 1000 to clean the feeder also falls within processing to change print processing conditions specific to the printing system 1000.

The control unit 205 controls the printing system 1000 to resume the print operation of job X and successively process a plurality of jobs including job X and subsequent jobs Y and Z after cleaning the feeder.

In the embodiment, the control unit 205 can accept an instruction from the operator via the window 2400C to execute the following illustrative cleaning by the printing system 1000.

(Wire Cleaning) This processing is to clean a wire unit (not shown) in the printer unit 203. A concrete example of performing this processing will be explained.

Assume that the operator presses a "wire cleaning" key in the window 2400C while the production print operation of job X is suspended. In this case, the control unit 205 causes the touch panel unit 401 to display a wire cleaning execution window (not shown) which allows the operator to input an instruction to start this cleaning by the printer unit 203.

The wire cleaning execution window (not shown) has a "start" key to cause the printer unit 203 to clean the wire unit in the printer unit 203.

Assume that the operator presses the start key (not shown). In response to this, the control unit 205 causes the printer unit 203 to clean the wire unit (not shown) in the printer unit 203.

In the embodiment, "processing to clean the wire unit (not shown) in the printer unit 203" also falls within "processing to change print processing conditions relating to the print operation".

The control unit 205 controls the printing system 1000 to resume the print operation of job X and successively process a plurality of jobs including job X and subsequent jobs Y and Z after cleaning the wire unit in the printer unit 203.

In addition to the aforementioned cleaning processes, there is an item to clean the convey rollers of the printer unit 203 for conveying a print sheet. For example, when the operator presses a "roller cleaning" key in the window 2400C, the control unit 205 causes the printer unit 203 to clean the convey rollers in the printer unit 203. In the embodiment, the processing to execute this cleaning also falls within processing to change print processing conditions relating to the print operation. The control unit 205 controls the printing system

1000 to resume the print operation of job X and successively process a plurality of jobs including job X and subsequent jobs Y and Z after cleaning the convey rollers in the printer unit 203.

In the embodiment, assume that change of the above-mentioned print processing conditions is complete in accordance with an instruction accepted from the operator via the window 2400C while the print operation of job X is suspended. Then, the operator presses the "system status/stop" key. The control unit 205 causes the touch panel unit 401 to execute a display illustrated in FIG. 14D while keeping the production print operation of job X suspended.

As shown in FIG. 14D, the control unit 205 causes the touch panel unit 401 to popup-display the window 2400D while the display field 2300 displays information that the print operation of job X is suspended.

The window 2400D is a display window configured to allow the operator to decide whether to cancel the suspension of the print operation in the printing system 1000 and resume the print operation by the printer unit 203.

Assume that the operator presses a key 2402D in the window 2400D. In this case, the control unit 205 ends the display of the window 2400D without resuming the print operation by the printer unit 203 while keeping the print operation suspended. The control unit 205 causes the touch panel unit 401 to display, e.g., the window 2400A again. The control unit 205 controls the touch panel unit 401 to represent the suspension of the print operation of job X in the job list in the window 2400A.

In contrast, assume that the operator presses the key 2401D in the window 2400D. In this case, the control unit 205 cancels the suspension of the print operation in the printing system 1000, and causes the printer unit 203 to resume the print operation. Consequently, the control unit 205 causes the printing system 1000 to resume the production print operation of job X.

Assume that the operator has changed, via the window 2400C, print processing conditions commonly relating to the print operations of jobs including job X before input of an instruction from the operator via the key 2401D of the window 2400D. In response to the input from the key 2401D, the control unit 205 causes the printing system 1000 to resume the production print operation of job X. At this time, the control unit 205 causes the printing system 1000 to execute a print operation complying with the setting-changed print processing conditions accepted before the input from the key 2401D. Upon completion of printing of entire job X, the control unit 205 causes the printing system 1000 to execute the print operation of job Y. Also in the print operation of job Y, the control unit 205 causes the printing system 1000 to execute a print operation complying with the setting-changed print processing conditions. Upon completion of printing of entire job Y, the control unit 205 causes the printing system 1000 to execute the print operation of job Z. Also in the print operation of job Z, the control unit 205 causes the printing system 1000 to execute a print operation complying with the setting-changed print processing conditions.

Note that various print processing conditions subjected to setting change in the window 2400C are all illustrative.

As described above, after the operator checks the output results of check printed materials by the check print operation, the control unit 205 can accept a change of print processing conditions relating to the print operations of not only a job having undergone check print but also other jobs. Then, the control unit 205 can cause the printing system 1000 to print a plurality of jobs under the setting-changed processing conditions.

The embodiment also enables changing only print processing conditions specific to a job having undergone the check print operation.

For example, the control unit 205 controls the touch panel unit 401 to display the window 2300A again while the printing system 1000 resumes and continues the production print operation of job X after executing check print. The window 2300A repetitively displayable during execution of the production print operation has a display key to select the print density.

Assume that the operator presses the print density adjustment key in the redisplayed window 2300A of FIG. 13F while the production print operation of job X is resumed and executed.

By this operation, the operator requests a change of the print density for job X during the resume operation of the print operation of job X. In this case, the control unit 205 controls the printing system 1000 to change the print density midway along a series of print steps of job X and continue the production print operation of job X without stopping the production print operation of job X. For example, the control unit 205 controls the printing system 1000 to print the print image of job X on a print medium at the changed print density at the timing when the image of job X is printed on a print medium fed from the paper feed unit immediately after the operator presses the print density adjustment key.

In this manner, the control unit 205 controls to automatically change the print density midway along a series of print steps in the production print operation of job X in accordance with a print density change instruction accepted via the window 2300A.

The control unit 205 causes the printer unit 203 to automatically start the print operation of job Y at the end of the production print operation of job X. In this case, the control unit 205 controls the printing system 1000 to execute print processing based on a print density set by the operator for job Y in the print operation of job Y.

The control unit 205 causes the printer unit 203 to automatically start the print operation of job Z at the end of the production print operation of job Y. Also in this case, the control unit 205 controls the printing system 1000 to execute print processing based on a print density set by the operator for job Z in the print operation of job Z.

As described above, job-specific print processing conditions relating to a job having undergone the check print operation but not with other jobs can also be changed. The control unit 205 controls the printing system 1000 to execute a print operation by changing only the settings of the print processing conditions of only the target job, and automatically process subsequent jobs in series in their print operations under job-specific printing conditions regardless of the setting change.

The printing system 1000 according to the embodiment is also configured to meet the following request in addition to request (1).

[Operator Request (2), Acceptance of which is Permitted by Control Unit 205 Immediately after Executing Check Print]

Request (2) is an operator request to stop (cancel) the production print operation of a job that has resumed after executing the check print operation.

Upon receiving request (2), the control unit 205 quickly stops the production print operation of a job that started immediately after executing the check print operation.

A concrete example of request (2) will be described.

Assume that the production print operation of job X has resumed at the end of the check print operation and is in execution in the printing system 1000. In this situation, the operator selects a job of acceptance number 0001 corresponding to job X from the job list in the window 2400A. In this case, the control unit 205 highlights the display line of the job information, as shown in FIG. 14A. Assume that the operator selects job X from the job list and presses a stop key 2403A in the window 2400A. In response to the key operation, the control unit 205 causes the touch panel unit 401 to execute a display shown in FIG. 14F.

When the operator presses the stop key 2403A, the control unit 205 causes the touch panel unit 401 to popup-display the window 2400F while the display field 2300 displays a message that job X is being printed, as shown in FIG. 14F.

The window 2400F is a display window configured to allow the operator to decide whether to cancel the print operation of a job (job X in this example) in execution.

Assume that the operator presses a key 2402F in the window 2400F. In this case, the control unit 205 causes the touch panel unit 401 to end the display of the window 2400D while maintaining the print operation of job X in execution. The control unit 205 causes the touch panel unit 401 to display the window 2400A again.

Assume that the operator presses a key 2401F in the window 2400F. In this case, the control unit 205 controls the printing system 1000 to stop the print operation of job X in execution. As the job stop processing, for example, the control unit 205 controls the printing system 1000 to execute all the following illustrative processes.

(Stop Processing 1) The control unit 205 controls the print apparatus 100 to stop the print operation of job X.

(Stop Processing 2) The control unit 205 controls the print apparatus 100 to erase 10-page print data of job X from the HDD 209.

(Stop Processing 3) The control unit 205 controls the touch panel unit 401 to delete job information of job X from the job list in the window 2400A.

As described above, when the operator uses the key 2401F to input an instruction to stop processing for job X, the control unit 205 controls the printing system 1000 to perform stop processing (cancel processing) including (stop processing 1) to (stop processing 3). When the operator presses the key 2401F, the control unit 205 further executes the following control.

(Control 1) The control unit 205 controls the print apparatus 100 so that the printer unit 203 automatically starts the print operation of job Y immediately after performing the aforementioned cancel processing of job X. The control unit 205 controls the touch panel unit 401 to update the display contents of the system configuration information window 2400A and reflect the start of the print operation of job Y in the job list. In this case, for example, the control unit 205 controls the touch panel unit 401 to change the display contents of the window 2400A from those in FIG. 14A to those in FIG. 14H.

(Control 2) The control unit 205 controls the print apparatus 100 so that the printer unit 203 automatically starts the print operation of job Z upon completion of the print operation of job Y. The control unit 205 controls the touch panel unit 401 to update the display contents of the window 2400A and reflect the completion of the print operation of job Y and the start of the print operation of job Z in the job list.

Assume that the production print operation of job X stops. In this case, for example, the display returns to one in FIG. 7 or 13A, and the operator can set printing conditions for job X from the beginning. The operator can input job X again as a job requiring a print operation complying with the changed print processing conditions, and perform this print operation.

In this case, the control unit 205 controls the printing system 1000 to process job X input again after processing jobs Y and Z.

The printing system 1000 according to the embodiment is also configured to meet the following request in addition to request (2).

[Operator Request (3), Acceptance of which is Permitted by Control Unit 205 Immediately after Executing Check Print]

Request (3) is an operator request to cause the touch panel unit 401 to display detailed information on the production print operation of a job that has resumed after executing the check print operation.

A concrete example of request (3) will be explained.

Assume that the production print operation of job X has resumed and is in execution. In this situation, the operator selects job X from the job list in the window 2400A, and presses a key 2402A in the window 2400A. In response to the key operation, the control unit 205 causes the touch panel unit 401 to execute a display shown in FIG. 14E.

A window 2400E illustrated in FIG. 14E is a display window configured to allow the operator to confirm detailed information of a job selected by him from the job list in the window 2400A. In the example of FIG. 14E, the control unit 205 causes the touch panel unit 401 to display detailed job information of job X during execution of the production print operation of job X for which print operation has automatically resumed upon completion of the check print operation of outputting the check printed materials of job X. When the operator presses the "close" key in the window 2400E, the control unit 205 controls the touch panel unit 401 to return to the display in FIG. 14A. The control unit 205 controls the touch panel unit 401 to change the window 2400A to display contents reflecting execution of the print operation of job X in the job list.

According to the embodiment, the operation unit 204 can display detailed information of a job subjected to check print while the production print operation of the job is in execution after executing check print.

The printing system 1000 according to the embodiment is also configured to meet the following request in addition to request (3).

[Operator Request (4), Acceptance of which is Permitted by Control Unit 205 Immediately after Executing Check Print]

Request (4) is an operator request to execute again check print of a job for which the production print operation has resumed and is in execution after executing the check print operation.

A concrete example of request (4) has already been described in detail with reference to FIG. 13F, and a description thereof will not be repeated.

As illustrated with reference to FIGS. 14A to 14F and 14H, the control unit 205 can selectively accept the above-described four types of requests from the operator via the operation unit 204 immediately after causing the printing system 1000 to execute the check print operation. The control unit 205 can selectively accept the above-described four types of requests from the operator via the operation unit 204 while the production print operation of a job having undergone the check print operation resumes. Upon accepting any request, the control unit 205 controls the printing system 1000 according to the embodiment including the print apparatus 100 to execute processing and an operation complying with the accepted request.

As described with reference to FIG. 13F, the control unit 205 permits acceptance of a check print request repetitively from the operator for a job being printed unless the printing system 1000 ends the print operation. However, the control unit 205 inhibits acceptance of a check print request from the operator for a job other than one being printed.

For example, the control unit 205 causes the touch panel unit 401 to display the window 2400A in FIG. 14A in accordance with an instruction from the key 2301 while the printing system 1000 continues the production print operation of job X.

Assume that the operator selects a job of acceptance number 0001 corresponding to job X from the job list in the window 2400A in the situation in which the production print operation of job X is in execution. In this case, the control unit 205 highlights the display line of the job information in the job list, as shown in FIG. 14A.

Assume that the operator selects the job of acceptance number 0001, i.e., job X being printed in the window 2400A. In this case, the control unit 205 controls the touch panel unit 401 to enable a key 2404A in the window 2400A, as shown in FIG. 14A. When the operator presses the key 2404A, the control unit 205 controls the touch panel unit 401 to display the window 2300B in FIG. 13E again. When the operator inputs a check print request for job X again via the key 2304B, the control unit 205 causes the printing system 1000 to interrupt the production print operation of job X again and execute the second check print of job X, as described above. In this fashion, the control unit 205 can also accept a check print request from the operator even via the window 2400A. As a result, the check print operation can be executed a plurality of number of times for a single job without using the redisplayed window 2300A, as described with reference to FIG. 13F.

Figure 14G:
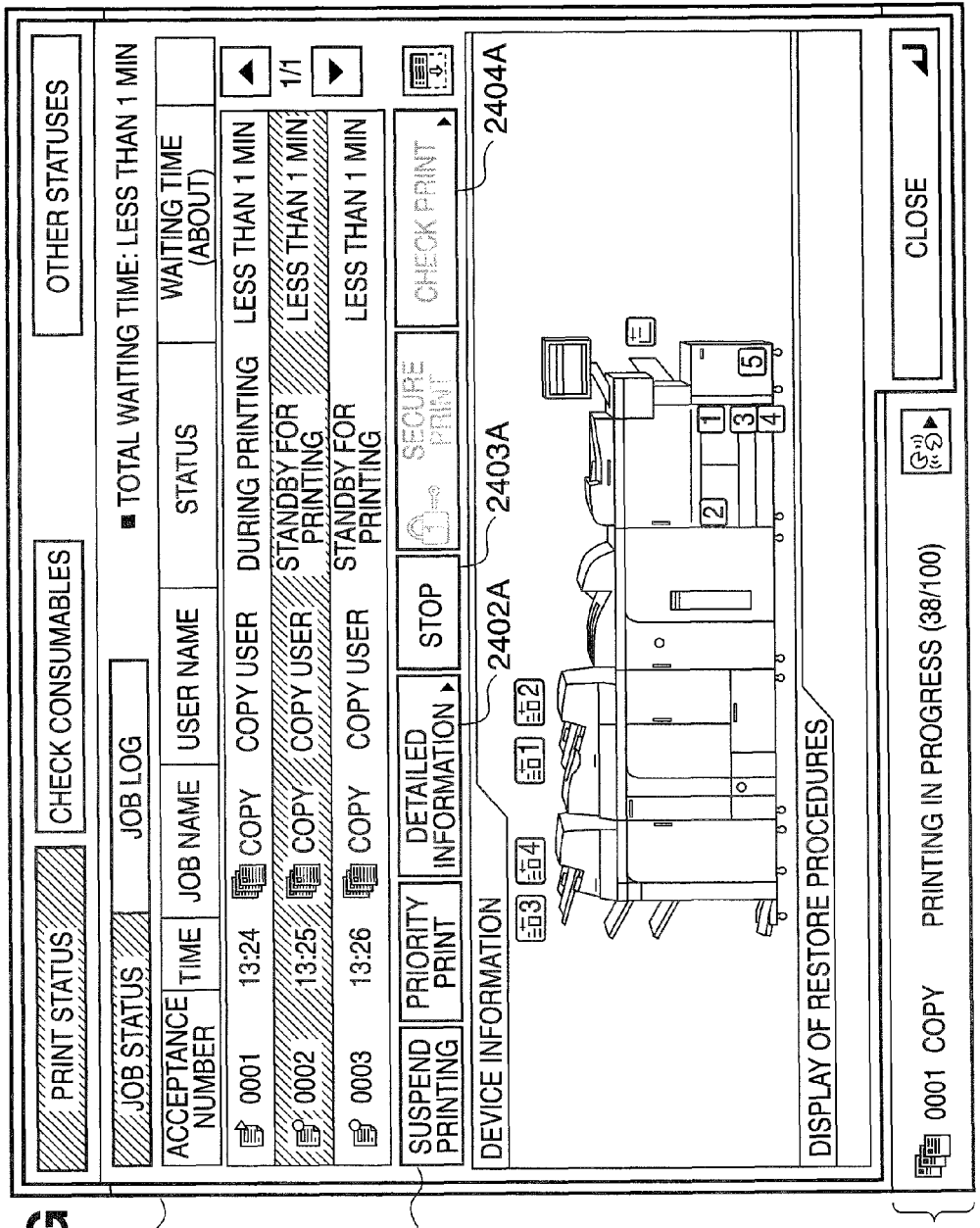
FIG. 14G is a view for explaining a control example associated with the operation unit 204.
Figure 14H:
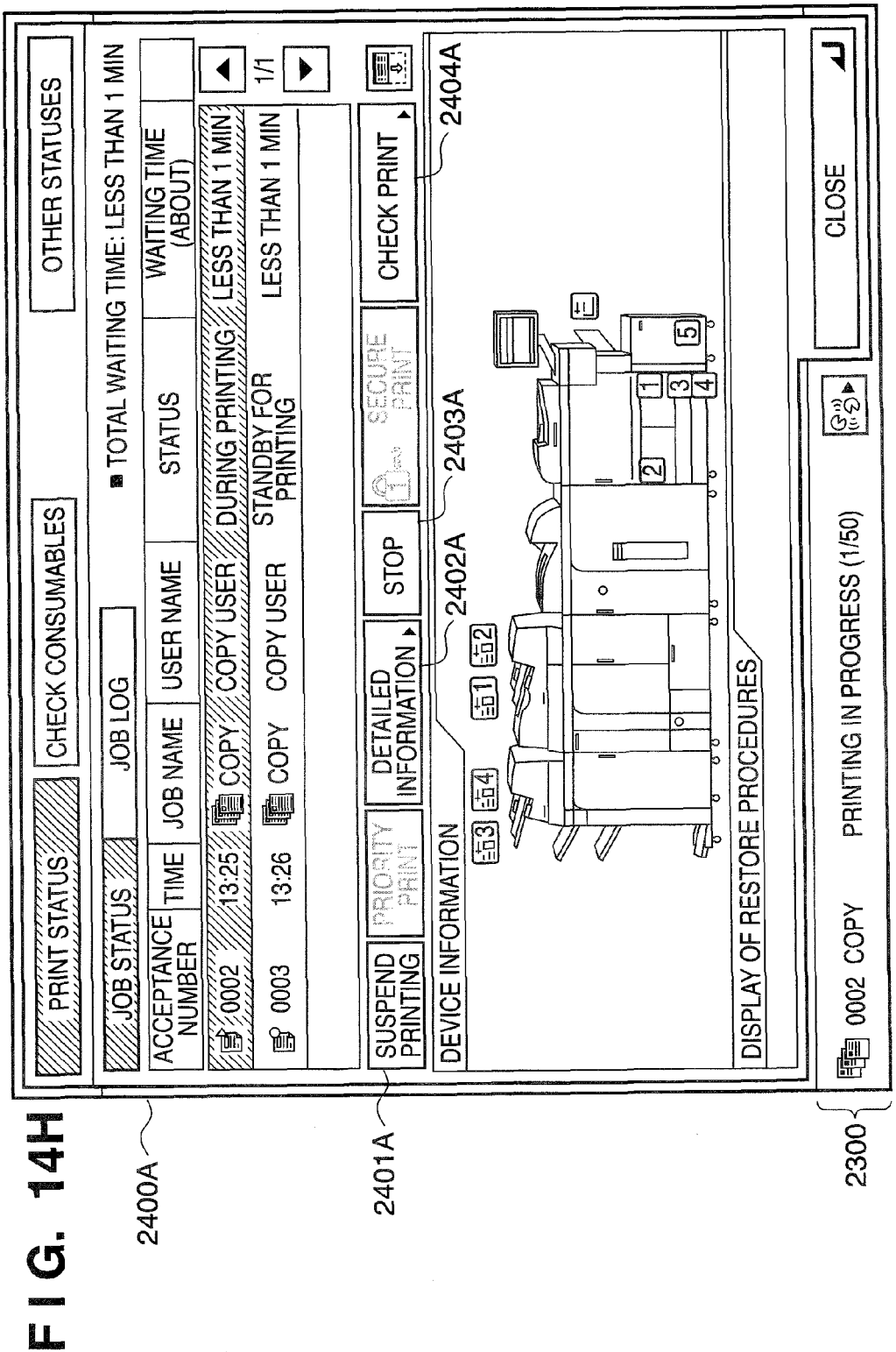
FIG. 14H is a view for explaining a control example associated with the operation unit 204.

Assume that the operator selects a job other than one being printed from the job list in the window 2400A. For example, the operator selects job Y of acceptance number 0002 from the job list in the window 2400A. When the operator selects the queued job in the window 2400A, the control unit 205 controls the touch panel unit 401 to disable the key 2404A in the window 2400A. For example, when the operator selects job Y, the control unit 205 controls the touch panel unit 401 to gray out the display of the key 2404A, as shown in FIG. 14G. In this way, when the operator selects a job other than one being printed via the operation unit 204, the control unit 205 controls the operation unit 204 to inhibit acceptance of a check print request from the operator for the selected job. The control unit 205 controls the printing system 1000 to neither interrupt the print operation of job X nor execute a check print operation of outputting the printed materials of jobs Y and Z.

As described with reference to FIGS. 14A to 14H and the like, the configuration relevant to the check print function of the printing system 1000 according to the embodiment has the following effects. More specifically, the operator can quickly, visually check a check printed material output by the check print function for a job being printed by the printing system 1000. Even when the sheet feeding path in the printing system 1000 becomes long by connecting a plurality of sheet processing apparatuses to the print apparatus 100 as shown in FIG. 3, the operator can quickly, easily determine a job being printed and its image. Even when the destination of the printed materials of a job being printed is a destination inside a sheet processing apparatus such as the large-volume stacker or glue binding apparatus, the operator can quickly, easily determine a job being printed and its image. Even while the operator confirms the check printed material, the printing system 1000 can continue the print operation smoothly. Hence, the print operation can continue without undesirably decreasing high operating ratio of the printing system 1000.

The control unit 205 controls the printing system 1000 to complete a plurality of jobs after changing print processing conditions relating to jobs including a job subjected to the check print operation and subsequent jobs, as described with reference to FIG. 14C. The embodiment can, therefore, obtain an effect capable of building a printing environment where the qualities of the print results of all jobs do not wastefully drop without individually changing the processing conditions of each job. The printing system 1000 is configured to quickly cancel the production print operation of job X when a check print result is undesirable, as described with reference to FIG. 14F and the like. As an effect obtained by the check print operation, an effect specific to a job subjected to the check print operation can also be attained. A wasteful output can be suppressed as much as possible even in the printing environment where it is important to process a plurality of jobs at productivity as high as possible.

The control unit 205 causes the touch panel unit 401 to display the window 2300A configured to display the key 2301A as shown in FIGS. 13B to 13D and the like while the production print operation is in execution in [step 1] of FIG. 12B.

Assume that the operator presses the active key 2301A as in the window 2300A in FIGS. 13C and 13D on the touch panel unit 401 while the target job is being printed. In step S109 of FIG. 16 (to be described later), the control unit 205 determines whether it has accepted a check print request from the operator, on the basis of whether the operator has pressed the active key 2301A.

When the control unit 205 determines that the operator has pressed the key 2301A, it causes the touch panel unit 401 to display the check print type selection window 2300B, as shown in FIG. 13E. This corresponds to a case where the control unit 205 determines YES in step S109 of FIG. 16 and advances the process to step S110.

The state in which the touch panel unit 401 displays the window 2300B is the stage of [step 1] in FIG. 12B, i.e., the state in which the production print operation of a job subjected to the check print operation continues.

Assume that the operator presses either the key 2301B or key 2302B in the window 2300B. This corresponds to a case where the control unit 205 determines YES in step S111 of FIG. 16.

As described above, upon accepting a check print start instruction in response to the press of the key 2304B by the operator, the control unit 205 interrupts the production print operation in execution in the printing system 1000 for the job subjected to check print. Upon completion of interrupting the production print operation, the control unit 205 causes the printing system 1000 to automatically start check print of a type corresponding to either the key 2301B or 2302B designated by the operator.

In the embodiment, when interrupting the production print operation, the control unit 205 controls the printing system 1000 to execute, e.g., the following control as the production print operation interruption processing.

Assume that feed of printed materials from the paper feed unit of the printing system 1000 for the production print operation has already started upon receiving a check print start instruction. In this case, the control unit 205 controls the printer unit 203 to print on all the fed production printed materials. The control unit 205 controls to discharge all the production printed materials of the job to the destination (delivery destination) of a sheet processing apparatus used to hold the final product of the job. Then, the control unit 205 controls to hold the final product at the destination.

The control unit 205 causes the printing system 1000 to execute the above-described interruption processing when the printing system 1000 has already started feeding production printed materials upon receiving a check print request from the operator.

The control unit 205 permits feed of a check print medium for the job from the paper feed unit of the printing system 1000 even when not all the production printed materials, feed of which has already started upon receiving a check print request, are discharged to their destination.

This can prevent any delay of the check print execution timing even if the print medium feeding path is long in the printing system 1000, as shown in FIG. 3.

The printing system 1000 according to the embodiment is configured to start check print before the completion of discharging, to the destination of the printing system 1000, all production printed materials, which have already been fed upon receiving a check print request. This can prevent any trouble such as a delay of the check printed material output completion timing due to a trouble such as a delay of the check print start timing. This can also prevent any trouble such as the influence on the productivity of jobs including a target job and subsequent jobs due to a delay of the timing when the operator visually checks a check printed material or a delay of the timing when the production print operation resumes, which delays are caused by the above-mentioned trouble.

In this manner, the control unit 205 controls the printing system 1000 to feed a check printed material from the paper feed unit even if feed of production printed materials has already started upon receiving a check print start instruction and not all the printed materials have been discharged to the destination.

As a concrete example, the system configuration in FIG. 3 will be described. Assume that the target job is a job whose production printed materials are to be discharged to destination Z of the saddle stitching apparatus 200-3c in FIG. 3 by the production print operation. In this situation, feed of the production printed materials of the job from the paper feed deck 319 just stated upon receiving a check print start instruction.

In this case, for example, after confirming that production printed materials, feed of which has already started, have passed through point A in FIG. 3, the control unit 205 controls the print apparatus 100 so that the operator takes out the check printed material of a job from the paper feed deck 319 and feed processing starts. On condition that the production printed materials have passed through point A in FIG. 3, the control unit 205 starts feeding the check printed material regardless of whether the production printed materials have been discharged to delivery destination (destination) Z.

The control unit 205 enables the printing system 1000 to start the check print operation as quickly as possible after interrupting the production print operation. Hence, the control unit 205 enables the printing system 1000 to execute the check print operation without undesirably delaying the start of the check print operation.

In the embodiment, the printing system 1000 is configured to execute the same operation as that of the above-mentioned configuration even when resuming the production print operation after executing check print.

For example, referring back to FIG. 3, after confirming that a check printed material has passed through point A in FIG. 3, the control unit 205 controls the print apparatus 100 so that the operator takes out the production printed materials of a job from the paper feed deck 319 and feed processing starts. On condition that the check printed material of the job having undergone check print has passed through point A in FIG. 3, the control unit 205 starts feeding printed materials necessary for the production print operation of the job regardless of whether the check printed material has been discharged to the delivery destination (destination).

As described above, the control unit 205 causes the printing system 1000 to start the check print operation from time TX in FIG. 12B on the basis of a check print start request from the operator using the key 2304B. The control unit 205 causes the printing system 1000 to automatically resume the production print operation of the job having undergone check print upon completion of check print, i.e., from time TY in FIG. 12B. The resume processing corresponds to [step 3] in FIG. 12B.

In the resume processing for the production print operation of the job, the control unit 205 controls the printing system 1000 to print only part of the job that has not been processed during the period immediately before [step 2] in FIG. 12B.

In the resume processing, the control unit 205 utilizes, as information necessary for the resume processing, information which represents the processing status (progress) of a target job and is used by the control unit 205 as information necessary for display processing of the window 2300A. The control unit 205 controls at least the HDD 209 to hold this information until the printing system 1000 completes all the production print operation of the target job.

When the production print operation resumes, the control unit 205 causes the touch panel unit 401 to automatically display the window 2300A for the job again. For example, the control unit 205 enables the touch panel unit 401 to display the window 2300A for the job during the resume operation period of the production print operation in [step 3] of FIG. 12B. Assume that the current timing falls within the period from time immediately after the production print operation of a given job starts to time immediately before the production print operation of the job ends. In this case, the control unit 205 controls the printing system 1000 to repetitively execute the check print operation of one job every time the operator inputs a check print request via the key 2301A displayed again on the touch panel unit 401.

During the execution period of the production print operation resumed from time TY in FIG. 12B in the printing system 1000, the control unit 205 selectively accepts the aforementioned operator requests (1) to (4) from the operator via the operation unit 204. The control unit 205 enables the printing system 1000 to execute processing corresponding to the accepted request.

In the embodiment, the control unit 205 controls the printing system 1000 to allow the operator to change the above-described device-specific settings of the printing system 1000 while continuing the production print operation of a job resumed from time TY in FIG. 12B. For example, the control unit 205 accepts a request via the window 2400C in FIG. 14C to change the device-specific settings of the printing system 1000 while the production print operation resumes in [step 3] of FIG. 12B. In this case, the control unit 205 controls the printing system 1000 to automatically change the print operation processing conditions of the job upon accepting the request. Also when executing the print operations of subsequent jobs to be processed after the current job, the control unit 205 controls the printing system 1000 to keep processing the subsequent jobs under setting-changed print processing conditions accepted from the operator via the window 2400C.

Assume that the density of print results gradually decreases as a result of executing check print for the same job repetitively at regular intervals. Even in this case, if the operator changes settings via the window 2400C to increase the density, the output result of a job being printed and those of subsequent jobs can be obtained at proper print density.

The embodiment further comprises a configuration in which the control unit 205 controls the printing system 1000 to prevent check printed materials obtained by the check print operation from being mixed with production printed materials when the printing system 1000 performs the check print operation. For example, the control unit 205 controls the printing system 1000 to output the check printed materials to a destination different from that of the production printed materials. In this case, the control unit 205 further controls the printing system 1000 to allow the operator to confirm the destination of the check printed materials.

A concrete example of this configuration will be described later with reference to FIGS. 16 to 23E.

In addition to the configuration concerning the check print function, even when the printing system is configured to meet needs such as a need "to execute check print while the printing system 1000 continuously performs the print operation", this configuration can also attain the above-described effects without generating any new problems illustrated below:

(1) a problem that check printed materials are mixed with production printed materials serving as a product as a result of building the printing system 1000 to execute check print while it continuously performs the print operation.

(2) problems such as a heavy burden on the operator and low working efficiency caused by problem (1) because the operator must search many printed bundles for check printed materials if problem (1) occurs.

(3) problems such as low working efficiency of the overall system and a failure to maintain high productivity.

The printing system 1000 according to the embodiment can obtain the above-described effects by the check print function without generating these problems. A concrete configuration will be explained with reference to FIGS. 16 to 23E.

Flowcharts shown in FIGS. 16 to 19 also contain processes corresponding to the above-described control operations related to the check print operation executed by the control unit 205.

The flowchart in FIG. 16 will be explained first.

Figure 16:
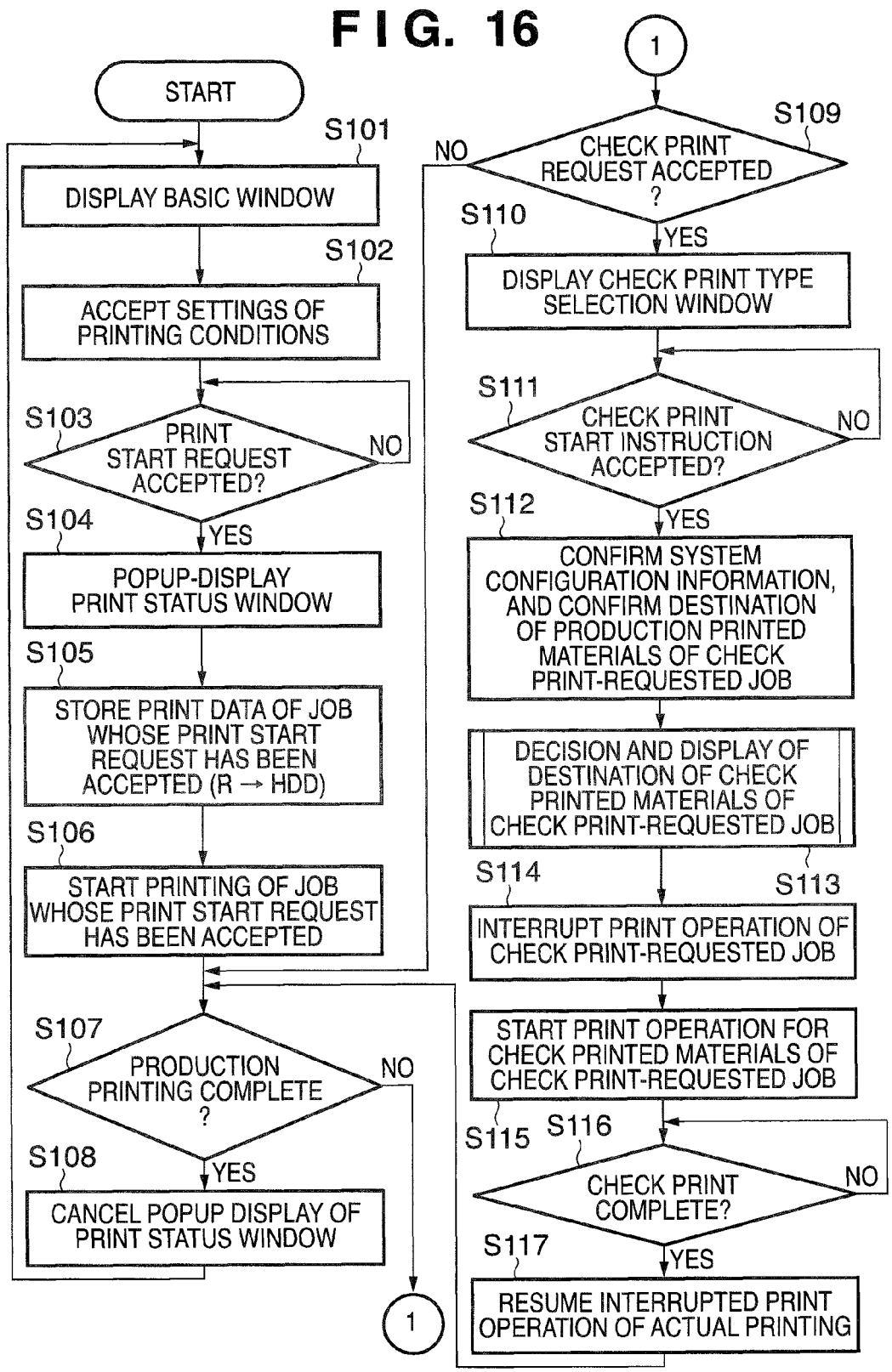
FIG. 16 is a flowchart for explaining a control example according to an embodiment of the present invention.

In step S101 of FIG. 16, the control unit 205 causes the touch panel unit 401 of the operation unit 204 to display the basic window of the printing system 1000 as shown in FIG. 7 after the print apparatus 100 is turned on.

In step S102 of FIG. 16, the control unit 205 accepts the settings of various printing conditions in response to a key operation by the operator via the operation unit 204.

In step S103 of FIG. 16, the control unit 205 determines whether it has accepted the print start request of a target job, on the basis of whether the operator has pressed the start key 503.

Assume that the operator inputs a series of print processing conditions via the operation unit 204 for the target job and then presses the start key 503. In this case, the control unit 205 detects the print start request (start key input), and determines YES in step S103. The control unit 205 advances the process from step S103 to step S104.

In step S104, the control unit 205 controls the touch panel unit 401 to popup-display the job processing status window (print status window) 2300A shown in FIG. 13B and the like as a display representing the processing conditions (progress) of the print start-requested job.

The control unit 205 controls the print apparatus 100 to execute a process in step S105 at the same time as (in parallel with) executing the process in step S104.

Assume that the job requires a document scan operation by the scanner unit 201. In this case, in step S105, the control unit 205 causes the scanner unit 201 to start the scan operation of the job. The control unit 205 stores the print data of the scanned job sequentially from the first page in the HDD 209. This storage operation continues until the HDD 209 stores print data of the final page of the job. The control unit 205 controls the printing system 1000 to execute, in step S105, the operation of storing print data of a print start-requested job in the HDD 209.

If the print start-requested job is a job to the box function of the print apparatus 100, the control unit 205 shifts to a process in step S106 without performing the process in step S105.

The box function is to hold target print data of all pages in the HDD 209 via the scanner unit 201 or external I/F 202 before accepting a print start request from the operator via the operation unit 204. Also, the box function is to print the print data stored in the HDD 209 in advance in response to the print start request input from the operator via the operation unit 204.

When the print start-requested job is a job whose print data is stored in the HDD 209 in advance, like a job to the box function, the control unit 205 skips the process in step S105 and shifts from step S104 to the process in step S106.

In the embodiment, the printing system 1000 is configured to cope with not only a job to the copy function but also a job to the box function, and similarly cope with a print job from an external apparatus.

Assume that the operator inputs a print start request via the UI unit of an external apparatus capable of displaying a printer driver window for the printing system 1000, as shown in FIG. 10. The printing system 1000 accepts a print job from the external apparatus. The embodiment is also applicable to such an external print job.

Referring back to FIG. 16, in step S106, the control unit 205 causes the printer unit 203 to print, via the HDD 209, the print data of the job whose print start request has been accepted in step S103. In step S106, the control unit 205 controls the printing system 1000 to execute a print operation complying with the series of print processing conditions of the job that has been accepted from the operator in step S102.

The "print operation" executed in step S106 corresponds to the "production print operation".

The control unit 205 controls the HDD 209 to keep holding the print data of all the pages of the job in the HDD 209 until the printing system 1000 completes the production print operation. The control unit 205 controls the HDD 209 to utilize the print data of the job held in the HDD 209 not only in the process of step S106 but also in the processes of steps S115 and S117 (to be described below).

Further, the control unit 205 controls the touch panel unit 401 to maintain the popup display of the window 2300A for the job in step S104 while executing the process in step S106.

As described with reference to FIGS. 13B to 13D, the control unit 205 controls the touch panel unit 401 so that the display contents of the window 2300A reflect in real time the actual processing status (progress) of the target job in the printing system 1000.

In step S107, based on information from units (e.g., the printer unit 203 and sheet processing apparatus 200) necessary to process the job, the control unit 205 determines whether the printing system 1000 completes the production print operation of the job that has started in step S106.

If the control unit 205 determines in step S107 that all the production print operation of the job is complete, it advances the process from step S107 to step S108.

In S108 of FIG. 16, the control unit 205 controls the touch panel unit 401 to end the popup display of the window 2300A (erase the popup window) for the job which is already in execution from the stage of step S104.

The control unit 205 controls the touch panel unit 401 to automatically end the display of the window 2300A upon completion of the production print operation. Also when the operator presses the "close" key in the window 2300A, the control unit 205 controls the touch panel unit 401 to end the display of the window 2300A. After the end of the process in step S108, the process returns to step S101.

If the control unit 205 determines that all the production print operation of the job is not complete in the printing system 1000, it advances the process from step S107 to step S109.

In step S109, the control unit 205 determines whether the operator has issued a check print request to output the check printed material of the job while the printer unit 203 continues the production print operation of the job in execution.

The determination in step S109 is based on whether the operator has pressed the "check print" key 2301A in the window 2300A that has been displayed from the stage of step S104 on the touch panel unit 401 for the job.

If the control unit 205 determines, on the basis of the operation status of the operator to the key 2301A, that he has not issued any check print request, it returns the process from step S109 to step S107.

If the control unit 205 determines that the operator has issued a check print request by pressing the key 2301A, it shifts the process from step S109 to step S110.

In step S110, the control unit 205 causes the touch panel unit 401 to display the check print type window 2300B, as shown in FIG. 13E.

The control unit 205 causes the touch panel unit 401 to display the window 2300B shown in FIG. 13E while the printer unit 203 continues the production print operation of the job in execution.

In step S111, the control unit 205 determines whether the operator has issued a check print start instruction for the job while continuing the production print operation of the job.

The determination in step S111 is based on whether the operator has pressed the key 2304B in the window 2300B shown in FIG. 13E.

Assume that the control unit 205 determines in step S111 that the operator has not issued any check print start instruction using the key 2304B. In this case, the control unit 205 waits until the operator selects a check print type in the window 2300B, without advancing the process from step S111. In this situation, the control unit 205 controls the printing system 1000 so that the printer unit 203 continues the production print operation of the job in execution.

Assume that the operator selects either the first or second type check print operation with either the key 2301B or key 2302B in the window 2300B, and presses the key 2304B. In response to input of the check print start instruction from the operator with the key 2304B, the control unit 205 advances the process from step S111 to step S112.

In step S112, the control unit 205 makes, for example, the following confirmations 1 and 2.

[Confirmation 1] The control unit 205 confirms system configuration information of the printing system 1000 that has been registered in the HDD 209.

The system configuration information contains information on the sheet processing apparatus 200 that has been registered by the operator via the window in FIG. 9. That is, the system configuration information contains information used by the control unit 205 to determine "executable sheet processing types, and the number and types of sheet processing apparatuses connected to the print apparatus 100". Also, the system configuration information contains information used by the control unit 205 to determine "the number, types, and connection order of sheet processing apparatuses connected to the print apparatus 100".

After grasping the system configuration of the printing system 1000 by [confirmation 1], the control unit 205 makes the following exemplary [confirmation 2].

[Confirmation 2] The control unit 205 confirms which of destination candidates in the printing system 1000 is the destination (delivery destination) of the production printed materials of the check print-requested job. For example, when the printing system 1000 has the system configuration shown in FIG. 3, the control unit 205 confirms in [confirmation 2] which of delivery destinations X, Y, and Z shown in FIG. 3 is the deliver destination of the production printed materials of the job. In confirming the production destination, the control unit 205 utilizes a series of print processing condition data which has been set in step S102 by the operator for the production print operation of the job.

In the embodiment, the control unit 205 can also decide the delivery destination of the printed materials of the job on the basis of a finishing type (sheet processing type) set by the operator for the target job. In this case, in step S112, the control unit 205 confirms a destination decided by it in accordance with a finishing type necessary for the production print operation.

In the embodiment, the control unit 205 controls the touch panel unit 401 to allow the operator to explicitly designate a printed material destination necessary for the production print operation in step S102, like the displays shown in FIGS. 13A to 13D. In step S112, the control unit 205 can also confirm a destination explicitly set by the operator.

By this method, in [confirmation 2], the control unit 205 can determine a destination necessary for the production print operation of the job subjected to check print.

After the end of the confirmation including [confirmation 1] and [confirmation 2] in step S112, the control unit 205 advances the process from step S112 to step S113.

In step S113, the control unit 205 decides the destination of the check printed materials of the check print-requested job on the basis of the system configuration information confirmed in step S112 and the information representing the result of confirming the destination of the production printed material. In this manner, in step S113, the control unit 205 decides a destination in the printing system 1000 to which a sheet printed by the check print operation is output.

Further in step S113, the control unit 205 causes the touch panel unit 401 to execute a display configured to allow the operator to confirm a destination in the printing system 1000 to which the check printed material of the job subjected to check print is output. In this fashion, the control unit 205 causes the touch panel unit 401 to execute notification processing to feed back the decision result in step S113 to the operator.

Details of the process in step S113 will be described later.

After the process in step S113, the control unit 205 shifts to the process in step S114.

In step S114, the control unit 205 interrupts the production print operation of the check print-requested job. This production print operation is the print operation which is already in execution from the stage of step S106 in the printing system 1000. The control unit 205 controls the printing system 1000 to interrupt the production print operation.

The control unit 205 controls the printing system 1000 to automatically start the check print operation of outputting the check printed material of the job immediately after interrupting (suspending) the production print operation. This processing corresponds to the process in step S115 of FIG. 16.

In the check print operation executed in step S115, the control unit 205 controls the printing system 1000 to output a material printed by the printer unit 203 in the check print operation to the destination decided by the control unit 205 in step S113.

The control unit 205 controls the printing system 1000 to print the same print data as print data subjected to the production print operation of the job on a print medium (also called print paper or a sheet) necessary for the check print operation executed in step S115.

For this purpose, the control unit 205 controls the print apparatus 100 to utilize, even in step S115, print data which has already been held in the HDD 209 by the process of step S105 and is necessary for the production print operation of the job, as described above.

In the check print operation executed in step S115, print data of all pages necessary for the production print operation can be printed. This case corresponds to a case where the control unit 205 controls the printing system 1000 to execute the first type check print operation in accordance with selection of the key 2301B.

In the check print operation executed in step S115, print data of one page out of print data necessary for the production print operation can also be printed. This case corresponds to a case where the control unit 205 controls the printing system 1000 to execute the second type check print operation in accordance with selection of the key 2302B.

In this way, in step S115, the control unit 205 causes the printing system 1000 to execute an operation designated by the operator out of the first and second type check print operations.

After step S115, the control unit 205 performs the process in step S116.

In step S116, the control unit 205 determines, on the basis of information from various sensors arranged on the sheet feeding path in the printing system 1000, whether the check print operation of the job started in step S115 is complete.

If the control unit 205 determines in step S116 that the check print operation is not complete, it waits for the completion of the check print operation without shifting to the next step.

If the control unit 205 determines in step S116 that the check print operation is complete, it advances the process from step S116 to step S117.

In step S117, the control unit 205 controls the printing system 1000 to execute (continue) the production print operation of the job having undergone the check print operation again from this timing.

In the production print operation of the job that resumes in step S117, the control unit 205 controls the printing system 1000 not to print part of the job that has been processed immediately before interrupting the print operation of the job in step S114.

In step S117, the control unit 205 controls the printing system 1000 to print only the remaining part of the job that has not been processed in the stage of step S114.

In executing again the production print operation in step S117, the control unit 205 controls the print apparatus 100 to utilize, even in step S117, print data which has already been held in the HDD 209 in step S105 or the like and is necessary for the production print operation of the job, as described above.

After the process in step S117, the control unit 205 controls to return the process from step S117 to step S107.

If the process returns from step S117 to step S107, the control unit 205 controls the touch panel unit 401 to display the window 2300A again on condition that the production print operation is not complete, as described with reference to FIG. 13F. The control unit 205 controls the printing system 1000 to shift the process again from step S107 to step S109 and execute again the processes in steps S109 to S115.

Accordingly, the control unit 205 enables the printing system 1000 to execute the check print operation a plurality of number of times in accordance with a request from the operator until the production print operation of the target job is complete.

As described above, in step S114, the control unit 205 automatically interrupts the production print operation of a job subjected to check print (without inputting any interruption request from the operator) upon receiving a check print start request from the operator via the key 2304B.

After interrupting (suspending) the production print operation in step S114, the control unit 205 causes the printing system 1000 to automatically execute the check print operation of the job in step S115.

In step S117 immediately after executing the check print operation of the job, the control unit 205 causes the printing system 1000 to automatically execute again (resume) the production print operation of the job having undergone check print.

The control unit 205 controls the printing system 1000 to sequentially, automatically execute the following three processes in a series of print steps for one job upon receiving a check print start request from the operator:

"production print operation interruption processing"
"check print processing"
"production print operation resume processing"

In the embodiment, the printing system 1000 is configured to execute check print without any trouble such as the aforementioned three problems.

Assume that the check print operation is performed in step S115. In this case, the control unit 205 inhibits output of the check printed material of a job (i.e., a check-print requested job), for which printing has been interrupted in step S114, to a destination necessary to stack the production printed materials of the job.

The control unit 205 controls the printing system 1000 to output the check printed material of the job by the check print operation in step S115 to a destination different from that of the production printed materials of the job.

Assume that the production print operation is executed again (resumed) in step S117 after executing check print. In this case, the control unit 205 inhibits output of the production printed materials of the job output in step S117 to the destination of the check printed material.

The control unit 205 controls the printing system 1000 to output the production printed materials of the job by the production print operation executed again in step S117 to the production printed material destination which has been used immediately before interrupting printing in step S114.

In the embodiment, as described above, the control unit 205 performs in step S113 processing to decide a check printed material destination. Then, the control unit 205 executes processing of the flowchart shown in FIG. 17 which is an example of a flowchart showing details of the process in step S113. Also, the control unit 205 executes processing of the flowchart shown in FIG. 19 which his an example of a flowchart showing details of the process in step S300 of FIG. 17. Further, the control unit 205 executes processing of the flowchart shown in FIG. 18 which is an example of a flowchart showing details of the process in step S304 of FIG. 17.

However, these flowcharts are merely exemplary descriptions, and these processes need not always be performed.

For example, the embodiment is also applicable to, e.g., a print apparatus and system configured to execute at least any of three control examples illustrated with reference to FIGS. 21 and 22 (to be described later).

As described above, the control unit 205 controls the printing system 1000 to output the check printed material of a job having undergone the check print operation to a destination of the sheet processing apparatus that is different from the destination of the production printed materials of the job.

The control unit 205 causes the operation unit 204 to execute a display which allows the operator to identify the destination of the check printed material of a job in performing check print.

Figure 15:
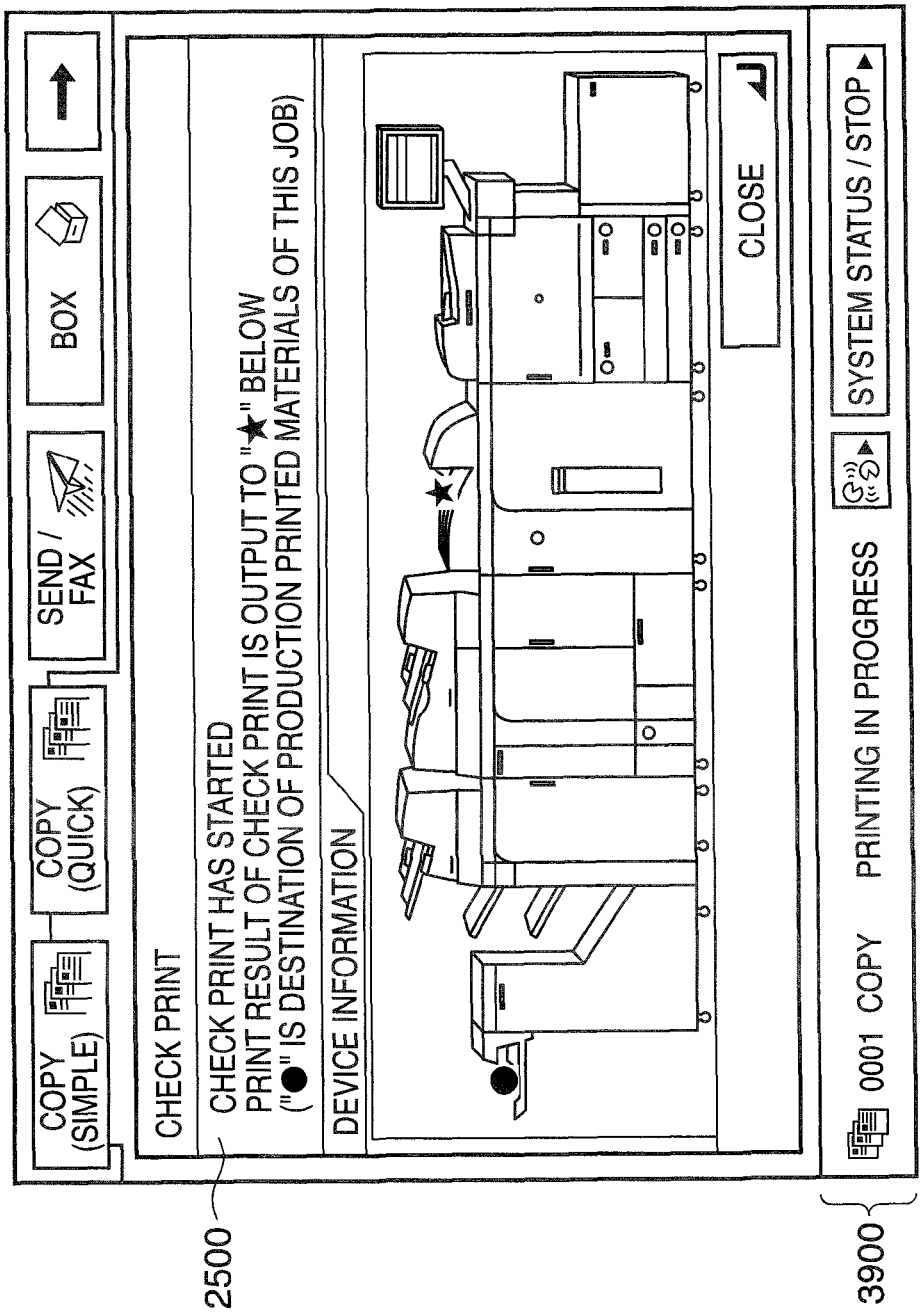
FIG. 15 is a view for explaining a control example associated with the operation unit 204.

For example, in step S113 of FIG. 16, the control unit 205 causes the touch panel unit 401 to execute a display shown in FIG. 15. A window 2500 in FIG. 15 is a display window configured to present the following exemplary guidance information.

The control unit 205 causes the touch panel unit 401 to display the window 2500 immediately after the operator inputs a check print start request via the key 2304B in the window 2300B.

[Guidance Information 1] Guidance information which notifies the operator that the printing system 1000 has started check print.

[Guidance Information 2] Guidance information which prompts the operator to explicitly, visually confirm the destination of the check printed materials of a job subjected to check print in the printing system 1000.

[Guidance information 2] also prompts the operator to explicitly, visually confirm the destination of the production printed materials of the job in the printing system 1000.

The control unit 205 controls the touch panel unit 401 to graphically display an outline as the actual appearance of the printing system 1000 in the window 2500.

The control unit 205 controls the touch panel unit 401 to present display contents in which a mark "●"in "red" is added to a portion indicating the destination of the production printed materials in the graphical outline in the window 2500.

In addition, the control unit 205 controls the touch panel unit 401 to present display contents in which a mark "★"in "blue" is added to a portion indicating the destination of the check printed materials of the job in the graphical outline in the window 2500.

Also when the touch panel unit 401 displays the window 2500, the control unit 205 uses the above-mentioned system configuration information of the printing system 1000 and the like that have been registered in the memory of the print apparatus 100 in advance.

As represented by the window 2500, the control unit 205 causes the touch panel unit 401 to execute notification processing which allows the operator to simultaneously discriminate (identify) the production printed material destination and check printed material destination. As a modification, notification processing to the operator using not a display output but an audio output or printout is also applicable as an alternative.

This can further enhance effects concerning the operability and working efficiency of the operator, i.e., effects concerning the check print function according to the embodiment.

For example, as described in the system configuration of the printing system 1000, this system configuration enables coupling a plurality of sheet processing apparatuses to the print apparatus 100, and provides a plurality of destination candidates. Even this system configuration can suppress a problem that it is difficult for the operator to recognize the destination of check printed materials created by the check print operation. A printing environment where high productivity is maintained as described above can be established without any new trouble which is caused by this problem to influence the working efficiency and productivity in a printing environment such as the POD environment where high productivity is more important.

Control processing to decide the destination of check printed materials output by the check print operation will be explained with reference to the flowcharts of FIGS. 16 to 19.

Assume that the system is configured by coupling a plurality of sheet processing apparatuses to the print apparatus 100, and a plurality of destination candidates exist.

In the embodiment, the control unit 205 controls the printing system 1000 to selectively execute the operation of any of the following modes when there are a plurality of destinations each permitted for use as a check printed material destination.

[Mode 1] Assume that the printing system 1000 is configured by coupling a plurality of sheet processing apparatuses to the print apparatus 100, as shown in FIG. 3. In this system configuration, there are a plurality of sheet processing apparatus selection candidates having destinations each permitted for use as a destination to which the check printed material of a target job is output. This case will be referred to as case A.

When performing the operation of mode 1 in case A, the control unit 205 preferentially selects a sheet processing apparatus positioned upstream (closer to the print apparatus 100) of the sheet feeding path from a sheet processing apparatus used in the production print operation of a job subjected to check print.

Assume that a plurality of apparatuses each selectable as a sheet processing apparatus at the check printed material destination exist upstream of a sheet processing apparatus necessary for the production print operation. In this case, a sheet processing apparatus most upstream of the sheet feeding path (post-processing apparatus positioned closest to the main body of the print apparatus 100) is preferentially selected from these sheet processing apparatuses.

Control in [mode 1] will be described by exemplifying a system configuration illustrated in FIG. 20.

Figure 20:
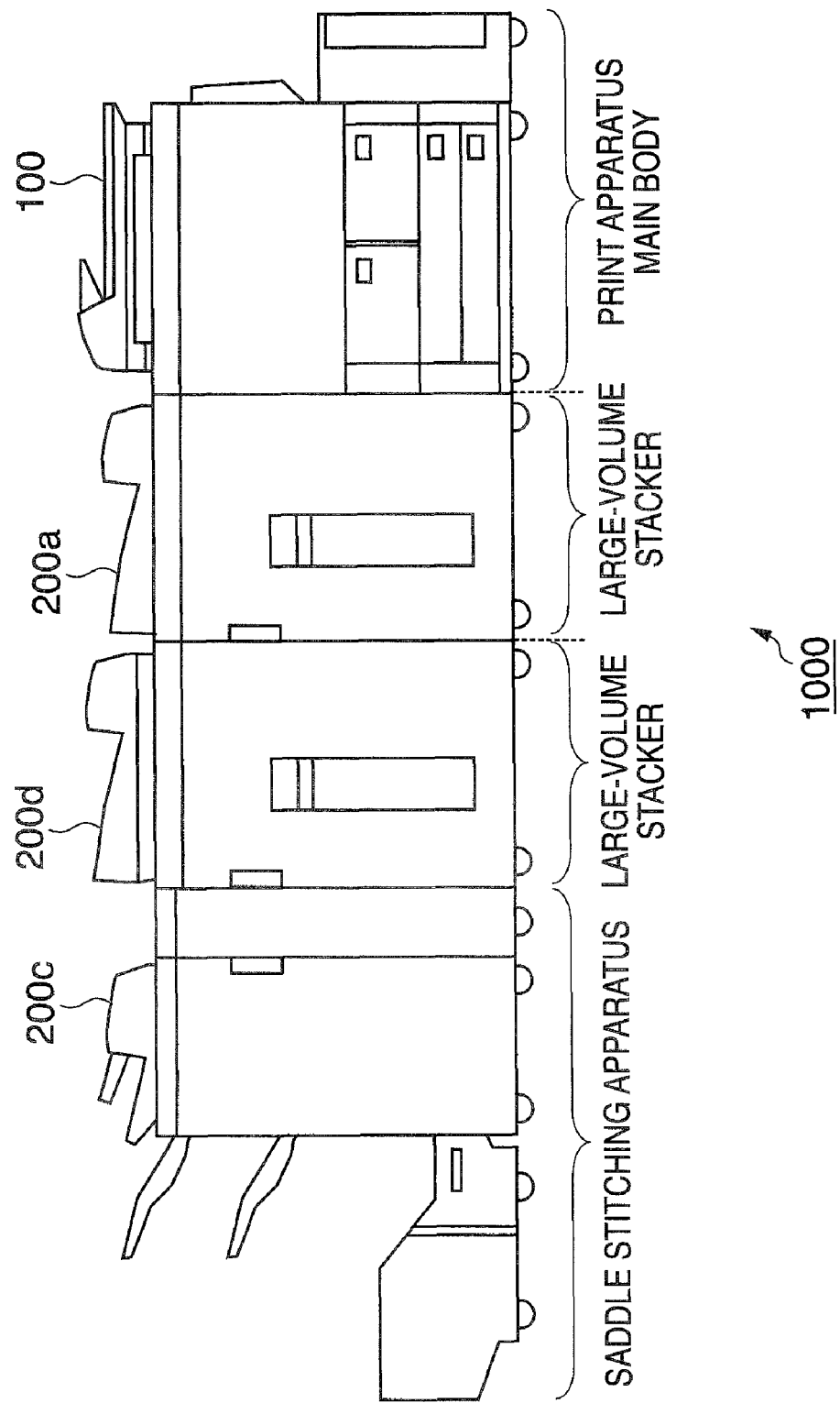
FIG. 20 is a view for explaining a control example associated with the printing system 1000.

Assume that a sheet processing apparatus necessary as the destination of the production print operation of a job subjected to the check print operation is a third saddle stitching apparatus 200c in the system configuration of FIG. 20. In this case, the control unit 205 determines that sheet processing apparatuses each permitted for use as a check printed material destination are two selection candidates: a second large-volume stacker 200b and first large-volume stacker 200a.

In this situation, the operation in mode 1 is executed. In this case, the control unit 205 selects the first large-volume stacker 200a closest to the print apparatus 100 as a sheet processing apparatus for use as the check printed material destination of the job. The series of operations and the control correspond to mode 1.

The printing system 1000 is configured to execute the operation in mode 1, achieving the following effects.

For example, check printed materials are output to a destination closer to the print apparatus 100 having the operation unit 204. This shortens the moving distance when the operator operates the operation unit 204 and then takes out check printed materials, increasing the working efficiency of the operator. Check printed materials are output to a destination close to the print apparatus 100. This shortens the conveyance distance of the check printed materials to the destination, and also shortens the time necessary to complete a check print output. Hence, processes corresponding to various instructions described above from the operator after check print can be quickly performed. This also shortens the time until the printing system 1000 completely processes the job and subsequent jobs. In this fashion, the printing system 1000 can attain various effects considering a situation in which the operator at the work site such as the POD environment frequently uses the operation unit 204 of the print apparatus 100.

[Mode 2] Assume that the printing system 1000 has a configuration corresponding to the above-described case A, similar to mode 1.

When executing mode 2 in case A, the control unit 205 preferentially selects a sheet processing apparatus closest to a sheet processing apparatus used in the production print operation of a job subjected to check print.

A configuration associated with mode 2 will be described by exemplifying the system configuration illustrated in FIG. 20.

Assume that a sheet processing apparatus used as the destination of the production print operation of a job subjected to the check print operation is the third saddle stitching apparatus 200c in the system configuration of FIG. 20. In this case, the control unit 205 determines that sheet processing apparatuses each permitted for use as a check printed material destination are two selection candidates: the second large-volume stacker 200b and first large-volume stacker 200a.

In this situation, the operation in mode 2 is executed. In this case, the control unit 205 selects, as a sheet processing apparatus for use as the check printed material destination of the job, the second large-volume stacker 200b closest to the sheet processing apparatus serving as the production printed material destination. The series of operations and the control correspond to mode 2.

An advantage of mode 2 is to facilitate operator work because printed materials by actual printing and those by check print are close to each other when actual printing is complete and the operator takes out printed materials.

[Mode 3] Assume that the printing system 1000 has a configuration corresponding to the above-described case A, similar to modes 1 and 2.

When executing the operation of mode 3 in case A, the control unit 205 statically selects a specific sheet processing apparatus decided regardless of the position (connection order) of a sheet processing apparatus used in the production print operation of a job subjected to check print, the position of the print apparatus 100, and the like.

Control in mode 3 will be described by exemplifying the system configuration illustrated in FIG. 20.

Assume that a sheet processing apparatus used as the destination of the production print operation of a job subjected to the check print operation is the third saddle stitching apparatus 200c in the system configuration of FIG. 20. In this case, the control unit 205 determines that sheet processing apparatuses each permitted for use as a check printed material destination are two selection candidates: the second large-volume stacker 200b and first large-volume stacker 200a.

In this situation, the operation in mode 3 is performed. In this case, the control unit 205 determines that the specific sheet processing apparatus decided in advance is the first large-volume stacker 200a. For example, the specific sheet processing apparatus decided in advance may be registered as an initial setting in the HDD 209 of the print apparatus 100 by the operator with the operation unit 204. Alternatively, the specific sheet processing apparatus may be registered in advance as device information which is one of control programs used by the control unit 205.

When performing the operation of mode 3, the control unit 205 selects the first large-volume stacker 200a as a sheet processing apparatus used as the check printed material destination of the job, without performing any discrimination processing or the like for the position (connection order) of a sheet processing apparatus serving as the production printed material destination of the job. The series of operations and the control correspond to mode 3.

An advantage of mode 3 is that the operator can easily recognize the check printed material destination because check printed materials are always output to the same destination which is different from the production printed material destination.

The control unit 205 controls the printing system 1000 to selectively implement operations corresponding to the above-described modes.

[Mode 1] to [mode 3] described above are mechanisms considering user advantages, are merely exemplary descriptions, and may not always be indispensable constituent features. For example, the printing system 1000 may also be configured to cope with only the operation in mode 1, only the operation in mode 2, or only the operation in mode 3. The printing system 1000 may also be configured without considering the concept "mode". The printing system 1000 may also be configured to selectively execute the operations in modes 1 and 2. The printing system 1000 may also be configured to selectively execute the operations in modes 2 and 3. The printing system 1000 may also be configured to selectively execute the operations in modes 1 and 3. In this fashion, the printing system 1000 may also be configured to alternatively execute the operation. The printing system 1000 according to the embodiment is applicable to various forms.

In the embodiment, the control unit 205 controls the printing system 1000 to permit output of check printed materials to a specific destination of a specific type of sheet processing apparatus, and inhibit output of check printed materials to another destination.

In the embodiment, a large-volume stacker with a tray exposed outside the housing as shown in FIG. 4 is available as the specific type of sheet processing apparatus with the specific destination.

In the embodiment, the control unit 205 controls the printing system 1000 to output the production printed materials of a target job to a destination other than the sample tray of the large-volume stacker illustrated in FIG. 4. The control unit 205 controls the printing system 1000 to inhibit output of the check printed materials of the job to the production printed material destination, and to output them to the sample tray of the large-volume stacker illustrated in FIG. 4. The control unit 205 controls the printing system 1000 to output the production printed materials of the job created by the production print operation executed again after executing check print to the same destination as that used in the production print operation before the start of check print.

In the embodiment, even when the printing system 1000 has a system configuration with a plurality of sheet processing apparatuses, the control unit 205 controls the printing system 1000 to adopt, as the check printed material destination, a destination different from the production printed material destination.

The control unit 205 controls the printing system 1000 to output check printed materials to the sample tray serving as a destination exposed outside the large-volume stacker shown in FIG. 4, regardless of a sheet processing type and destination necessary for the production print operation of a target job. Then, the control unit 205 performs the following exemplary control.

Assume that the target job is a stacker job requiring a stack tray inside the large-volume stacker in FIG. 4 as the production printed material destination. Also in this case, the control unit 205 inhibits output of the check printed materials of the job to the stack tray inside the large-volume stacker.

Assume that the target job is a glue binding job requiring a basket inside the glue binding apparatus in FIG. 5 as the production printed material destination. Also in this case, the control unit 205 inhibits output of the check printed materials of the job to the basket inside the glue binding apparatus in FIG. 5.

Assume that the target job is a saddle stitching job requiring a booklet holding unit inside the saddle stitching apparatus in FIG. 6 as the production printed material destination. Also in this case, the control unit 205 inhibits output of the check printed materials of the job to the booklet holding unit.

In the embodiment, the control unit 205 executes various control operations relevant to the check print operation described with reference to FIGS. 12B to 14H for the printing system 1000. When executing check print, the control unit 205 controls the printing system 1000 to output the check printed materials of a target job to the destination of a sheet processing apparatus different from the destination of the production printed materials of the job.

The printing system 1000 can, therefore, meet the following exemplary demands which may arise from the work site in a printing environment such as the POD environment.

[Demands] There is a demand to maintain high operating ratio of the printer unit 203 in a printing system which is made compact and can execute a variety of post-processes to meet prospective requests from customers. Especially, there is a demand to print a large volume of documents of many jobs as simultaneously, concentratedly, successively as possible. That is, there is a demand to implement check print for obtaining a high-quality output result while keeping the printing system operating continuously.

The printing system 1000 can meet these demands, and can also prevent any trouble such as the above-described new problem "check printed materials are mixed in production printed materials" owing to the configuration which meets the demands.

Since the printing system 1000 does not require any operator intervention work to pick out check printed materials from production printed materials, the working efficiency of the operator increases in a convenient operation environment. Accordingly, the printing system 1000 can further enhance an effect capable of minimizing the time necessary to completely process one job, and also an effect capable of successively processing a plurality of jobs including subsequent jobs at quality and productivity as high as possible.

Since the embodiment employs configurations corresponding to [mode 1] to [mode 3] described above, these effects can be further enhanced.

In the embodiment, as described above, the control unit 205 controls the printing system 1000 to output check printed materials to the top sample tray on the housing of the large-volume stacker.

Assume that a destination which has not received any printed material exists as a destination available as the production printed material destination. This destination is one other than the sample tray of the large-volume stacker.

A concrete example of this case is a situation in which no printed material is stacked on the sample tray inside the large-volume stacker illustrated in FIG. 4.

Another concrete example of this case is a situation in which no printed material is stacked in the basket inside the glue binding apparatus illustrated in FIG. 5.

Still another concrete example of this case is a situation in which no printed material is stacked on the booklet holding unit inside the saddle stitching apparatus in FIG. 6.

As described above, assume that a destination which has not received any printed material exists in the printing system 1000, but the destination is not outside the housing, such as the sample tray of the large-volume stacker, but inside the housing.

In this case, even if the destination can receive printed materials, the control unit 205 inhibits output of the check printed materials of a target job to the destination. The control unit 205 controls the printing system 1000 to output the check printed materials of the job to a destination exposed outside the housing, such as the sample tray of the large-volume stacker.

This configuration can prevent various troubles as illustrated below:

"a trouble of outputting check printed materials to a destination inside a sheet processing apparatus in the printing system though the check printed materials are output to a destination different from that of production printed materials, a trouble of forcing the operator to search a plurality of sheet processing apparatuses for check printed materials output to a given destination of a sheet processing apparatus, a trouble of hardly reducing the work loss and downtime because of the time necessary to search for check printed materials though work to pick out check printed materials from production printed materials is unnecessary, and as a result a trouble of influencing the productivity and working efficiency."

The configuration of the embodiment can omit the following work:

"operator intervention work to request the operator to open/close the front cover of the large-volume stacker every time he takes out the output materials of check print because the check printed materials are output to a destination inside the large-volume stacker."

With the configuration of the embodiment, while preventing a variety of problems as described above, check printed materials can be output to a destination which is different from the production printed material destination and enables the operator to recognize the presence of printed materials at a glance. The operator can quickly notice check printed materials.

The effect obtained by the embodiment: "a plurality of jobs can be successively processed concentratedly at the same time at productivity and quality as high as possible." can be further improved. This effect can be further enhanced by executing display control as described with reference to FIG. 15.

Processing in the flowchart of FIG. 17 will be explained. The processing in FIG. 17 falls within the process in step S113 of FIG. 16.

Figure 17:
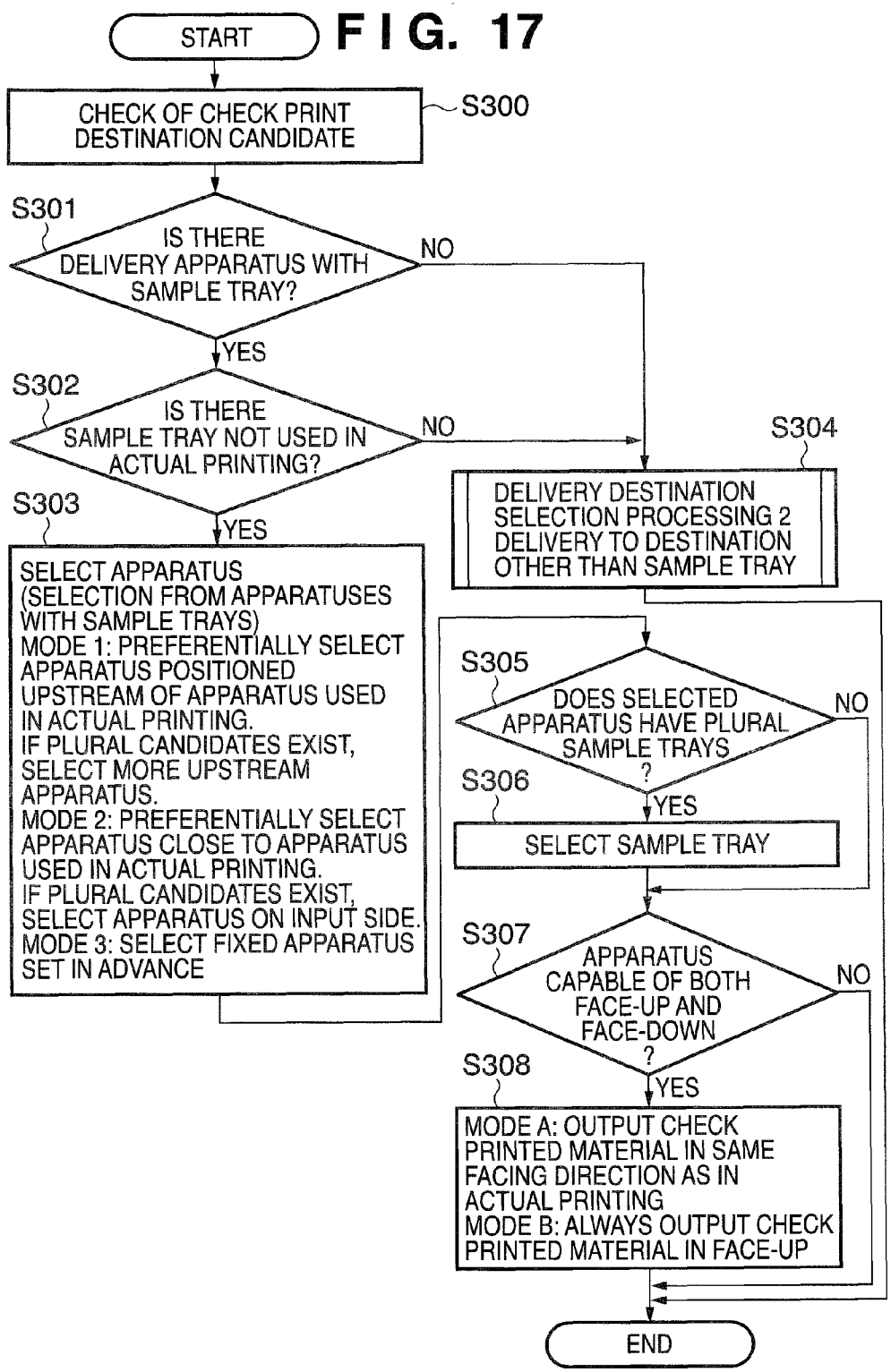
FIG. 17 is a flowchart for explaining a control example according to the embodiment of the present invention.

In step S300 of FIG. 17, the control unit 205 checks whether there is a destination available as that of check printed materials in the check print operation. In step S300 of FIG. 17, this destination is described as a "check print destination".

In step S300 of FIG. 17, the control unit 205 makes this determination on the basis of, e.g., the following exemplary information.

(1) System configuration information of the printing system 1000. This information contains information on the sheet processing apparatus 200 registered in advance in the memory of the print apparatus 100, as described with reference to FIG. 9.

(2) Actual destination information for specifying the destination of a post-processing apparatus necessary in the production print operation of a target job. The control unit 205 specifies this information on the basis of information on print processing conditions set by the operator for the target job, as described above.

(3) Current destination status information for specifying the current status of each destination serving as a printed material destination candidate in the printing system 1000. The control unit 205 specifies this information by acquiring pieces of information from the paper presence/absence sensors of units in a plurality of sheet processing apparatuses in the printing system 1000.

Figure 19:
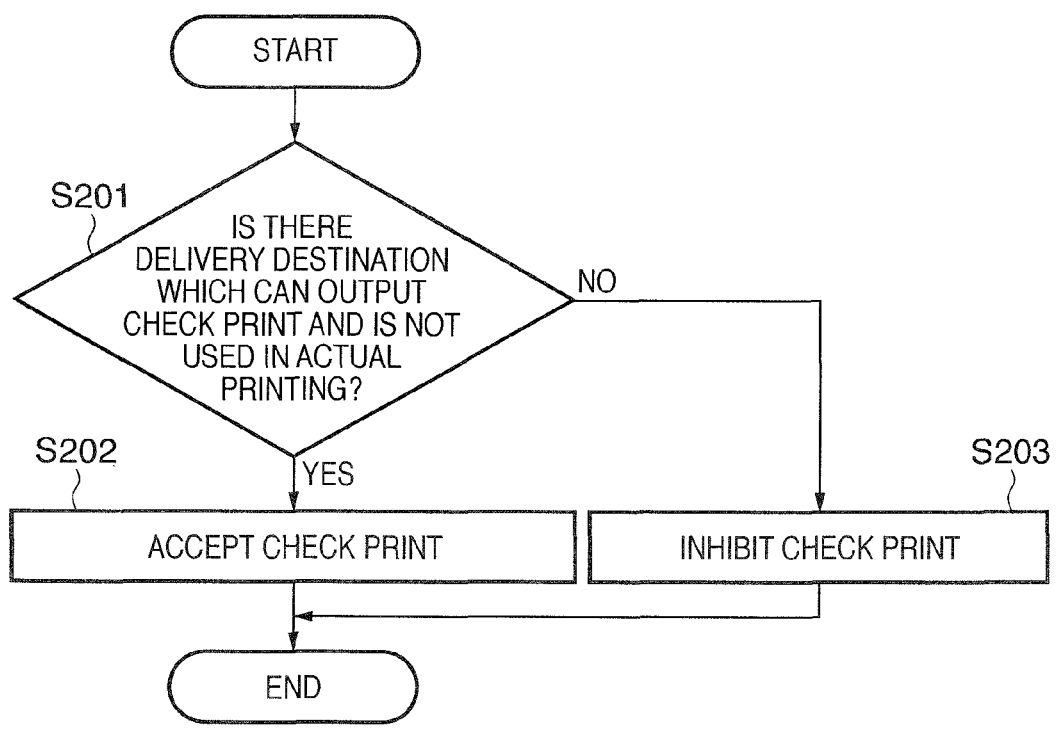
FIG. 19 is a flowchart for explaining a control example according to the embodiment of the present invention.

The control unit 205 executes processing in the flowchart of FIG. 19 showing details of the process in step S300 of FIG. 17.

In step S201 of FIG. 19, the control unit 205 determines, on the basis of the pieces of information (1) to (3), whether a destination which can receive check printed materials and is not used in production printing exists in the printing system 1000. In step S201 of FIG. 19, this destination is described as a "delivery destination".

If the control unit 205 determines that a destination which can receive check printed materials and is not used in production printing does not exist in the printing system 1000, it advances the process from step S201 to step S203 in FIG. 19.

In step S203 of FIG. 19, the control unit 205 inhibits execution of check print of a job for which the operator has issued a check print request.

For example, in step S111 of FIG. 16, the control unit 205 determines that the operator inputs the check print start request of the job with the key 2304B in FIG. 13E during execution of the production print operation. However, if NO in step S201 of FIG. 19, the control unit 205 inhibits execution of the check print operation for the job in step S203. In this case, the control unit 205 cancels (stops) execution of the check print operation without executing the check print operation for the job in step S115 of FIG. 16. Also in this case, the control unit 205 controls to return from the process in step S113 to the process in step S107 of FIG. 16 without executing (by skipping) the processes in steps S114 and S115 of FIG. 16. That is, in this case, the control unit 205 controls the printing system 1000 to continue the production print operation of the job that has started in step S106 of FIG. 16, without interrupting the production print operation in step S114 of FIG. 16. In this case, the control unit 205 controls the touch panel unit 401 to display a message that check print is inhibited (canceled), and the reason of the inhibition. The operation unit 204 executes this notification processing to the operator.

Assume that the control unit 205 determines in step S201 of FIG. 19 that a destination which can receive check printed materials and is not used in production printing exists in the printing system 1000.

In this case, the control unit 205 formally permits acceptance of check print for the job in step S202, and advances the process from step S202 in FIG. 19 to step S301 in FIG. 17.

In step S301 of FIG. 17, the control unit 205 determines, on the basis of the above-mentioned system configuration information and the like, whether a sheet processing apparatus having a sample tray exists in the printing system 1000. This "sheet processing apparatus" corresponds to a "delivery apparatus" in step S301 of FIG. 17.

If NO in step S301, the control unit 205 advances the process from step S301 to step S304.

In step S304, the control unit 205 executes one of processes which are executable by the printing system 1000 of the embodiment in order to decide a check printed material destination. This process corresponds to processing to decide a check printed material destination among destination candidates each permitted for use as a check printed material destination other than the sample tray of the large-volume stacker illustrated in FIG. 4. In step S304, this processing corresponds to "delivery destination selection processing 2 (delivery to a destination other than the sample tray)". Details of the process in step S304 will be described later with reference to the flowchart of FIG. 18. "Actual printing" in the flowcharts of FIGS. 17 and 18 corresponds to the production print operation of a job subjected to check print.

If YES in step S301 of FIG. 17, the control unit 205 advances the process from step S301 to step S302. In step S302, the control unit 205 determines, on the basis of the above-mentioned system configuration information and the like, whether a sample tray serving as a destination not used as the destination of production printed materials by the production print operation exists in the printing system 1000.

If NO in step S302, the control unit 205 advances the process from step S302 to step S304. If YES in step S302, the control unit 205 advances the process from step S302 to step S303.

The process in step S303 is executed in a case where a plurality of sheet processing apparatuses each permitted for use as a check printed material destination exist in the printing system 1000. Also, the process in step S303 is executed in a case where these sheet processing apparatuses comprise sample trays illustrated in FIG. 4, respectively. In this case, in step S303, the control unit 205 selects one sheet processing apparatus from selection candidates each permitted for use as a check printed material destination, as a sheet processing apparatus serving as the check printed material destination of a job subjected to check print. In step S302, the control unit 205 executes processing based on a mode set in advance for the print apparatus 100 manually by the operator (or automatically as a device-specific setting value) among [mode 1] to [mode 3] described above. In this way, the control unit 205 decides one specific type of sheet processing apparatus among a plurality of selection candidates in step S303. Then, the control unit 205 advances the process from step S303 to step S305.

If there is only one selection candidate, the control unit 205 selects it as a sheet processing apparatus serving as a check printed material destination. In this case, the control unit 205 skips the process in step S303, and advances the process from step S302 to step S305.

In step S305, the control unit 205 determines, on the basis of the above-mentioned system configuration information and the like, whether the sheet processing apparatus selected in step S303 comprises a plurality of sample trays.

The large-volume stacker illustrated in FIG. 4 corresponds to a sheet processing apparatus having only one sample tray. Thus, when the printing system 1000 has the system configuration shown in FIG. 3, the control unit 205 determines NO in step S305. In this case, the control unit 205 decides the sample tray of the large-volume stacker as a check printed material destination, and advances the process from step S305 to step S307.

If the sheet processing apparatus selected in step S303 comprises a plurality of sample trays, the control unit 205 advances the process to step S306. In step S306, the control unit 205 causes the touch panel unit 401 to display a window for prompting the operator to select a sample tray used as a check printed material destination among a plurality of sample trays. The control unit 205 decides one sample tray in accordance with the selection by the operator.

In step S307, the control unit 205 determines, on the basis of the above-mentioned system configuration information and the like, whether the "check printed material destination" decided in step S305 or S306 is the destination of a sheet processing apparatus capable of switching between face-up and face-down.

"Face-down" corresponds to an operation mode in which a print medium is discharged to the destination with a print surface bearing print data of an odd-numbered page among target image data facing down, and the print medium is stacked and held at the destination in this state. This mode will be called the first stacking mode. When this mode is executed, the print order of print data is the same as the order of storing the print data in the HDD 209. That is, print data are printed in order from the first page, and print data of the final page is printed last. The control unit 205 controls the printing system 1000 to execute the first stacking mode in this print order.

"Face-up" corresponds to an operation mode in which a print medium is discharged to the destination with a print surface bearing print data of an odd-numbered page among target image data facing up, and the print medium is stacked and held at the destination in this state. This mode will be called the second stacking mode. When this mode is executed, the print order of print data is opposite to the order of storing the print data in the HDD 209. That is, print data are printed in order from the final page, and print data of the first page is printed last. The control unit 205 controls the printing system 1000 to execute the second stacking mode in this print order.

If the destination decided as a check printed material destination can cope with stacking processes in these two stacking modes, the control unit 205 advances the process from step S307 to step S308.

In step S308, the control unit 205 confirms which of two modes (modes A and B) prepared in advance is set. Examples of these modes are as follows.

[Mode A] The check printed materials of a target job is output and stacked at the destination in the same stacking form as that of production printed materials in the production print operation of the job.

Assume that the target job is a job requiring the stacking form of the first stacking mode in the production print operation. When mode A is set, the control unit 205 executes output of check printed materials in the first stacking mode in the check print operation of the job.

Assume that the target job is a job requiring the stacking form of the second stacking mode in the production print operation. When mode A is set, the control unit 205 executes output of check printed materials in the second stacking mode in the check print operation of the job.

Check printed materials output in mode A take the same stacking form as that of production printed materials. When executing check print, neither the page order of print data nor the stacking form need be changed by switching the control sequence. This can put importance on productivity without any extra load on the printing system 1000.

[Mode B] When mode B is set, the control unit 205 executes output of check printed materials in the second stacking mode in the check print operation of a target job regardless of the stacking form of production printed materials in the production print operation of the job.

Check printed materials are output in mode B while the print surface of each image printed for check faces up. This allows the operator to see the print result of check print without turning over the printed material, putting importance on operability.

As described above, either mode has user advantages. The operator can set either mode at menu settings on the operation unit 204.

In step S308 of FIG. 17, the control unit 205 selects either of the above-mentioned two stacking modes on the basis of which of modes A and B is set. Based on preset conditions, the control unit 205 decides which of the first and second stacking modes is employed to process the check printed materials of a target job.

Assume that the destination decided as a check printed material destination does not cope with stacking processes in these two stacking modes. In this case, the control unit 205 determines NO in step S307. Then, the control unit 205 controls the printing system 1000 to output check printed materials by an operation corresponding to mode A without executing selection confirmation of mode A or B, or the like.

After that, the control unit 205 determines NO in step S308 or S307, and returns the process again to step S114 in the main flowchart of FIG. 16. The control unit 205 controls the printing system 1000 to execute, in step S115 of FIG. 16, a check print operation reflecting the determination result in the sub-flowchart of FIG. 17.

Figure 18:
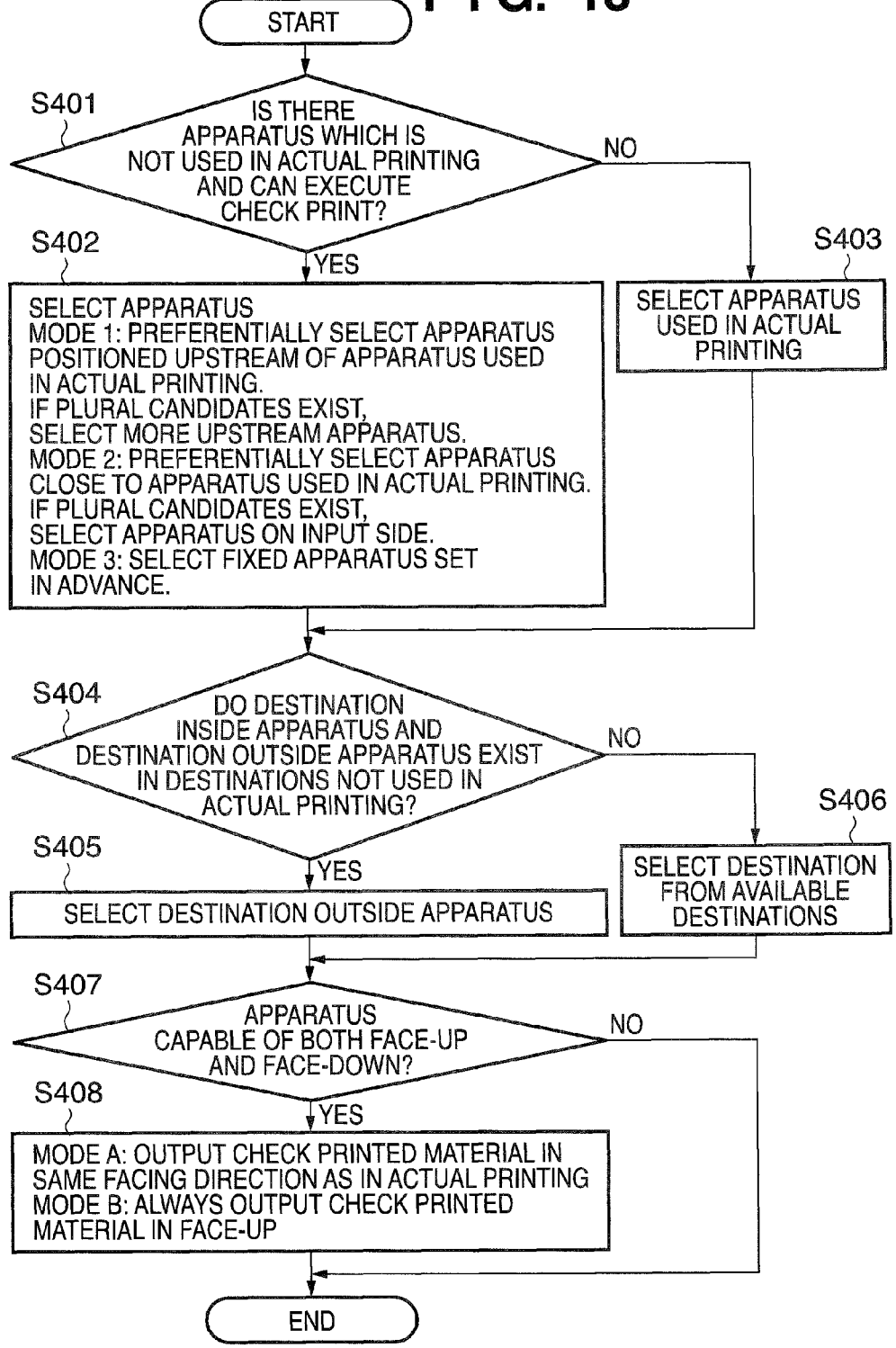
FIG. 18 is a flowchart for explaining a control example according to the embodiment of the present invention.

Next, details of the process in step S304 of FIG. 17 will be explained with reference to the flowchart of FIG. 18 showing details of this process.

The processing in FIG. 18 is performed when outputting check printed materials by the check print operation to a destination other than the sample tray of the large-volume stacker. The processing in FIG. 18 is performed when the printing system 1000 has the system configuration shown in FIG. 20 and the sample tray of the large-volume stacker is used in the production print operation.

In step S401 of FIG. 18, the control unit 205 checks whether a sheet processing apparatus which is not used in the production print operation and can output check printed materials exists in the printing system 1000. For example, when the saddle stitching apparatus 200c is used in the production print operation in the system configuration of FIG. 20, the large-volume stackers 200a and 200b are not used in the production print operation. However, assume that printed materials have already been stacked on the sample trays of the large-volume stackers 200a and 200b, and the large-volume stackers 200a and 200b are not available. In this case, the control unit 205 determines NO in step S401. In step S403, the control unit 205 selects the saddle stitching apparatus 200c used in the production print operation. Even in this case, the control unit 205 controls the printing system 1000 to output the check printed materials of a job having undergone check print to a vacant tray not used in the production print operation among externally exposed trays of the saddle stitching apparatus illustrated in FIG. 6.

If NO in step S401, the control unit 205 advances the process from step S401 to step S403. In step S403, the control unit 205 selects a sheet processing apparatus used in the production print operation. Also in this case, the control unit 205 selects a destination not used for production printed materials, as described above.

If YES in step S401, the control unit 205 advances the process from step S401 to step S402. In step S402, the control unit 205 selects a sheet processing apparatus used to output check printed materials. As this selection method, there are three methods (mode 1 to mode 3) described above. After the process in step S403, the process advances to step S404.

In step S404, the control unit 205 checks whether destinations (trays) not used in the production print operation exist inside and outside the sheet processing apparatus selected in step S402 or S403. Assume that a plurality of destinations which do not receive any production printed material and can receive check printed materials exist inside and outside one sheet processing apparatus selected in step S402 or S403. In this case, the control unit 205 shifts the process from step S404 to step S405. In step S405, the control unit 205 preferentially selects a destination outside the sheet processing apparatus as the check printed material destination. To the contrary, assume that a destination candidate which does not receive any production printed material and can receive check printed materials exists only inside one sheet processing apparatus selected in step S402 or S403. In this case, the control unit 205 shifts the process from step S404 to step S406. In step S406, the control unit 205 decides a destination inside the sheet processing apparatus as the check printed material destination.

In step S407, the control unit 205 determines whether the destination selected in step S405 or S406 can switch between face-up and face-down. If YES in step S407, the control unit 205 advances the process from step S407 to step S408. In step S408, the control unit 205 decides which of operations based on modes A and B is executed in the check print operation of a target job. If NO in step S407, the control unit 205 skips the process in step S408.

After the end of the process in the flowchart of FIG. 18, the control unit 205 returns the process again to step S114 in the main flowchart of FIG. 16. Then, the control unit 205 controls the printing system 1000 to execute in step S115 of FIG. 16 a check print operation reflecting the result of deciding the sheet processing apparatus and destination in the sub-flowchart of FIG. 18.

The method of deciding a check print operation destination in the check print operation illustrated in FIGS. 16 to 19 is merely an example. Any method is applicable to the embodiment as long as one of the following illustrative [control example 1] to [control example 3] is executable, like the printing system 1000 according to the embodiment. In the embodiment, the printing system 1000 executes these control operations when the control unit 205 reads out a computer-readable/executable computer program from the memory of the print apparatus 100 and executes it to perform control operations in the following [control example 1] to [control example 3].

Control Example 1 for Printed Material Destination in Control Related to Check Print Operation by Printing System 1000

The first control example corresponding to control related to a printed material destination will be explained with reference to FIG. 21. This control example is one control related to the check print operation executed by the control unit 205. FIG. 21 is a sectional view showing in detail printed material destination candidates in the system configuration shown in FIG. 3. FIGS. 3 and 21 show the same system configuration.

For example, the control unit 205 confirms the above-mentioned system configuration information registered in the memory of the print apparatus 100. Assume that the printing system 1000 has the system configuration illustrated in FIG. 21. In this case, the control unit 205 confirms the following [confirmation matter 1-1] and [confirmation matter 1-2] on the basis of the system configuration information registered in the HDD 209.

Figure 21:
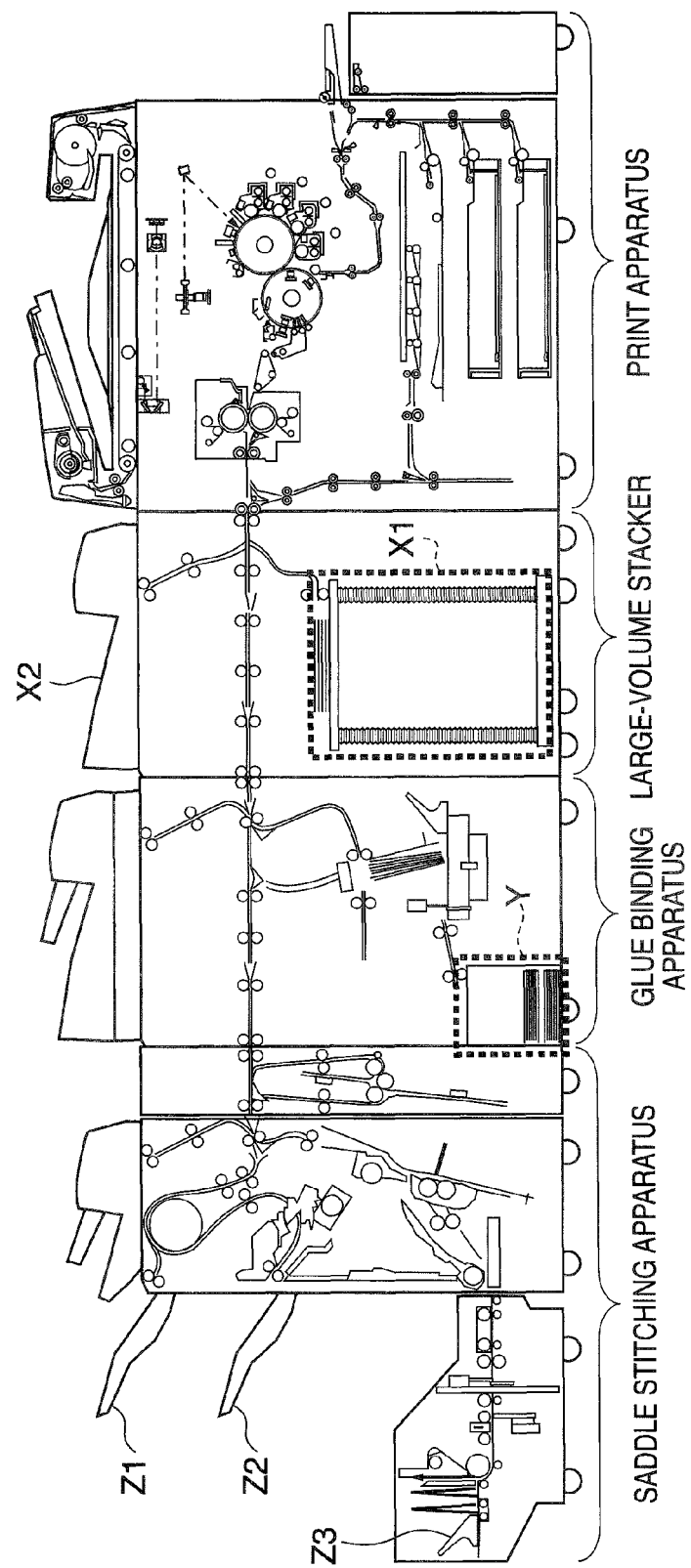
FIG. 21 is a sectional view for explaining a control example associated with the printing system 1000.

[Confirmation Matter 1-1] When the printing system 1000 has the system configuration shown in FIG. 21, the control unit 205 specifies that the total number of destinations (delivery destinations) capable of holding sheets printed by the printer unit 203 is six.

[Confirmation Matter 1-2] When the printing system 1000 has the system configuration shown in FIG. 21, the control unit 205 confirms that the stack tray inside the large-volume stacker exists as the first destination (to be referred to as destination X1 as shown in FIG. 21).

Also, when the printing system 1000 has the system configuration shown in FIG. 21, the control unit 205 confirms that the external sample tray at the top of the large-volume stacker exists as the second destination (to be referred to as destination X2 as shown in FIG. 21).

When the printing system 1000 has the system configuration shown in FIG. 21, the control unit 205 confirms that the basket inside the glue binding apparatus exists as the third destination (to be referred to as destination Y as shown in FIG. 21).

When the printing system 1000 has the system configuration shown in FIG. 21, the control unit 205 confirms that the first tray outside the saddle stitching apparatus exists as the fourth destination (to be referred to as destination Z1 as shown in FIG. 21).

When the printing system 1000 has the system configuration shown in FIG. 21, the control unit 205 confirms that the second tray outside the saddle stitching apparatus exists as the fifth destination (to be referred to as destination Z2 as shown in FIG. 21).

When the printing system 1000 has the system configuration shown in FIG. 21, the control unit 205 confirms that the tray inside the saddle stitching apparatus exists as the sixth destination (to be referred to as destination Z3 as shown in FIG. 21).

In this manner, when the printing system 1000 has the system configuration shown in FIG. 21, the control unit 205 makes confirmation as illustrated in [confirmation matter 1-1] and [confirmation matter 1-2] on the basis of the aforementioned system configuration information. Assume that a job to be processed by the printing system 1000 is a job corresponding to one of the following exemplary cases in the system configuration shown in FIG. 21.

[Case 1-1] The target job is a stacker job, and requires the use of destination X1 in FIG. 21 as the production printed material destination of the job.

[Case 1-2] The target job is a glue binding job, and requires the use of destination Y in FIG. 21 as the production printed material destination of the job.

[Case 1-3] The target job is a job requiring sheet processing by the saddle stitching apparatus, and requires the use of one of destinations Z1 to Z3 in FIG. 21 as the production printed material destination of the job.

As described above, the printing system 1000 has the system configuration shown in FIG. 21, and the job to be processed by the printing system 1000 corresponds to one of [case 1-1] to [case 1-3]. In this case, the control unit 205 sequentially executes the following illustrative [control 1-1] and [control 1-2] for the job.

[Control 1-1] The control unit 205 controls the operation unit 204 to accept a check print request for a target job from the operator while the printing system 1000 executes the production print operation of the job. A description of the control on the operation unit 204 is the same as the aforementioned control on the operation unit 204, and will not be repeated.

[Control 1-2] Assume that the operator issues a check print request for the target job via the operation unit 204 during execution of production printing of the job. In response to this request, the control unit 205 causes the printing system 1000 to interrupt the production print operation of the job and start check print of the job.

When executing the check print operation of the job, the control unit 205 controls the printing system 1000 to output the check printed materials of the job to externally exposed destination X2 of the large-volume stacker shown in FIG. 21. The control unit 205 controls the printing system 1000 to inhibit the use of a destination other than destination X2 as the check printed material destination of the job.

Upon completion of outputting the check printed materials of the job to destination X2, the control unit 205 controls the printing system 1000 to automatically resume the production print operation of the job. In the resume operation, the control unit 205 controls the printing system 1000 to output the production printed materials of the job to the same destination as that used for the job before the start of the check print operation of the job.

In this way, the printing system 1000 is configured to execute a series of control operations including [control 1-1] and [control 1-2] in accordance with the processes of the flowcharts illustrated in FIGS. 16 to 19 upon receiving a check print request in the system configuration shown in FIG. 21.

Control Example 2 for Printed Material Destination in Control Related to Check Print Operation by Printing System 1000

The second control example corresponding to control related to a printed material destination will be explained with reference to FIG. 22. This control example is one control related to the check print operation executed by the control unit 205. FIG. 22 is a sectional view showing in detail printed material destination candidates in the system configuration shown in FIG. 20. FIGS. 20 and 22 show the same system configuration.

As described above, the control unit 205 confirms the aforementioned system configuration information. Assume that the printing system 1000 has the system configuration shown in FIG. 22. In this case, the control unit 205 confirms the following exemplary [confirmation matter 2-1] and [confirmation matter 2-2] on the basis of the system configuration information.

Figure 22:
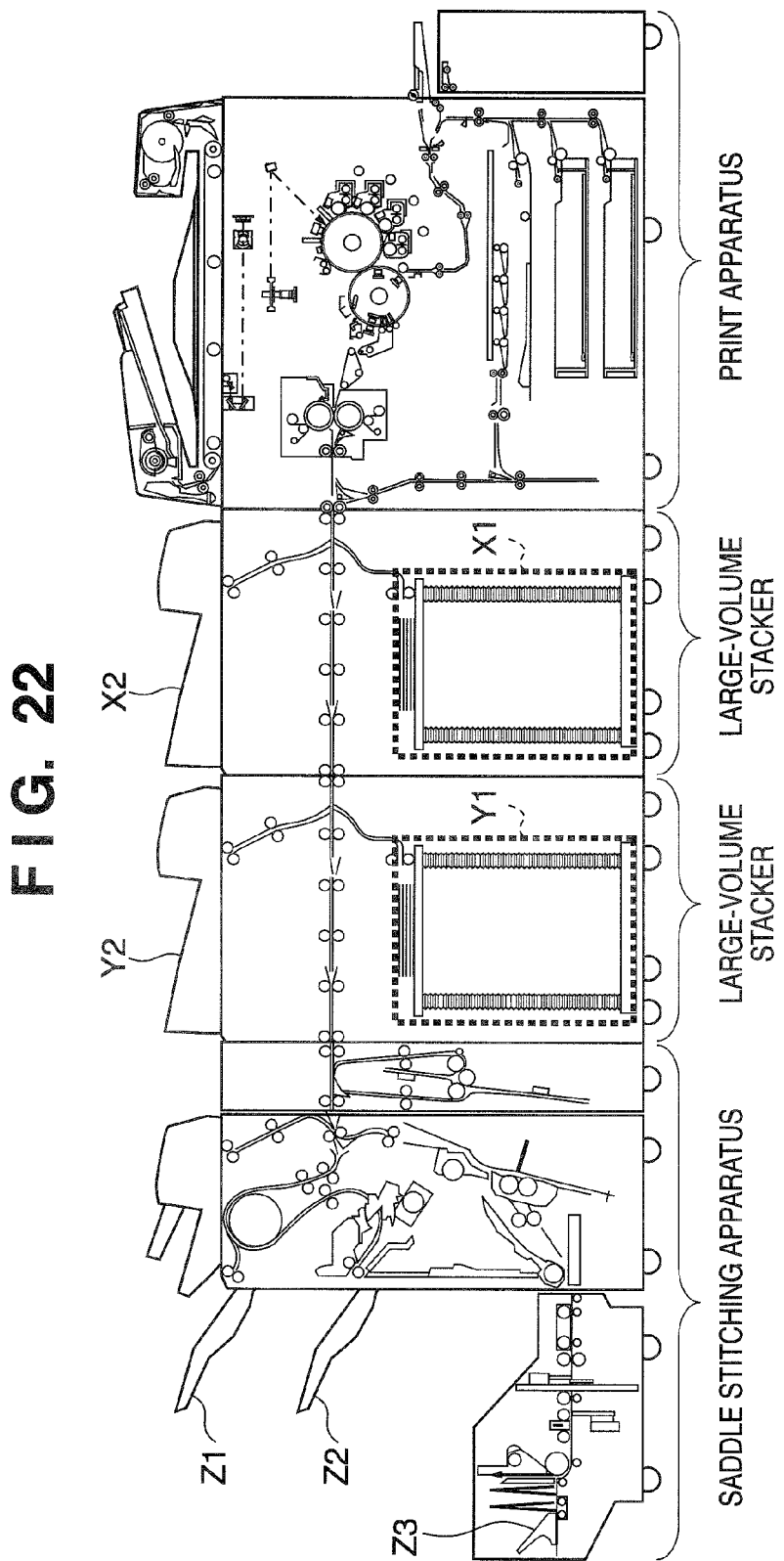
FIG. 22 is a sectional view for explaining a control example associated with the printing system 1000.

[Confirmation Matter 2-1] When the printing system 1000 has the system configuration shown in FIG. 22, the control unit 205 specifies that the total number of destinations (delivery destinations) capable of holding sheets printed by the printer unit 203 is seven.

[Confirmation Matter 2-2] When the printing system 1000 has the system configuration shown in FIG. 22, the control unit 205 confirms that the stack tray inside the large-volume stacker of the first connection order exists as the first destination (to be referred to as destination X1 as shown in FIG. 22).

Also, when the printing system 1000 has the system configuration shown in FIG. 22, the control unit 205 confirms that the external sample tray at the top of the large-volume stacker of the first connection order exists as the second destination (to be referred to as destination X2 as shown in FIG. 22).

When the printing system 1000 has the system configuration shown in FIG. 22, the control unit 205 confirms that the stack tray inside the large-volume stacker of the second connection order exists as the third destination (to be referred to as destination Y1 as shown in FIG. 22).

When the printing system 1000 has the system configuration shown in FIG. 22, the control unit 205 confirms that the external sample tray at the top of the large-volume stacker of the second connection order exists as the fourth destination (to be referred to as destination Y2 as shown in FIG. 22).

When the printing system 1000 has the system configuration shown in FIG. 22, the control unit 205 confirms that the first tray outside the saddle stitching apparatus of the third connection order exists as the fifth destination (to be referred to as destination Z1 as shown in FIG. 22).

When the printing system 1000 has the system configuration shown in FIG. 22, the control unit 205 confirms that the second tray outside the saddle stitching apparatus of the third connection order exists as the sixth destination (to be referred to as destination Z2 as shown in FIG. 22).

When the printing system 1000 has the system configuration shown in FIG. 22, the control unit 205 confirms that the tray inside the saddle stitching apparatus of the third connection order exists as the seventh destination (to be referred to as destination Z3 as shown in FIG. 22).

In this fashion, when the printing system 1000 has the system configuration shown in FIG. 22, the control unit 205 makes confirmation as illustrated in [confirmation matter 2-1] and [confirmation matter 2-2] on the basis of the aforementioned system configuration information. Assume that a job to be processed by the printing system 1000 is a job corresponding to one of the following illustrative cases in the system configuration shown in FIG. 22.

[Case 2-1] The target job is a stacker job, and requires the use of destination X1 in FIG. 22 as the production printed material destination of the job.

[Case 2-2] The target job is a stacker job, and requires the use of destination Y1 in FIG. 22 as the production printed material destination of the job.

[Case 2-3] The target job is a job requiring sheet processing by the saddle stitching apparatus, and requires the use of one of destinations Z1 to Z3 in FIG. 22 as the production printed material destination of the job.

As described above, the printing system 1000 has the system configuration shown in FIG. 22, and the job to be processed by the printing system 1000 corresponds to one of [case 2-1] to [case 2-3]. In this case, the control unit 205 sequentially executes the following illustrative [control 2-1] and [control 2-2] for the job.

[Control 2-1] The control unit 205 controls the operation unit 204 to accept a check print request for a target job from the operator during execution of the production print operation of the job.

[Control 2-2] Assume that the operator issues a check print request for the job via the operation unit 204 during execution of production printing of the job. In response to this request, the control unit 205 causes the printing system 1000 to interrupt the production print operation of the job and start check print of the job.

When executing the check print operation of the job, the control unit 205 controls the printing system 1000 to output the check printed materials of the job to destination X2 of the first large-volume stacker closest to the print apparatus 100 regardless of the production printed material destination of the job. In this manner, the control unit 205 controls the printing system 1000 to utilize destination X2 of the large-volume stacker arranged upstream in the sheet conveyance direction in FIG. 22 as the check printed material destination of the target job regardless of the production printed material destination of the job.

Upon completion of outputting the check printed materials of the job to destination X2 of the large-volume stacker, the control unit 205 controls the printing system 1000 to automatically resume the production print operation of the job. At this time, the control unit 205 controls the printing system 1000 to output the production printed materials of the job to the same destination as that used for the job before the start of the check print operation of the job.

In this way, the printing system 1000 is configured to execute a series of control operations including [control 2-1] and [control 2-2] in accordance with the processes of the above-described flowcharts upon receiving a check print request in the system configuration shown in FIG. 22.

Control Example 3 for Printed Material Destination in Control Related to Check Print Operation by Printing System 1000

The third control example corresponding to control related to a printed material destination will be explained with reference to FIG. 22 again. This control example is one control related to the check print operation executed by the control unit 205.

For example, the control unit 205 confirms system configuration information as in the above-described control examples. Assume that the printing system 1000 has the system configuration shown in FIG. 22. That is, the control unit 205 makes the same confirmations as the above-described [confirmation matter 2-1] and [confirmation matter 2-2] on the basis of the system configuration information registered in advance in the memory of the print apparatus 100.

Assume that the printing system 1000 has the system configuration shown in FIG. 22, and a job to be processed by the printing system 1000 is a job corresponding to one of the above-mentioned cases [case 2-1] to [case 2-3] in this system configuration. These conditions are the same as those in control example 2 described above. However, in control example 3, control different from that in control example 2 is executed. In control example 3, the control unit 205 sequentially executes the following illustrative [control 3-1] and [control 3-2] for the target job.

[Control 3-1] The control unit 205 controls the operation unit 204 to accept a check print request for a target job from the operator during execution of the production print operation of the job. This is the same as in the above-mentioned control examples.

[Control 3-2] Assume that the operator issues a check print request for the target job via the operation unit 204 during execution of production printing of the job. In response to this request, the control unit 205 controls the printing system 1000 to interrupt the production print operation of the job. Further in control example 3, the control unit 205 confirms which of destinations X1 to Z3 in FIG. 22 is the production printed material destination of the job.

As a result, assume that the control unit 205 confirms that the production printed material destination of the job is not destination X1 but one of destinations Y1 and Z1 to Z3 in FIG. 22. In this case, the control unit 205 controls the printing system 1000 to output the check printed materials of the job to destination Y2 of the second large-volume stacker in FIG. 22.

In contrast, assume that the production printed material destination of the job is destination X1 in FIG. 22. In this case, the control unit 205 controls the printing system 1000 to output the check printed materials of the job to destination X2 of the first large-volume stacker in FIG. 22.

In control example 3, the control unit 205 confirms two selection candidates: destination X2 of the first large-volume stacker and destination Y2 of the second large-volume stacker in FIG. 22, each of which corresponds to an exposed destination (delivery portion) at the top of the apparatus. The control unit 205 controls the printing system 1000 to utilize, as the check printed material destination of the job, a destination closer to the production printed material destination of the job out of the two destination selection candidates.

Upon completion of outputting the check printed materials of the job, the control unit 205 controls the printing system 1000 to automatically resume the production print operation of the job. At this time, the control unit 205 controls the printing system 1000 to output the production printed materials of the job to the same destination as that used for the job before the start of check print of the job.

In this manner, the printing system 1000 is configured to execute a series of control operations including [control 3-1] and [control 3-2] in accordance with the processes of the flowcharts illustrated in FIGS. 16 to 19 upon receiving a check print request in the system configuration shown in FIG. 22.

Control example 1 in FIG. 21 and control example 2 in FIG. 22 correspond to control examples in which the control unit 205 causes the printing system 1000 to execute an operation corresponding to mode 1 or mode 3 illustrated in the flowchart of FIG. 17 or the like. In contrast, control example 3 in FIG. 22 corresponds to a control example in which the control unit 205 causes the printing system 1000 to execute an operation corresponding to mode 2 illustrated in the flowchart of FIG. 17 or the like.

As for the three control examples with reference to FIGS. 21 and 22 to 30, the printing system 1000 according to the embodiment may also be configured to execute all the three control examples and selectively execute them. Alternatively, the printing system 1000 may also be configured to selectively execute only two of the three control examples. Alternatively, the printing system 1000 may also be configured to selectively execute only one of the three control examples. In this fashion, various configurations are applicable to the printing system 1000 according to the embodiment.

As described above, the printing system 1000 according to the embodiment is configured as follows. That is, the control unit 205 can automatically decide the production printed material destination of the job on the basis of a finishing type (setting contents of sheet processing) set by the operator, and the system configuration of the printing system 1000.

As another method, the printing system 1000 is configured to allow the operator to explicitly designate the destination of production materials printed by the production print operation. This will be exemplified with reference to FIGS. 23A to 23E.

For example, at present, the operator is to set printing conditions via the operation unit 204 for the production print operation prior to the start of the production print operation. Assume that the operator presses the "finishing" key in the window of FIG. 13A described above. In response to this, the control unit 205 causes the touch panel unit 401 to execute a display shown in FIG. 23A.

Windows illustrated in FIGS. 23A to 23E are ones displayed on the touch panel unit 401 under the control of the control unit 205 when the printing system 1000 is configured to utilize two sheet processing apparatuses, e.g., the large-volume stacker shown in FIG. 4 and the saddle stitching apparatus shown in FIG. 6. As described above, the control unit 205 controls the touch panel unit 401 to present display contents based on the aforementioned system configuration information even when displaying the windows illustrated in FIGS. 23A to 23E.

The control unit 205 controls to display an outline of the saddle stitching apparatus and large-volume stacker in a display area 3303 in the window of FIG. 23A so that the operator can explicitly, graphically understand the presence of the two, saddle stitching apparatus and large-volume stacker in the printing system 1000.

The control unit 205 controls the operation unit 204 so that the operator can use a key 3301 or key 3302 in FIG. 23A to explicitly decide which of the sheet processing apparatuses is used.

Assume that the operator presses the key 3301 in a window 3300 of FIG. 23A. In this case, the control unit 205 controls the printing system 1000 to utilize the destination of the saddle stitching apparatus in the printing system 1000 as the production printed material destination of the job. When the saddle stitching apparatus is selected, the control unit 205 controls the operation unit 204 so that the operator can designate a finishing type necessary for a production job in a setting field 3304 from a plurality of finishing types executable by the saddle stitching apparatus.

To the contrary, assume that the operator presses the key 3302 in the window 3300 of FIG. 23A. In this case, the control unit 205 controls the printing system 1000 to utilize the large-volume stacker in the printing system 1000 as the production printed material destination of the job.

The control unit 205 controls the touch panel unit 401 to switch the display in FIG. 23A to one in FIG. 23B when the operator presses the key 3302. A setting field 3305 in the window of FIG. 23B has a stacker delivery destination selection column 3306.

The operator can decide, via the selection column 3306, which of a destination (stack tray in FIG. 4) inside the large-volume stacker and a destination (sample tray in FIG. 4) exposed outside the large-volume stacker is used as the production printed material destination. A "stack portion" as a choice in the selection column 3306 corresponds to the stuck tray of the large-volume stacker in FIG. 4. A "delivery tray" as a choice in the selection column 3306 corresponds to the sample tray of the large-volume stacker in FIG. 4.

In response to the press of the selection column 3306 by the operator, the control unit 205 changes the display form of the selection column 3306 to one illustrated in FIG. 23C. The control unit 205 controls the touch panel unit 401 to present two destination choices of one large-volume stacker to the operator, as represented by the display of the selection column 3306 in FIG. 23C.

Assume that the operator selects the "stack portion" in the selection column 3306. In this case, the control unit 205 determines that the operator has selected the destination (stuck tray) inside the large-volume stacker as the production printed material destination of the job in the production print operation, as shown in FIG. 23B. In accordance with the selection instruction, the control unit 205 controls the printing system 1000 to use the destination (stuck tray) inside the large-volume stacker as the production printed material destination of the job in the production print operation.

Figure 23D:
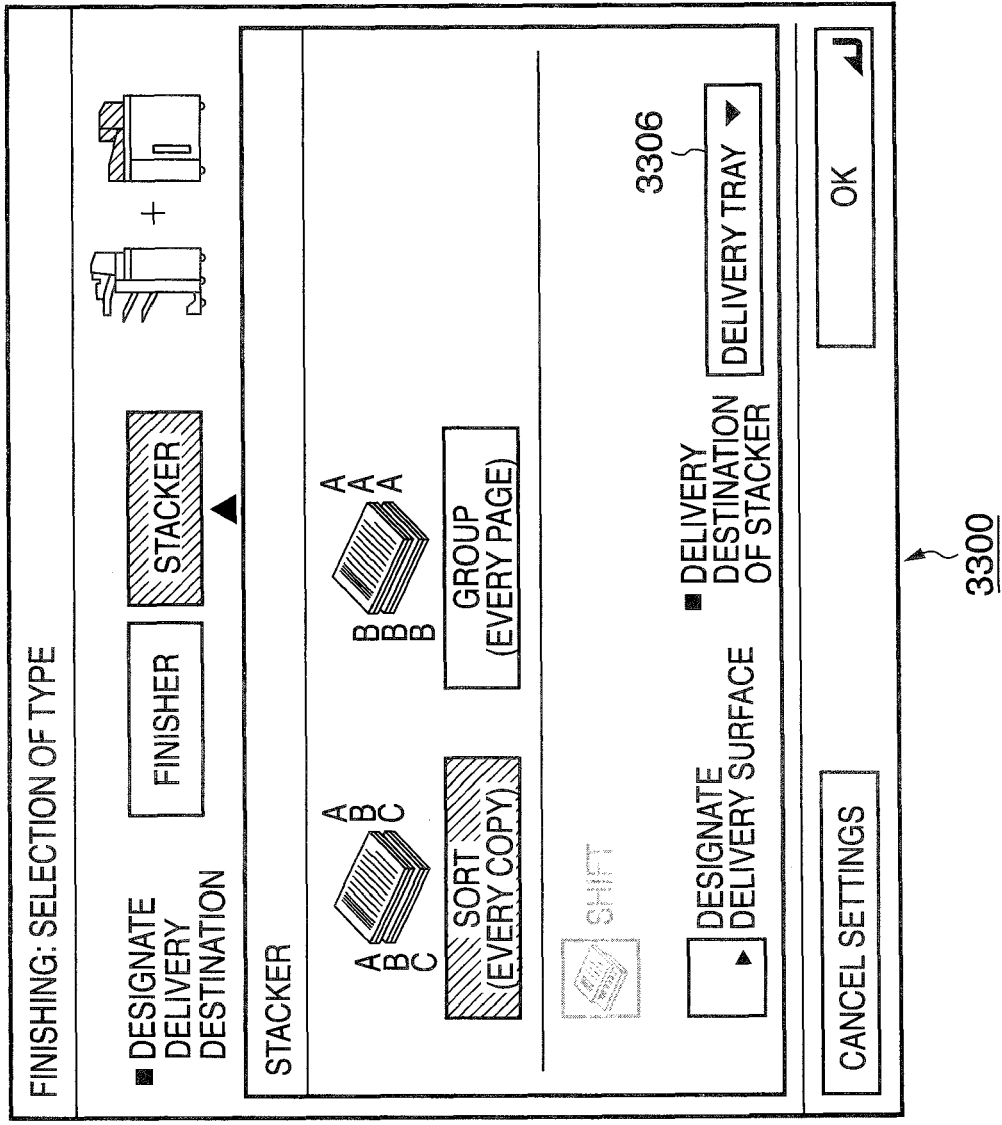
FIG. 23D is a view for explaining a control example associated with the operation unit 204.

In contrast, assume that the operator selects the "delivery tray" in the selection column 3306. In this case, the control unit 205 determines that the operator has selected the destination (sample tray) outside the large-volume stacker as the production printed material destination of the job in the production print operation, as shown in FIG. 23D. In accordance with the selection instruction, the control unit 205 controls the printing system 1000 to use the destination (sample tray) outside the large-volume stacker as the production printed material destination of the job in the production print operation.

As described in step S308 of FIG. 17 and step S408 of FIG. 18, the printing system 1000 according to the embodiment is configured to allow the operator to explicitly designate which of operations in face-up and face-down stacking modes is executed in the production print operation. This configuration will be explained with reference to FIGS. 23A to 23E.

For example, the windows in FIGS. 23A to 23D each have a "designate delivery surface" key. Assume that the operator presses this key. In response to this key operation, the control unit 205 causes the touch panel unit 401 to display a window 3300E illustrated in FIG. 23E.

If the operator presses a "face down" key in the window 3300E, the control unit 205 controls the printing system 1000 to execute an operation corresponding to the above-described first stacking mode in the production print operation of the job.

If the operator presses a "face up" key in the window 3300E, the control unit 205 controls the printing system 1000 to execute an operation corresponding to the above-described second stacking mode in the production print operation of the job.

As illustrated in FIGS. 23A to 23E, the printing system 1000 is configured to allow the operator to explicitly designate the destination and delivery surface of the production printed materials of a target job in the production print operation before inputting a print execution instruction for the job.

As described with reference to FIGS. 1 to 23E, the printing system 1000 is configured to output materials printed by the print apparatus 100 to the destination of one of sheet processing apparatuses. Sheet processing apparatuses illustrated in FIGS. 4 to 6 which are available in the printing system 1000 of the embodiment will be called inline finishers (inline type post-processing apparatuses) in order to discriminate them from the apparatuses 107 to 110 in FIG. 1. These apparatuses can execute a variety of sheet processes (synonymous with post-processes and finishings).

In the embodiment, the control unit 205 controls the printing system 1000 to output the production printed materials of a target job to a destination corresponding to the type of finishing necessary for the target job.

The control unit 205 controls the operation unit 204 so that the operator can explicitly or indirectly designate the production printed material destination of the job on the basis of the print processing conditions of the job accepted from the operator via the operation unit 204 before input of the print execution request of the job.

Upon receiving the production print operation execution request of the job, the control unit 205 causes the printing system 1000 to start the production print operation of the job. This print operation corresponds to the first print processing. During execution of the production print operation of the job, the control unit 205 controls the operation unit 204 to accept a specific request from the operator to cause the printing system 1000 to execute check processing concerning print processing by the printing system 1000. The check processing corresponds to check print processing in the embodiment, and the specific request corresponds to a check print request in the embodiment. The check print request in the embodiment is a request to cause the printing system 1000 to execute check processing so that the operator can visually check the print result of a job printed by the printing system 1000.

By executing the check processing, the operator can easily, quickly confirm the print data and output form (copy ratio, print layout, glossiness, print density, and the like) of a job printed on a print medium by the printing system 1000.

As examples of the user interface unit, the embodiment has exemplified operation devices such as the operation unit 204 having the touch panel unit 401 and the display, mouse, and keyboard of a host computer. However, a user interface unit of another type or configuration is also available.

Assume that the control unit 205 accepts the specific request from the operator via the operation unit 204 in a state in which the print apparatus 100 executes the production print operation of the job.

In response to the specific request, the control unit 205 controls the printing system 1000 to automatically interrupt (suspend) the production print operation of the job in execution in the printing system 1000 without receiving any explicit print interruption request from the operator.

Immediately after interrupting the production print operation of the job, the control unit 205 controls the printing system 1000 to automatically start check processing in accordance with the specific request. In the embodiment, as an example of check processing, the print apparatus 100 executes print processing under the control of the control unit 205 by using print data which is exploited in the production print operation of the print operation-interrupted job. This print processing corresponds to the second print processing. That is, the second print processing corresponds to the check print operation in the embodiment.

Immediately after the completion of the check print operation of the job, the control unit 205 controls the printing system 1000 to automatically resume the production print operation of the print-interrupted job.

In this fashion, the control unit 205 enables the printing system 1000 to automatically execute the three types of operations in series: suspension of production print processing of a target job, execution of check print of the job, and resume of production print processing of the job. The control unit 205 controls the printing system 1000 including the print apparatus 100 to execute a series of operations including these three types of operations when the operator inputs a check print request with the key 2304B during execution of the production print operation of the job.

In the embodiment, the control unit 205 can accept a specific request from the operator via the operation unit 204 during the first print processing by the print apparatus 100. Upon accepting the specific request, the control unit 205 interrupts the first print processing. The control unit 205 causes the print apparatus 100 to execute check processing after interrupting the first print processing. As the check processing, the control unit 205 causes the print apparatus 100 to execute the second print processing using print data necessary to perform the first print processing. After performing the check processing, the control unit 205 causes the print apparatus 100 to resume the first print processing.

Further, the control unit 205 inhibits output of the check printed materials of the job in the check print operation to the same destination as a printed material destination necessary in the production print operation of the job. The control unit 205 controls the printing system 1000 to output the check printed materials of the job in the check print operation to a destination of an inline finisher that is different from a printed material destination necessary in the production print operation of the job.

The control unit 205 controls the printing system 1000 so that the operator can specify which of inline finishers in the printing system 1000 is employed as the check printed material destination.

For example, the control unit 205 performs the following control even in a case where the production printed materials of a check print-requested job is output to a destination inside an inline finisher in the production print operation.

For example, even in this case, the control unit 205 inhibits output of the check printed materials of the job to the destination inside the inline finisher in the check print operation.

In this case, the control unit 205 controls the printing system 1000 to output the check printed materials of the job to a destination outside this inline finisher or another inline finisher in the check print operation.

When a plurality of inline finishers are connected to the print apparatus 100 in the printing system 1000 according to the embodiment and are available, the control unit 205 controls the printing system 1000 to execute the following operation.

Assume that the production printed materials of the job is output via a specific inline finisher to the destination of an inline finisher on the output side (downstream in the sheet conveyance direction) in the production print operation.

According to the embodiment, even in this case, the control unit 205 inhibits output of the check printed materials of the job to the destination of the inline finisher on the output side in the check print operation.

In this case, the control unit 205 can output the check printed materials of the job by check print to the destination of the above-mentioned specific inline finisher on the input side (upstream) of the inline finisher serving as the production printed material destination. In the embodiment, this specific inline finisher is the large-volume stacker.

The printing system 1000 according to the embodiment is configured to utilize a plurality of inline finishers capable of executing different types of finishing, such as the first and second type inline finishers. In the embodiment, the first type inline finisher is the large-volume stacker in FIG. 4. In the embodiment, the second type inline finisher is the glue binding apparatus in FIG. 5 or the saddle stitching apparatus in FIG. 6.

In this system configuration, assume that the control unit 205 controls the printing system 1000 to output the printed materials of the job necessary for the production print operation to the destination of the second type inline finisher.

Even in this case, the control unit 205 inhibits output of the check printed materials of the job to the destination of the second type inline finisher in the check print operation. In this case, the control unit 205 controls the printing system 1000 to output the check printed materials of the job by check print to the destination of the first type inline finisher.

The printing system 1000 according to the embodiment is configured so that a plurality of inline finishers including at least two first type inline finishers each having the first and second destinations can be coupled to the print apparatus 100. In the embodiment, an example of the first destination is the sample tray of the large-volume stacker in FIG. 4, and an example of the second destination is the stack tray of the large-volume stacker.

In this system configuration, the control unit 205 controls the printing system 1000 to output the printed materials of the job necessary for the production print operation to a destination other than the first destination of the first type inline finisher.

For example, the control unit 205 controls to output the printed materials of the job necessary in the production print operation to the second destination of an upstream one of the two first type inline finishers. Depending on the processing conditions of the job, the control unit 205 controls to output the printed materials of the job necessary in the production print operation to the second destination of a downstream first type inline finisher. In either case, the control unit 205 controls the printing system 1000 to output the check printed materials of the target job to the first destination of the upstream first type inline finisher. This control example corresponds to control example 1 using FIG. 21 and control example 2 using FIG. 22.

In the embodiment, the control unit 205 controls the printing system 1000 to output the check printed materials of the job to a destination closer to the production printed material destination of the job out of two first destinations in the two sheet processing apparatuses. This control example corresponds to control example 3 illustrated in FIG. 22.

Moreover in the embodiment, the control unit 205 enables the printing system 1000 to selectively execute the face-down operation and face-up operation for each job. The face-down operation is to output printed materials to a destination in the printing system 1000 while the print results of odd-numbered pages of the printed materials necessary in the print operation of a target job face down, as described above. The face-up operation is to output printed materials to a destination in the printing system 1000 while the print results of odd-numbered pages of the printed materials necessary in the print operation of a target job face up, as described above.

Assume that a job subjected to check print requires the face-down operation in the production print operation. In this case, the control unit 205 controls the printing system 1000 to execute the face-down operation even in outputting the check printed materials of the job. In contrast, assume that a job subjected to check print requires the face-up operation in the production print operation. In this case, the control unit 205 controls the printing system 1000 to execute the face-up operation even in outputting the check printed materials of the job.

However, even when the face-down operation is necessary in the production print operation of a check print-requested job, the control unit 205 may control the printing system 1000 to execute the face-up operation in check print of the job.

The printing system 1000 according to the embodiment is configured to execute this selective control.

In the embodiment, the control unit 205 enables the operation unit 204 according to the embodiment to execute a display which allows the operator to specify the check printed material destination of a check print-requested job, as described above.

In the absence of any destination candidate different from a printed material destination necessary in the production print operation, the control unit 205 inhibits acceptance of a check print request for the job from the operator via the operation unit 204.

As described above, upon accepting a check print request, the control unit 205 causes the printing system 1000 to interrupt print processing (corresponding to production print processing) of the check print-requested job. Immediately after interrupting print processing, the control unit 205 causes the printing system 1000 to execute check processing for the job. In the embodiment, as the check processing, the control unit 205 controls the printing system 1000 to read out print data of the interrupted job from the HDD 209 and execute check print processing using the print data, as described above. Immediately after the end of check processing, the control unit 205 causes the printing system 1000 to automatically resume (continue) print processing (corresponding to production print processing) of the interrupted job.

Prior to the start of check print, the control unit 205 controls the operation unit 204 so that the operator can designate whether to print one or all pages of print data of the job, as the check print operation of the job.

As described above, the printing system 1000 according to the embodiment has the test copy function of executing the test copy operation before accepting the print execution request of a target job from the operator. As a function independent of the test copy function, the printing system 1000 according to the embodiment has the check print function of executing the aforementioned check print.

As described above, the control unit 205 controls the operation unit 204 so that the operator can use it to designate, for each target job, which of the operations of the test copy function and check print function is to be executed.

In this manner, the printing system 1000 according to the embodiment is configured to execute, as an operation independent of the check print operation, the test copy operation of executing test copy before accepting the print execution request of a target job from the operator.

As described above, the control unit 205 separately decides whether to execute the test copy operation and whether to execute the check print operation.

Assume that the target job requires printing of copies and requires finishing such as sorting or stapling. In this case, the control unit 205 permits execution of the test copy operation for the job. The timing when the control unit 205 permits acceptance of the execution request of the test copy operation is the timing before the printing system 1000 starts the production print operation of the job. To the contrary, the timing when the control unit 205 permits acceptance of a check print request is the timing when the production print operation of the target job is in execution, as described above. Assume that the production print operation of a target job is in execution in the printing system 1000. In this case, the control unit 205 permits acceptance of a check print request for the job from the operator via the operation unit 204.

As described above, in the embodiment, the control unit 205 permits output of the printed materials of the job in the production print operation to the same destination as the test copy printed material destination of the job having undergone the test copy operation. However, the control unit 205 inhibits output of the printed materials of the job in the production print operation to the same destination as the check printed material destination of the job having undergone the check print operation.

In the embodiment, assume that the test copy operation is executed as described above. In this case, the control unit 205 controls the operation unit 204 so that the operator can use the operation unit 204 to change print processing conditions relating to the print operation of the job having undergone the test copy operation but not relating to the print operation of another job.

Assume that the check print operation is executed. In this case, the control unit 205 controls the operation unit 204 so that the operator can change, via the operation unit 204, print processing conditions relating to the print operation of the job having undergone the check print operation and also relating to the print operation of another job.

The control unit 205 controls the printing system 1000 to utilize the check print function even for a job having undergone the test copy operation and execute the check print operation of the job. For example, the printing system 1000 further executes the control in FIG. 12B even for a job having undergone the test copy operation by the control in FIG. 12A. In this way, the control unit 205 enables the printing system 1000 to execute the check print operation even for a job having undergone test copy prior to the start of the production print operation. This implements a printing environment where many mechanisms of ensuring high-quality printed materials as products are employed, further improving effects attained by the printing system 1000.

In the embodiment, the control unit 205 outputs the check printed materials of a target job to an inline finisher different from the printed material destination of the job necessary in the print operation. The control unit 205 enables the printing system 1000 to automatically resume the production print operation of the job upon completion of check print. The control unit 205 can accept a check print request again from the operator via the operation unit 204 to output the check printed materials of the job until the resumed print operation of the job ends in the printing system 1000.

The printing system 1000 according to the embodiment has an automatic destination decision mode in which the printed materials of a target job is output to a destination decided by the control unit 205 on the basis of the type of post-processing set by the operator via the operation unit 204 for the job.

The printing system 1000 also has a manual destination decision mode in which the printed materials of a target job are output to the destination of a post-processing apparatus explicitly designated by the operator via the operation unit 204 for the job.

In the embodiment, regardless of which of the two modes is executed, the control unit 205 enables the printing system 1000 to output the check printed materials of a target job to the destination of an inline finisher different from the printed material destination of the job.

Assume that the printing system 1000 starts feeding the printed materials of a job necessary in the production print operation upon receiving a check print request, as described above. In this case, the control unit 205 controls the printing system 1000 to start feeding the check printed materials (sheets before printing) of the job necessary for the check print operation even if the fed printed materials have not been completely output to a destination used in the production print operation.

The print apparatus 100 according to the embodiment comprises the HDD 209 capable of storing data of a plurality of types of jobs including a job requiring print processing of print data from the document reader and a job requiring print processing of print data from an external apparatus. As described above, the control unit 205 accepts a check print request via various UI units applicable to the printing system 1000, such as the operation unit 204 and the display, keyboard, and mouse of an external apparatus such as the PC 104. Accordingly, the control unit 205 can execute control related to the check print operation of the embodiment for any type of job among a plurality of types of jobs.

In the embodiment, as described above, the control unit 205 controls the operation unit 204 to accept the execution request of check processing concerning the first print processing from the operator via the operation unit 204 while the print apparatus 100 executes the first print processing (corresponding to the production print operation). Upon accepting this request, the control unit 205 interrupts the first print processing. Immediately after the interruption, the control unit 205 controls the print apparatus 100 to automatically execute check processing (corresponding to the check print operation) instead of the first print processing preferentially to the completion of the first print processing. As check processing, the control unit 205 causes the print apparatus 100 to read out print data used in the first print processing from the HDD 209 and execute the second print processing using the print data. Immediately after the end of check processing, the control unit 205 controls the print apparatus 100 to automatically continue the first print processing by the print apparatus 100.

The configuration has been explained in which the print apparatus 100 automatically continues (resumes) the first print processing without accepting an instruction from the operator after performing check processing.

In the embodiment, however, the print apparatus 100 may continue (resume) the first print processing when accepting an instruction from the operator after performing check processing. For example, it is also possible to accept an instruction from the operator via the operation unit 204 after executing check print without automatically resuming the production print operation immediately after executing check print, and then resume the production print operation of a job.

The printing system 1000 has two modes: a mode in which the first print processing continues upon accepting an instruction from the operator after executing check processing, and a mode in which the first print processing automatically continues without accepting any instruction from the operator after executing check processing, as described above. Before input of the execution request of check processing from the operator, he can designate, via the operation unit 204, which of the modes is adopted to operate the print apparatus 100. This configuration is also possible. For example, the operator can designate, in advance via the operation unit 204, whether to resume the production print operation upon accepting an instruction from the operator after executing check print, or automatically resume the production print operation after executing check print, as described above.

Concrete examples of this configuration will be explained below.

Assume that the operator presses the key 2301A during execution of the production print operation of a job for which he requests the start of printing with the start key 503, as described above. In response to this, the control unit 205 causes the touch panel unit 401 to display the window 2300B. The operator selects the type of check print with the key 2301B or key 2302B in the window 2300B.

After the operator selects the type of check print, the control unit 205 causes the touch panel unit 401 to popup-display a window 2501 shown in FIG. 24. In the stage of displaying the window 2501 on the touch panel unit 401, the control unit 205 controls the printing system 1000 so that the print apparatus 100 continues the production print operation of the job. In this manner, the control unit 205 causes the touch panel unit 401 to display the window 2501 before the printing system 1000 starts check print of the job.

The window 2501 allows the operator to decide whether to automatically resume, immediately after executing check print, the production print operation interrupted immediately before the start of check print, or whether to resume it upon receiving an instruction from the operator.

The window 2501 has a device information display field 2502. The display field 2502 has the same function as the function of the window 2500. That is, the control unit 205 displays, in the display field 2502, image data representing a system outline coincident with the actual system configuration of the printing system 1000. In addition, the control unit 205 controls the touch panel unit 401 to add a mark "●"in "red" to a portion indicating a destination serving as a production printed material destination in the system outline in the display field 2502. Similarly, the control unit 205 controls the touch panel unit 401 to add a mark "★"in "blue" to a portion indicating a destination serving as the check printed material destination of the job in the system outline in the display field 2502. The control unit 205 presents, in the display field 2502, display contents which allow the operator to confirm the production printed material destination and check printed material destination of a job subjected to check print in the printing system 1000. In this situation, no check print has started, so the window 2501 displays a message "ready for check print."

Keys 2503 and 2504 in the window 2501 are operation instruction units which allow the operator to select whether to permit or inhibit automatic execution of the production print operation again after executing check print. The keys 2503 and 2504 are also used when the operator inputs a formal instruction to start check print. In other words, when the operator presses either of the keys, the control unit 205 interrupts the production print operation of a job subjected to check print and starts check print of the job. The keys 2503 and 2504 are display keys having a plurality of functions.

Assume that the operator presses the key 2503 in the window 2501. This case will be called the first case. In the first case, upon receiving an input from the key 2503, the control unit 205 interrupts (stops) the production print operation of the job being printed. In response to the interruption of the production print operation, the control unit 205 controls the printing system 1000 to automatically start check print of a type designated with the key 2301B or 2302B as the check print operation of the job. In response to execution of the check print operation, the control unit 205 controls the printing system 1000 to automatically resume the production print operation of the job. A series of control operations in the first case corresponds to the control sequence in FIG. 12B.

In contrast, assume that the operator presses the key 2504 in the window 2501. This case will be called the second case. In the second case, upon receiving an input from the key 2504, the control unit 205 interrupts (stops) the production print operation of the job being printed. In response to the interruption of the production print operation, the control unit 205 controls the printing system 1000 to automatically start check print of a type designated with the key 2301B or 2302B as the check print operation of the job. This operation is the same as in the first case.

In the second case, however, the control unit 205 controls the printing system 1000 to wait for resume of the production print operation of the job without automatically resuming it even after the end of the check print operation of the job.

Figure 25:
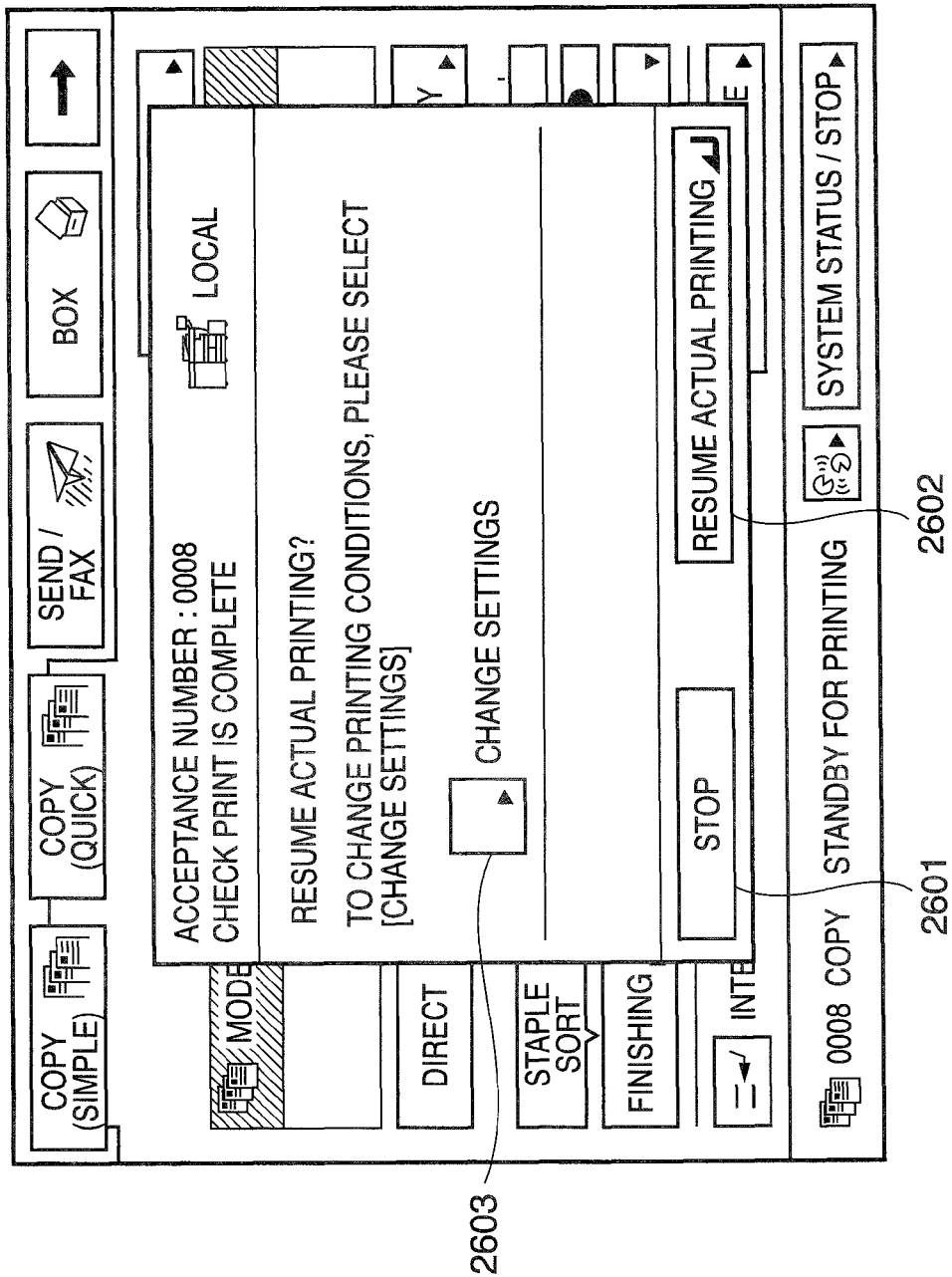
FIG. 25 is a view for explaining a control example associated with the operation unit 204.

In the second case, the control unit 205 causes the touch panel unit 401 to display a popup window shown in FIG. 25 in response to the end of the check print operation of the job by the printing system 1000. The window in FIG. 25 has keys 2601, 2602, and 2603.

The key 2601 is a display key used when the operator inputs an instruction to stop processing without resuming the production print operation of a job having undergone check print.

When the operator inputs this instruction via the key 2601, the control unit 205 controls the printing system 1000 to stop (cancel) processing of the job without resuming the production print operation of the job. When stopping processing of the job, the control unit 205 erases print data of all the pages of the job from the HDD 209, as described above. When a subsequent queued job exists other than the target job, the control unit 205 controls the printing system 1000 to quickly read out print data of the subsequent job from the HDD 209 and start print processing immediately after stopping the production print operation of the target job.

The key 2602 is a display key used when the operator inputs an instruction to resume the production print operation by the printing system 1000. The key 2603 is a display key used when the operator inputs an instruction to change the printing conditions of the production print operation prior to resume of the production print operation.

When the operator presses the key 2602 without pressing the key 2603, the control unit 205 causes the printing system 1000 to resume the production print operation of the job without changing the print processing conditions of the production print operation. When resuming the production print operation of the job without changing the processing conditions, the control unit 205 controls the printing system 1000 to print only part of the job that has not been printed before interrupting printing.

Assume that the operator presses the key 2603 before he inputs an instruction via the key 2602. In this case, the control unit 205 causes the touch panel unit 401 to display a popup window 2701 shown in FIG. 26. The window 2701 allows the operator to set and change the printing conditions of the production print operation of a job waiting for print resume.

For example, by using a display field 2702 in the window 2701 and the ten-key pad 506 of the operation unit 204, the operator can change the number of copies of a job when the production print operation of the job resumes. By using a slider 2703 in the window 2701, the operator can change the print density when the production print operation of the job resumes. The operator can change, via a key 2704 in the window 2701, post-processing to be executed by the sheet processing apparatus 200 for the printed materials of the job when the production print operation of the job resumes. The operator can change, via a key 2705 in the window 2701, print paper for use by the print apparatus 100 when the production print operation of the job resumes. By using a key 2706, the operator can change the binding margin. By using a key 2707, the operator can change a setting of whether to perform single- or double-sided printing.

A key 2708 is a display key used when the operator inputs an instruction to end the popup display of the window 2701 and return to the window in FIG. 25.

The window 2701 can display the current progress of the production print operation of the job. In the display example of FIG. 26, the window 2701 displays a message that the production print operation is complete at present by 20 sets for a job requiring printing of 100 sets in total.

Figure 26:
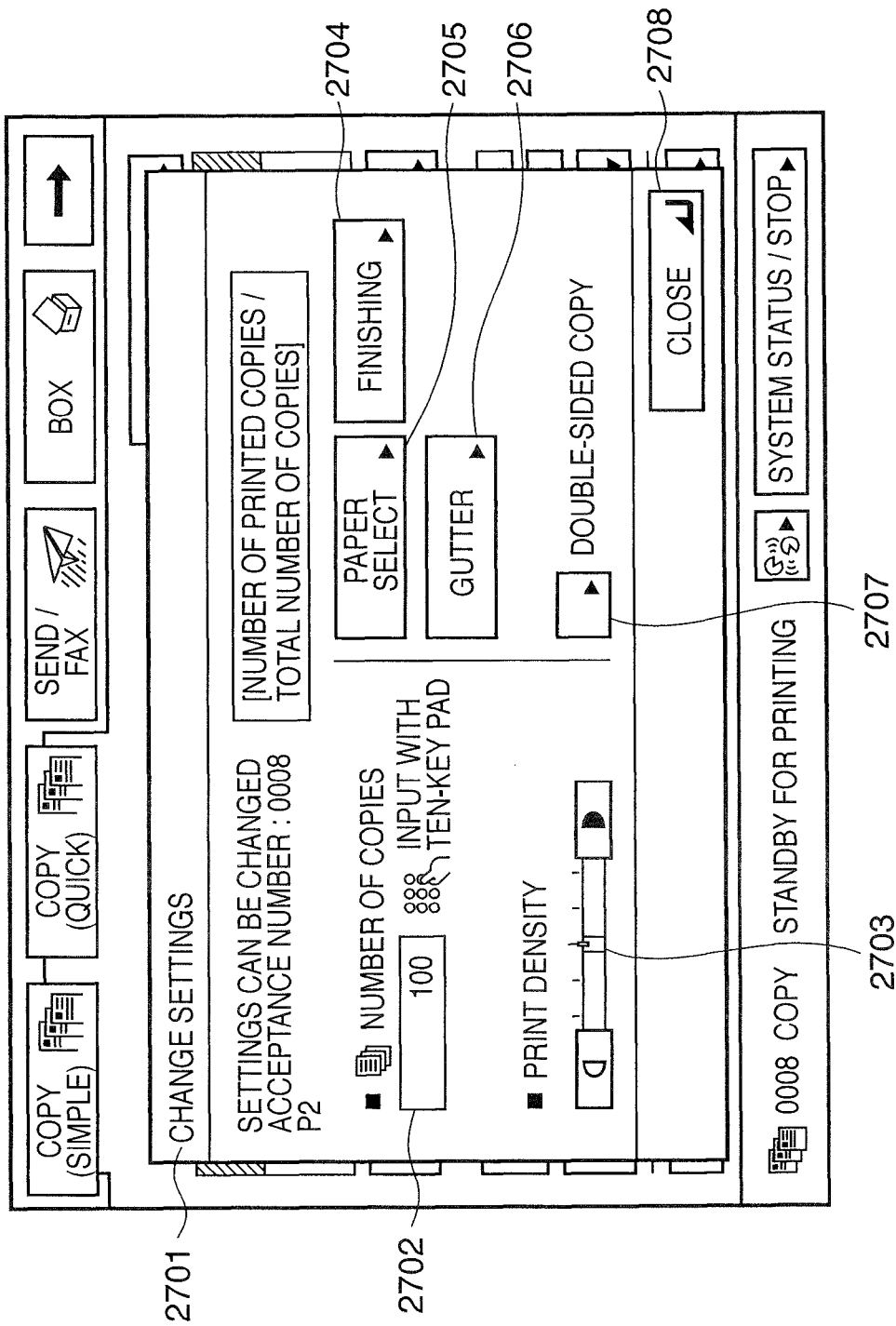
FIG. 26 is a view for explaining a control example associated with the operation unit 204.
Figure 27:
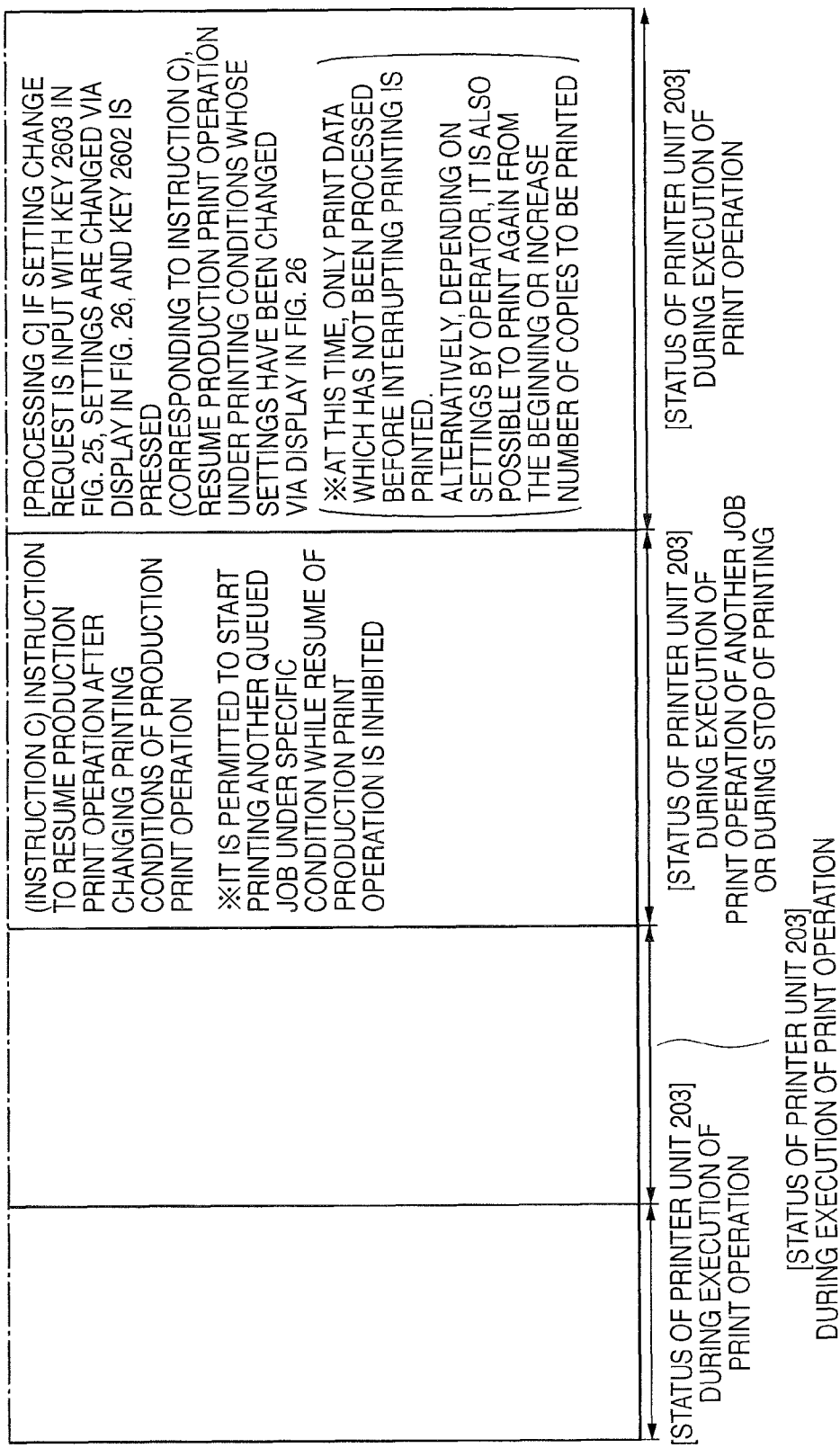
FIGS. 27A and 27B are timing charts for explaining a control example associated with the printing system 1000.

Assume that the operator changes the settings of the printing conditions via the window in FIG. 26, the window returns to one in FIG. 25, and then the operator presses the key 2602 in the redisplayed window of FIG. 25. In response to this, the control unit 205 causes the printing system 1000 to resume the print operation of the waiting job. When resuming the print operation, the control unit 205 controls the printing system 1000 to resume the production print operation of the job under setting-changed printing conditions accepted from the operator via the window in FIG. 26 before an input from the key 2602.

In the embodiment, the control unit 205 controls the touch panel unit 401 to display various windows described with reference to FIGS. 14A to 14H on the basis of a request from the operator before an input from the key 2602. The control unit 205 can accept various requests as described above from the operator via these windows. As described above, the control unit 205 can also accept a change of device-specific print processing conditions of the printing system 1000 that are associated with a plurality of jobs including the target job and other subsequent jobs. Assume that the operator inputs an instruction via the key 2602 after changing the device-specific print processing conditions of the printing system 1000 that are associated with a plurality of jobs. In this case, the control unit 205 controls the printing system 1000 to successively process these jobs under the changed processing conditions.

A control sequence corresponding to a series of control operations in the second case executed in accordance with an instruction from the key 2504 is different from that in FIG. 12B. FIGS. 27A and 27B show the control sequence corresponding to the series of control operations in the second case. The control sequence in FIGS. 27A and 27B will be explained.

The process in [step 1] during the period from time T0 to time TX in FIGS. 27A and 27B is the same as that in [step 1] during the period from time T0 to time TX in FIG. 12B. Similarly, the process in [step 2] during the period from time TX to time TY in FIGS. 27A and 27B is the same as that in [step 2] during the period from time TX to time TY in FIG. 12B.

However, an instruction accepted by the control unit 205 at time TX in FIGS. 27A and 27B is a check print request based on an instruction from the key 2504. Even if the check print operation of the job ends immediately before time TY in FIGS. 27A and 27B, the control unit 205 inhibits the printing system 1000 from automatically resuming the production print operation of the job. From time TY in FIGS. 27A and 27B, the control unit 205 makes the job stand by for resume of production printing. While the job stands by for print resume, the control unit 205 accepts various instructions as described above from the operator via the displays in FIGS. 25 and 26.

For example, in [step 3] of FIGS. 27A and 27B, the control unit 205 accepts an instruction (corresponding to instruction A in FIGS. 27A and 27B) to stop processing without resuming the production print operation of the job having undergone check print in [step 2] of FIGS. 27A and 27B.

Alternatively, in [step 3] of FIGS. 27A and 27B, the control unit 205 accepts an instruction (corresponding to instruction B in FIGS. 27A and 27B) to resume the production print operation without changing the printing conditions of the production print operation of the job having undergone check print in [step 2] of FIGS. 27A and 27B.

Alternatively, in [step 3] of FIGS. 27A and 27B, the control unit 205 accepts an instruction (corresponding to instruction C in FIGS. 27A and 27B) to resume the production print operation after changing the printing conditions of the production print operation of the job having undergone check print in [step 2] of FIGS. 27A and 27B.

Upon accepting instruction A at time TZ in FIGS. 27A and 27B, the control unit 205 controls to stop (end) processing without resuming the production print operation of the job having undergone check print, as represented by (processing A) in FIGS. 27A and 27B.

Upon accepting instruction B at time TZ in FIGS. 27A and 27B, the control unit 205 controls to resume the production print operation of the job having undergone check print without changing the printing conditions, as represented by (processing B) in FIGS. 27A and 27B. In (processing B) of FIGS. 27A and 27B, the control unit 205 controls to print only part of the job that has not been processed when the production print operation of the job is interrupted, as shown in FIGS. 27A and 27B.

Upon accepting instruction C at time TZ in FIGS. 27A and 27B, the control unit 205 controls to resume the production print operation of the job having undergone the check print operation under processing conditions changed via the display in FIG. 26, as represented by (processing C) in FIGS. 27A and 27B. In (processing C) of FIGS. 27A and 27B, when the production print operation of the job resumes, only part of the job that has not been processed before interruption of printing can be printed, as shown in FIGS. 27A and 27B. It is also possible to start processing from the beginning depending on an instruction accepted from the operator via the display in FIG. 26. It is also possible to resume the production print operation of the job by changing the number of copies.

Time TZ in FIGS. 27A and 27B is the timing when the operator inputs an instruction via the key 2602. In response to an input from the operator via the key 2602, the control unit 205 causes the printing system 1000 to cancel the standby state of the job for resume of production printing and alternatively execute various processes described above in [step 4] of FIGS. 27A and 27B.

In [step 3] of FIGS. 27A and 27B, the job having undergone check print stands by for resume of the print operation. However, the printing system 1000 according to the embodiment is configured not to wastefully decrease the operating ratio of the print operation, as described above. Also in [step 3] of FIGS. 27A and 27B, the control unit 205 enables the printing system 1000 to execute the print operation of a subsequent job other than the job having undergone check print. This will be described later.

As described above, prior to the start of check print of a target job, the control unit 205 can accept an inhibition request from the operator via the key 2504 to inhibit automatic resume of production print processing of the job after executing check print. The check print corresponds to the above-mentioned second print processing, and the production print processing corresponds to the above-mentioned first print processing.

Assume that the control unit 205 causes the print apparatus 100 to start check print of the job upon accepting the inhibition request from the operator via the key 2504. In this case, the control unit 205 inhibits the print apparatus 100 from automatically resuming production print processing of the job after executing check print. Also in this case, the control unit 205 makes the job stand by for resume of production print processing. On condition that the operator inputs an instruction via the key 2602 to resume print processing of the job, the control unit 205 causes the print apparatus 100 to resume production print processing of the job.

Assume that the control unit 205 starts check print processing of the job without accepting the inhibition request from the operator via the key 2504. In this case, the control unit 205 permits the print apparatus 100 to automatically resume production print processing of the job after executing check print.

For example, in the embodiment, prior to the start of check print of a target job, the control unit 205 can accept a permission request from the operator via the key 2503 to permit automatic resume of production print processing of the job after executing check print. Upon accepting the permission request from the operator via the key 2504 without accepting the above-mentioned inhibition request prior to the start of check print, the control unit 205 causes the print apparatus 100 to automatically resume production print processing of the job after executing check print. In this case, the control unit 205 controls the print apparatus 100 to resume production print processing of the job immediately after the end of check print without accepting the instruction via the key 2602 after executing check print.

As described above, the printing system 1000 according to the embodiment has the first operation mode related to a check print function corresponding to an instruction from the key 2503 in FIG. 24, and the second operation mode related to a check print function corresponding to an instruction from the key 2504 in FIG. 24. The control unit 205 controls the printing system 1000 to selectively execute these operation modes in accordance with an instruction from the operator. This configuration is also applicable to the printing system 1000 according to the embodiment.

In addition to the above-described effects of the embodiment, the printing system 1000 according to the embodiment can provide another effect capable of satisfying both of the following needs.

(First Need for Check Print) A need to make the production print operation of a job stand by (locked) until a printed material is confirmed.

(Second Need for Check Print) A need to process a print job at high productivity without stopping the print operation even when check print is performed.

As a configuration different from them, the embodiment is also applicable to a printing system having the above-mentioned configuration.

For example, the control unit 205 controls the printing system 1000 to output the check printed materials of a job to a destination different from the production printed material destination of the job subjected to check print regardless of which of the first and second operation modes is set. Also in this case, the control unit 205 controls the operation unit 204 to notify the operator of information which allows him to specify a production printed material destination and check printed material destination, as represented in the display field 2502 of FIG. 24. This configuration is also possible, and can further obtain various effects described above in both the first and second operation modes.

The control unit 205 controls the printing system 1000 to execute various operations as follows when the first and second operation modes of the check print function can be selectively executed.

Assume that the print apparatus 100 successively accepts the print execution requests of four jobs A, B, C, and D using different inline finishers in the order from job A, as shown in FIG. 28, when the printing system 1000 has the system configuration shown in FIG. 21. Jobs A and B are saddle stitching jobs, job C is a stacker job, and job D is a glue binding job. This case will be called case x.

In case X, the control unit 205 may also execute the following control when the operator presses the key 2503 in FIG. 24 prior to check print of job A. This control will be described with reference to FIG. 29.

Figure 29:
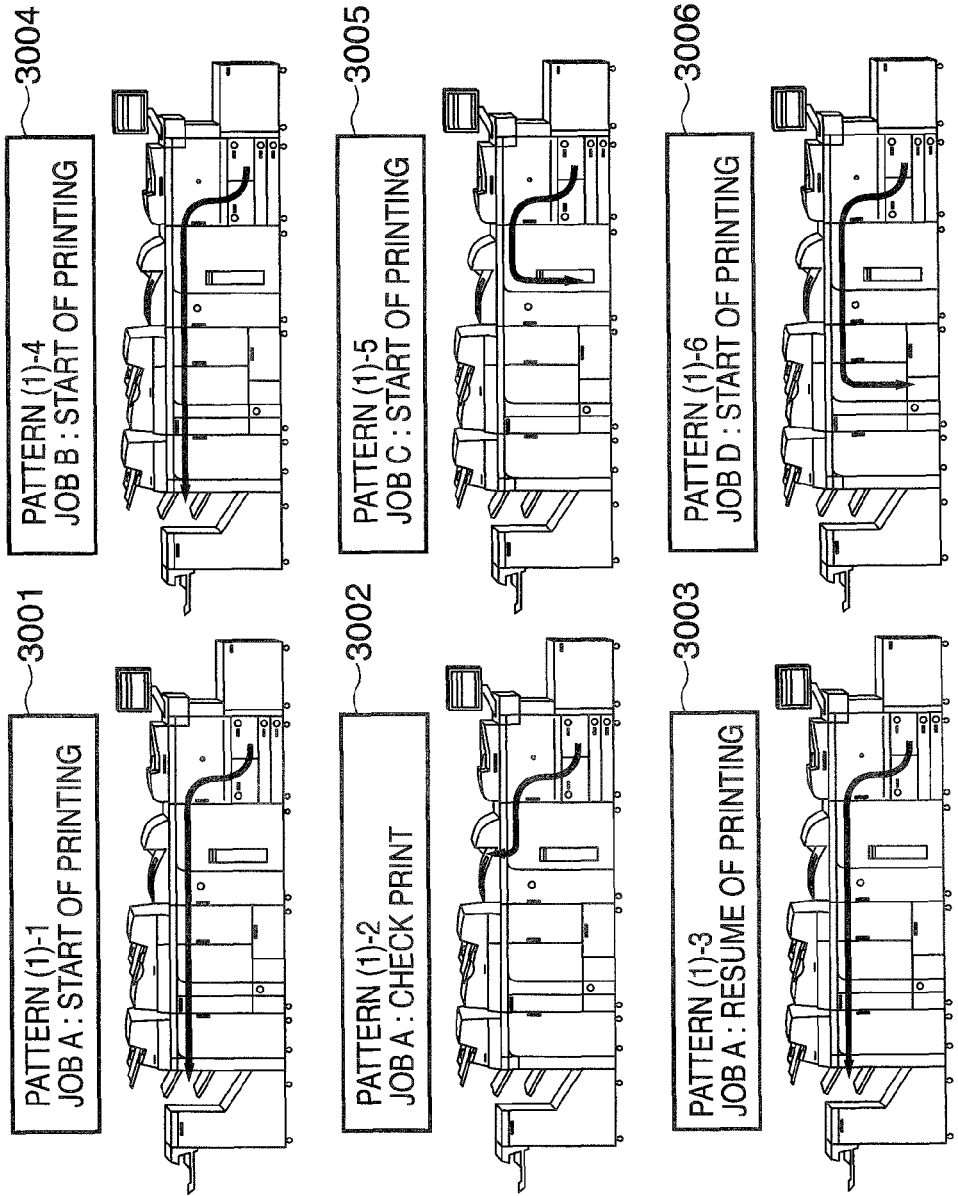
FIG. 29 is a view for explaining a control example associated with the printing system 1000.

First, upon receiving a print start request from the start key 503 or the like, the control unit 205 causes the print apparatus 100 to start the production print operation of job A, as represented by reference numeral 3001 in FIG. 29.

Then, upon receiving an input from the key 2503 during execution of printing of job A, the control unit 205 causes the print apparatus 100 to automatically start the check print operation of job A immediately after interrupting the production print operation of job A, as represented by reference numeral 3002 in FIG. 29.

In response to the end of check print of job A, the control unit 205 causes the print apparatus 100 to automatically resume the production print operation of job A, as represented by reference numeral 3003 in FIG. 29.

In response to the end of the production print operation of job A, the control unit 205 controls the printing system 1000 to sequentially process subsequent jobs B, C, and D in the order of receiving their print execution requests, as represented by reference numerals 3003 to 3006 in FIG. 29.

More specifically, in response to the end of the production print operation of job A, the control unit 205 causes the print apparatus 100 to automatically execute the production print operation of job B, as represented by reference numeral 3004 in FIG. 29.

In response to the end of the production print operation of job B, the control unit 205 causes the print apparatus 100 to automatically execute the production print operation of job C, as represented by reference numeral 3005 in FIG. 29.

In response to the end of the production print operation of job C, the control unit 205 causes the print apparatus 100 to automatically execute the production print operation of job D, as represented by reference numeral 3006 in FIG. 29.

The control unit 205 executes the series of control operations when the printing system 1000 executes the first operation mode.

To the contrary, when the printing system 1000 executes the second operation mode, the control unit 205 executes the following series of control operations, which will be explained with reference to FIG. 30. The control unit 205 executes the series of control operations when the operator presses the key 2504 in FIG. 24 prior to check print of job A in the above-described case X.

Figure 30:
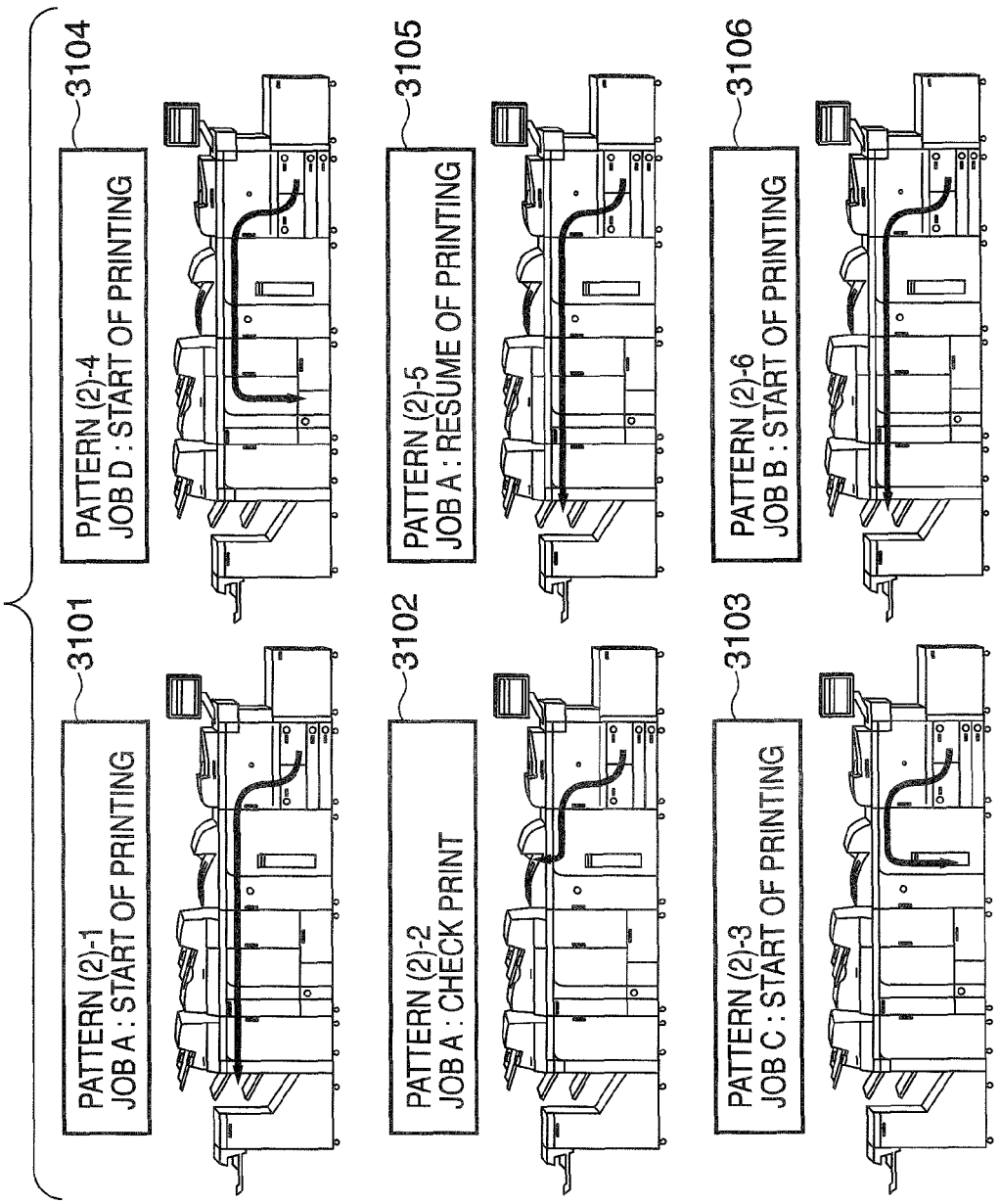
FIG. 30 is a view for explaining a control example associated with the printing system 1000.

First, upon receiving a print start request from the start key 503 or the like, the control unit 205 causes the print apparatus 100 to start the production print operation of job A, as represented by reference numeral 3101 in FIG. 30.

Then, upon receiving an input from the key 2504 during execution of printing of job A, the control unit 205 causes the print apparatus 100 to automatically start the check print operation of job A immediately after interrupting the production print operation of job A, as represented by reference numeral 3102 in FIG. 30.

Assume that check print of job A ends, and the control unit 205 determines that the production print operation resume request of job A has not been input from the key 2602. In this case, the control unit 205 enables the print apparatus 100 to execute the print operation of a subsequent job without resuming the production print operation of job A. Job B whose print execution request is accepted immediately after job A is a saddle stitching job requiring finishing by the same inline finisher as that for job A. In contrast, job C whose print execution request is accepted immediately after job B is a stacker job requiring finishing by an inline finisher different from that for job A.

Based on these determination results, the control unit 205 causes the print apparatus 100 to postpone the production print operations of jobs A and B and automatically execute the production print operation of job C, as represented by reference numeral 3103 in FIG. 30.

Assume that the production print operation of job C ends, and the control unit 205 determines that the production print operation resume request of job A has not been input from the key 2602. Also in this case, the control unit 205 enables the print apparatus 100 to execute the print operation of a subsequent job while keeping job A stand by for resume of the production print operation. The control unit 205 determines that job D whose print execution request is accepted immediately after job C is a glue binding job requiring finishing by an inline finisher different from that for job A.

Based on this determination result, the control unit 205 causes the print apparatus 100 to postpone the production print operations of jobs A and B and automatically execute the production print operation of job D, as represented by reference numeral 3104 in FIG. 30.

Assume that the control unit 205 accepts the production print operation resume request of job A from the operator via the key 2602 during execution of printing of job D. In this case, the control unit 205 controls the printing system 1000 to complete the production print operation of job D.

In response to the end of the production print operation of job D, the control unit 205 causes the print apparatus 100 to resume the production print operation of job A, as represented by reference numeral 3105 in FIG. 30.

In response to the end of the production print operation of job A, the control unit 205 causes the print apparatus 100 to automatically execute the production print operation of job B, as represented by reference numeral 3106 in FIG. 30.

The control unit 205 executes the series of control operations when the printing system 1000 executes the second operation mode.

As described above, when performing the second operation mode, the control unit 205 controls the printing system 1000 to change the execution order of jobs and process them on the basis of system configuration information of the printing system 1000, the finishing types of the jobs, and the like.

Under the control of the control unit 205, the print operation of the printing system 1000 can continue without wastefully stopping even when it is inhibited to automatically resume the production print operation without any instruction from the operator after executing check print.

Regardless of which of the control in FIG. 29 and that in FIG. 30 is executed, the control unit 205 inhibits output of the check printed materials of job A to a destination (one of Z1 to Z3) of the saddle stitching apparatus in FIG. 21 serving as the destination of the production printed materials of job A. Regardless of either control is executed, the control unit 205 controls the printing system 1000 to output the check printed materials of job A to sample tray X2 of the large-volume stacker in FIG. 21 serving as a destination different from that of the production printed materials of job A.

Hence, the embodiment can provide a printing system capable of further enhancing the above-described effects.

In the embodiment, the control unit 205 can accept a specific instruction from the operator via the operation unit 204 to execute check processing at a timing after the print apparatus 100 starts the first print processing. Especially in the embodiment, the control unit 205 can accept the specific instruction from the operator via the operation unit 204 while the print apparatus 100 executes the first print processing. The specific instruction corresponds to a check print execution request accepted from the operator via the key 2304B, 2503, or 2504 in the embodiment.

Upon accepting the specific instruction, the control unit 205 causes the print apparatus 100 to execute check processing before the completion of the first print processing. In the embodiment, as the check processing, the control unit 205 causes the print apparatus 100 to execute the second print processing by using print data which is used in the first print processing. The first print processing corresponds to the production print operation of a job subjected to check print in the above-described embodiment. The second print processing corresponds to the check print operation of the job.

Immediately after the print apparatus 100 performs the second print processing, the control unit 205 enables the print apparatus 100 to continue the first print processing.

These configurations correspond to the control examples of the check print operation described with reference to FIGS. 12B to 14H.

The control unit 205 controls the print apparatus 100 to automatically decide a page to be printed in the second print processing on the basis of the timing when the operator inputs the specific instruction. This configuration corresponds to, e.g., the above-described control example executed when the operator presses the key 2302B in FIG. 13E.

The control unit 205 can repetitively accept the specific instruction from the operator during the period from the start to end of the first print processing. This configuration corresponds to the above-described control example executed when the operator inputs the second check print request with the key 2301A in FIG. 13F.

In the embodiment, the control unit 205 controls the printing system 1000 to output at least one second sheet printed in the second print processing to a destination different from a plurality of first sheets printed by the print apparatus 100 in the first print processing. These first sheets correspond to production printed materials in the above-described embodiment. One second sheet corresponds to the check printed materials for the job in the above-described embodiment.

In the embodiment, the control unit 205 controls the printing system 1000 to output a plurality of first sheets to a destination inside an inline finisher. To the contrary, the control unit 205 controls the printing system 1000 to output the second sheet to a destination outside the same inline finisher. In the above-described embodiment, the large-volume stacker in FIG. 4 is utilized as an inline finisher having internal and external destinations.

As another form, the control unit 205 controls the printing system 1000 to output the first sheets to the destination of the second inline finisher (second post-processing apparatus) via the first inline finisher (first post-processing apparatus). To the contrary, the control unit 205 controls the printing system 1000 to output the second sheet to the destination of the first inline finisher.

These configurations correspond to the control examples described with reference to FIGS. 20 and 21 and the like.

In the embodiment, the control unit 205 causes a notification device to notify the operator of notification information from which he can recognize the destination of the second sheet. This configuration corresponds to the control example described with reference to FIGS. 15 and 24.

In the embodiment, the control unit 205 causes the print apparatus 100 to continue the first print processing without accepting a request from the operator using the operation unit 204 to continue the first print processing after the second print processing. This configuration corresponds to the control example described with reference to FIG. 12B and the like.

As still another form, the control unit 205 causes the print apparatus 100 to continue the first print processing upon accepting a request from the operator using the operation unit 204 to continue the first print processing after the second print processing. This configuration corresponds to the control example described with reference to FIGS. 27A and 27B and the like. The control unit 205 enables the print apparatus 100 to execute another print processing different from the first print processing until the control unit 205 accepts this request from the operator upon completion of the second print processing. This configuration corresponds to the control example described with reference to FIG. 30 and the like.

Further in the embodiment, the control unit 205 enables the operator to select the first or second operation mode via the operation unit 204 prior to the start of the aforementioned check processing corresponding to the second print processing. In the first operation mode, the control unit 205 causes the print apparatus 100 to continue the first print processing without accepting a request from the operator using the operation unit 204 to continue the first print processing after the second print processing. In the second operation mode, the control unit 205 causes the print apparatus 100 to continue the first print processing upon accepting a request from the operator using the operation unit 204 to continue the first print processing after the second print processing.

These configurations correspond to the control examples described with reference to FIG. 24 and the like.

In the embodiment, the control unit 205 can accept, from the operator via the operation unit 204, an instruction different from the specific instruction prior to the start of the first print processing. The instruction different from the specific instruction corresponds to a test copy execution request accepted from the operator using the test copy key in the window of FIG. 13A or the like in the above-described embodiment. Upon accepting the instruction different from the specific instruction, the control unit 205 causes the print apparatus 100 to execute another processing different from the aforementioned check processing. The processing different from check processing corresponds to the test copy operation described with reference to FIG. 12A and the like. The check processing (corresponding to the second print processing, and in the embodiment, the check print operation) is available in changing printing conditions after the first print processing starts. In contrast, the processing different from check processing is available in changing printing conditions before the first print processing starts.

The control unit 205 controls the printing system 1000 to output the second sheet printed in the second print processing corresponding to the check processing to a destination different from that of first sheets without outputting the second sheet to the destination of the first sheets printed in the first print processing. The control unit 205 controls the printing system 1000 to output a sheet printed in the test copy operation corresponding to the processing different from check processing to the same destination as that of the first sheets.

The test copy operation corresponding to the processing different from check processing is available in changing printing conditions relating to one print job. In contrast, the check print operation corresponding to the check processing is available in changing printing conditions relating to a plurality of print jobs.

In the embodiment, the control unit 205 controls the operation unit 204 so that the operator can input the above-described specific instruction and the instruction different from it via the operation unit 204 for the same job.

Various configurations described above correspond to selective control examples associated with test copy and check print described with reference to FIGS. 12A to 14H and the like.

The printing system 1000 according to the embodiment is configured by freely combining these configurations compatibly.

[Other Mechanisms]

A host computer (e.g., the PC 103 or 104) may use an externally installed program to achieve the functions shown in the drawings in the embodiment. In this case, data for displaying the same windows as those described in the embodiment including windows are externally installed to provide various user interface windows on the display of the host computer.

For this purpose, a storage medium which records software program codes for implementing the functions of the above-described embodiment is supplied to a system or apparatus. The computer (CPU or MPU) of the system or apparatus reads out and executes the program codes stored in the storage medium, achieving the object of the present invention. In this case, the program codes read out from the storage medium implement new functions of the present invention, and the storage medium which stores the program codes constitutes the present invention. The program form is arbitrary such as an object code, a program executed by an interpreter, or script data supplied to an OS as long as a program function is attained.

The storage medium for supplying the program includes a flexible disk, hard disk, optical disk, magnetooptical disk, MO, CD-ROM, CD-R, CD-RW, magnetic tape, nonvolatile memory card, ROM, and DVD. In this case, the program codes read out from the storage medium implement the functions of the above-described embodiment, and the storage medium which stores the program codes constitutes the present invention.

As another program supply method, a client computer connects to an Internet homepage via the browser of the client computer. Then, the computer program of the present invention or a compressed file containing an automatic installing function is downloaded from the homepage to a recording medium such as a hard disk, thereby supplying the program. The program can also be implemented by grouping program codes which form the program of the present invention into a plurality of files, and downloading the files from different homepages. That is, claims of the present invention also incorporate a WWW server, FTP server, and the like which prompt a plurality of users to download the program files for implementing functional processes of the present invention by a computer.

The program of the present invention can be encrypted, stored in a storage medium such as a CD-ROM, and distributed to a user. A user who satisfies predetermined conditions is prompted to download decryption key information from a homepage via the Internet. The user executes the encrypted program using the key information, and installs the program in the computer.

The functions of the above-described embodiment are implemented when the computer executes the readout program codes. Also, the functions of the above-described embodiment are implemented when an OS (Operating System) or the like running on the computer performs some or all of actual processes on the basis of the instructions of the program codes.

The program codes read out from the storage medium may be written in the memory of a function expansion board inserted into the computer or the memory of a function expansion unit connected to the computer. In this case, the CPU of the function expansion board or function expansion unit performs some or all of actual processes on the basis of the instructions of the program codes. These processes also implement the functions of the above-described embodiment.

The present invention may be applied to a system including a plurality of devices or an apparatus formed by a single device. The present invention can also be achieved by supplying a program to the system or apparatus. In this case, the system or apparatus can obtain the effects of the present invention by providing, to the system or apparatus, a storage medium which stores a program represented by software for achieving the present invention.

The present invention is not limited to the above-described embodiment, and various modifications (including organic combinations of embodiments) can be made without departing from the gist of the invention, and are not excluded from the scope of the invention.

For example, in the embodiment, jobs controlled by the test copy function and check print function may include a print job to be printed from an application in a PC. In this case, the job also contains a form of instructing the print job saved in the hard disk on check print. Thus, a job to the box function can also be processed similarly.

For example, colored paper and the like may be output to a destination to which the printed materials of check print are output. The printing system may prompt the operator to identify the destination of check printed materials by notification processing other than display processing in FIG. 15.

The embodiment of the system configuration having various configurations described above can attain various effects described above. However, the system configuration need not comprise all these configurations. For example, a configuration capable of executing only control of a main part associated with the check print function in the above-described embodiment is applicable to the embodiment. The embodiment has illustrated a configuration in which the control unit 205 executes operation control associated with the operation unit 204 and output control associated with the actual print operation of the printing system 1000. However, another control unit such as an operation control unit may perform the operation control.

For example, the embodiment has explained an exemplary configuration in which the control unit 205 of the print apparatus 100 executes the above-described control operations. However, another control unit different from the control unit 205 may execute some or all of the control operations. Examples of another control unit different from the control unit 205 are the external controller of a housing different from the print apparatus 100, the CPU of a remote external apparatus such as the PC 104, and the CPU of an inline finisher. This configuration can further improve the effect capable of building a flexible printing environment complying with a printing environment where the printing system 1000 may be installed. The embodiment can provide a convenient printing system with an eye toward a future digital printing system. For example, the embodiment can establish a convenient, flexible printing environment capable of coping with use cases and needs assumed in the conventional POD environment. The embodiment can provide various mechanisms toward practical application of the printing system.

Various examples and embodiments of the present invention have been described. It is apparent to those skilled in the art that the spirit and scope of the invention are not limited to a specific description in the specification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-203737, filed Jul. 26, 2006, 2006-168881, filed Jun. 19, 2006, and 2007-109682, filed Apr. 18, 2007, which are hereby incorporated by reference herein in their entireties.

What is claimed is:

1. A printing system comprising:
   a receive controller that enables by using a user interface unit an input of an instruction during performing of first print processing with a print apparatus;
   an operation controller that enables the print apparatus to perform check processing before completion of the first print processing in the case where the instruction is input, the check processing being second print processing by using print data which is used in the first print processing, the operation controller enabling the print apparatus to continue the first print processing after the second print processing; and
   a selector that selects one of a first mode and a second mode before the check processing, the first mode for causing the print apparatus to continue the first print processing without inputting a request for resuming the first print processing by using the user interface unit after the second print processing, the second mode for causing the print apparatus to continue the first print processing after the request is input by using the user interface unit after the second print processing.

2. The system according to claim 1, wherein a page printed in the second print processing is automatically decided on the basis of timing when the instruction is input.

3. The system according to claim 1, wherein the instruction can be input repetitively during a period from start to end of the first print processing.

4. The system according to claim 1, wherein a second sheet printed in the second print processing is output to a destination different from a destination of first sheets printed in the first print processing.

5. The system according to claim 4, wherein the first sheets are output to a destination inside a post-processing apparatus, and the second sheet is output to a destination outside the post-processing apparatus.

6. The system according to claim 4, wherein the first sheets are output to a destination of a second post-processing apparatus via a first post-processing apparatus, and the second sheet is output to a destination of the first post-processing apparatus.

7. The system according to claim 4, wherein a notification unit outputs notification information which enables an operator to identify the destination of the second sheet.

8. The system according to claim 1, wherein the operation controller enables the print apparatus to continue the first print processing without inputting a request by using the user interface unit after the second print processing.

9. The system according to claim 1, wherein the operation controller enables the print apparatus to continue the first print processing after a request is input by using the user interface unit after the second print processing.

10. The system according to claim 9, wherein the operation controller enables the print apparatus to perform another print processing different from the first print processing before the request is input by using the user interface unit.

11. The system according to claim 1, wherein the receive controller enables by using the user interface unit an input of another instruction different from the instruction before the first print processing, the operation controller causing the print apparatus to perform another processing different from the check processing in the case where the another instruction is input, the another processing being utilized in changing a printing condition before start of the first print processing, the check processing being utilized in changing a printing condition after start of the first print processing.

12. The system according to claim 11, wherein a second sheet printed in the second print processing is output to a destination different from a destination of first sheets printed in the first print processing, and sheets printed in the another processing are output to the same destination as the destination of the first sheets.

13. The system according to claim 11, wherein the another processing is utilized in changing a printing condition relating to a print job, and the check processing is utilized in changing a printing condition relating to a plurality of print jobs.

14. The system according to claim 11, wherein the instruction and the another instruction can be input for one job.

15. A job processing method comprising the steps of:
   enabling by using a user interface unit an input of an instruction during performing of first print processing with a print apparatus;
   enabling the print apparatus to perform check processing before completion of the first print processing in the case where the instruction is input, the check processing being second print processing by using print data which is used in the first print processing;
   enabling the print apparatus to continue the first print processing after the second print processing; and
   selecting one of a first mode and a second mode before the check processing, the first mode for causing the print apparatus to continue the first print processing without inputting a request for resuming the first print processing by using the user interface unit after the second print processing, the second mode for causing the print apparatus to continue the first print processing after the request is input by using the user interface unit after the second print processing.

16. The method according to claim 15, wherein a page printed in the second print processing is automatically decided on the basis of timing when the instruction is input.

17. The method according to claim 15, wherein the instruction can be input repetitively during a period from start to end of the first print processing.

18. The method according to claim 15, wherein a second sheet printed in the second print processing is output to a destination different from a destination of first sheets printed in the first print processing.

19. The method according to claim 18, wherein the first sheets are output to a destination inside a post-processing apparatus, and the second sheet is output to a destination outside the post-processing apparatus.

20. The method according to claim 18, wherein the first sheets are output to a destination of a second post-processing apparatus via a first post-processing apparatus, and the second sheet is output to a destination of the first post-processing apparatus.

21. The method according to claim 18, wherein a notification unit outputs notification information which enables an operator to identify the destination of the second sheet.

22. The method according to claim 15, wherein the print apparatus is enabled to continue the first print processing without inputting a request by using the user interface unit after the second print processing.

23. The method according to claim 15, wherein the print apparatus is enabled to continue the first print processing after a request is input by using the user interface unit after the second print processing.

24. The method according to claim 23, wherein the print apparatus is enabled to perform another print processing different from the first print processing before the request is input by using the user interface unit.

25. The method according to claim 15, wherein an input of another instruction different from the instruction is enabled by using the user interface unit before the first print processing, the print apparatus being caused to perform another processing different from the check processing in the case where the another instruction is input, the another processing being utilized in changing a printing condition before start of the first print processing, the check processing being utilized in changing a printing condition after start of the first print processing.

26. The method according to claim 16, wherein a second sheet printed in the second print processing is output to a destination different from a destination of first sheets printed in the first print processing, and sheets printed in the another processing are output to the same destination as the destination of the first sheets.

27. The method according to claim 16, wherein the another processing is utilized in changing a printing condition relating to a print job, and the check processing is utilized in changing a printing condition relating to a plurality of print jobs.

28. The method according to claim 16, wherein the instruction and the another instruction can be input for one job.

29. A non-transitory computer-readable storage medium storing a computer program for causing a computer to execute a job processing method defined in claim 15.

* * * * *